United States Patent [19]
Koike et al.

[11] Patent Number: 5,735,585
[45] Date of Patent: Apr. 7, 1998

[54] BRAKE CONTROL APPARATUS CAPABLE OF TRACTION CONTROL OF VEHICLE DRIVE WHEEL AND HAVING DEVICE FOR REDUCING DELIVERY PRESSURE OF PUMP DURING THE TRACTION CONTROL

[75] Inventors: Shin Koike; Yoshihisa Nomura, both of Toyota, Japan

[73] Assignee: Toyota Jidosha Kabushiki Kaisha, Toyota, Japan

[21] Appl. No.: 879,652

[22] Filed: Jun. 20, 1997

Related U.S. Application Data

[63] Continuation of Ser. No. 508,454, Jul. 28, 1995, abandoned.

[30] Foreign Application Priority Data

Jul. 29, 1994 [JP] Japan ................... 6-178298
Jun. 22, 1995 [JP] Japan ................... 7-156010

[51] Int. Cl.⁶ ............................................... B60T 8/58
[52] U.S. Cl. ............................................. 303/145; 303/191
[58] Field of Search ............................ 303/139, 113.2, 303/115.4, 116.1, 116.2, 116.3, 116.4, 10, 191, 145

[56] References Cited

U.S. PATENT DOCUMENTS

| | | | |
|---|---|---|---|
| 4,878,715 | 11/1989 | Toda . | |
| 5,176,428 | 1/1993 | Lebret | 303/116.4 X |
| 5,286,101 | 2/1994 | Kakizaki | 303/116.2 X |
| 5,368,374 | 11/1994 | Fujimoto | 303/139 X |
| 5,397,174 | 3/1995 | Willmann . | |
| 5,441,336 | 8/1995 | Takeuchi | 303/116.1 |
| 5,540,488 | 7/1996 | Terazawa et al. | 303/113.2 X |

FOREIGN PATENT DOCUMENTS

| | | |
|---|---|---|
| 41 32 470 | 4/1993 | Germany . |
| 44 09 911 | 9/1995 | Germany . |
| 1190571 | 7/1989 | Japan . |
| 3-60468 | 6/1991 | Japan . |

*Primary Examiner*—Lee W. Young
*Attorney, Agent, or Firm*—Cushman Darby & Cushman IP Group of Pillsbury Madison & Sutro LLP

[57] ABSTRACT

A control apparatus in a brake system of a motor vehicle having a wheel brake cylinder for braking a vehicle drive wheel, the apparatus including a pump for pressurizing a fluid received from a low-pressure source, a valve device having a pressure increase state for permitting the fluid pressurized by the pump to be fed into the wheel brake cylinder, and a pressure decrease state for permitting the fluid to be discharged from the wheel brake cylinder into the low-pressure source, a traction control device for selectively placing the valve device in at least the pressure increase and decrease states, to control the pressure of the fluid in the wheel brake cylinder for thereby controlling the drive force of the drive wheel so as to control the amount of slip of the drive wheel, and a pump delivery saving device for reducing the delivery pressure of the pump in at least a portion of a time period during which the valve device is placed in a state other than the pressure increase state.

35 Claims, 19 Drawing Sheets

FIG. 11

ANTI-LOCK CONTROL MODES

| VALVES \ CONTROL MODE | INCREASE | DECREASE | HOLD | TERMINATE |
|---|---|---|---|---|
| 1ST SHUT-OFF VALVE 18 | OPEN | OPEN | OPEN | OPEN |
| 2ND SHUT-OFF VALVE 24 | OPEN | CLOSED | CLOSED | OPEN |
| 3RD SHUT-OFF VALVE 32 | CLOSED | OPEN | CLOSED | CLOSED |
| 4TH SHUT-OFF VALVE 42 | CLOSED | CLOSED | CLOSED | CLOSED |

FIG. 12

NORMAL TRACTION CONTROL MODES

| VALVES \ CONTROL MODE | INCREASE | DECREASE | HOLD | TERMINATE |
|---|---|---|---|---|
| 1ST SHUT-OFF VALVE 18 | CLOSED | CLOSED | CLOSED | OPEN |
| 2ND SHUT-OFF VALVE 24 | OPEN | CLOSED | CLOSED | OPEN |
| 3RD SHUT-OFF VALVE 32 | CLOSED | OPEN | CLOSED | CLOSED |
| 4TH SHUT-OFF VALVE 42 | OPEN | OPEN | OPEN | CLOSED |

FIG. 13

PUMP DELIVERY SAVING TRACTION CONTROL MODES

| VALVES \ CONTROL MODE | INCREASE | DECREASE | HOLD |
|---|---|---|---|
| 1ST SHUT-OFF VALVE 18 | CLOSED | OPEN | DUTY CONTROL |
| 2ND SHUT-OFF VALVE 24 | OPEN | CLOSED | OPEN |
| 3RD SHUT-OFF VALVE 32 | CLOSED | OPEN | CLOSED |
| 4TH SHUT-OFF VALVE 42 | OPEN | OPEN | OPEN |

FIG. 18

PUMP DELIVERY SAVING TRACTION CONTROL MODES

| CONTROL MODE<br>VALVES | INCREASE | DECREASE | HOLD |
|---|---|---|---|
| 1ST SHUT-OFF VALVE 18 | CLOSED | OPEN | OPEN |
| 2ND SHUT-OFF VALVE 24 | OPEN | CLOSED | CLOSED |
| 3RD SHUT-OFF VALVE 32 | CLOSED | OPEN | CLOSED |
| 4TH SHUT-OFF VALVE 42 | OPEN | OPEN | OPEN |

FIG. 20

PUMP DELIVERY SAVING TRACTION CONTROL MODES

| CONTROL MODE<br>VALVES | INCREASE | DECREASE | HOLD |
|---|---|---|---|
| 1ST SHUT-OFF VALVE 18 | CLOSED | CLOSED | CLOSED |
| 2ND SHUT-OFF VALVE 24 | OPEN | CLOSED | CLOSED |
| 3RD SHUT-OFF VALVE 32 | CLOSED | OPEN | CLOSED |
| 4TH SHUT-OFF VALVE 42 | OPEN | OPEN | OPEN |
| SHUT-OFF VALVE 302 | CLOSED | OPEN | OPEN |

FIG. 22

PUMP DELIVERY SAVING TRACTION CONTROL MODES

| CONTROL MODE<br>VALVES | INCREASE | DECREASE | HOLD |
|---|---|---|---|
| 1ST SHUT-OFF VALVE 18 | CLOSED | CLOSED | CLOSED |
| 2ND SHUT-OFF VALVE 24 | OPEN | OPEN | OPEN |
| 3RD SHUT-OFF VALVE 32 | CLOSED | OPEN | DUTY CONTROL |
| 4TH SHUT-OFF VALVE 42 | OPEN | OPEN | OPEN |

FIG. 24

TRACTION CONTROL MODES

| CONTROL MODE<br>VALVES | INCREASE | DECREASE | HOLD |
| --- | --- | --- | --- |
| 3-POSITION VALVE 316 | HOLD | DECREASE | HOLD |
| SHUT-OFF VALVE 328 | OPEN | CLOSED | CLOSED |
| SHUT-OFF VALVE 338 | OPEN | OPEN | OPEN |

BRAKE CONTROL APPARATUS CAPABLE OF TRACTION CONTROL OF VEHICLE DRIVE WHEEL AND HAVING DEVICE FOR REDUCING DELIVERY PRESSURE OF PUMP DURING THE TRACTION CONTROL

This is a continuation of application Ser. No. 08/508,454, filed on Jul. 28, 1995, which was abandoned upon the filling hereof.

BACKGROUND OF THE INVENTION

1. Field of the Invention

The present invention relates to a brake control apparatus in a brake system of a motor vehicle, which is capable of controlling a fluid pressure in a brake cylinder for a drive wheel of the vehicle; to control the drive or traction force of the drive wheel.

2. Discussion of the Related Art

An example of such type of brake control apparatus is disclosed in laid-open Publication 3-60468 (published in 1991) of unexamined Japanese Utility Model Application. The brake control apparatus disclosed in this publication includes (1) a low-pressure source, (2) a pump for pressurizing a fluid received from the low-pressure source, (3) a valve device having at least a pressure increase state for permitting the fluid pressurized by the pump to be fed into a wheel brake cylinder for a drive wheel of a motor vehicle so as to increase the pressure of the fluid in the wheel brake cylinder, and a pressure decrease state for permitting the fluid to be discharged from the wheel brake cylinder into the low-pressure source so as to decrease the fluid pressure in the wheel brake cylinder, and (4) traction controller for selectively placing said valve device in at least said pressure increase state and said pressure decrease state, to control a pressure of the fluid in the wheel brake cylinder for thereby controlling a drive force of the drive wheel so that an amount of slip of the drive wheel is held within a predetermined optimum range.

In the brake control apparatus including the traction controller described above, the fluid pressure in the wheel brake cylinder is controlled so that the amount of slip of the drive wheel on a road surface due to an excessive drive force is optimized, with the valve device being controlled by the traction controller. When the valve device is placed in the pressure increase state, the pressurized fluid delivered from the pump is supplied to the wheel brake cylinder so as to raise the fluid pressure in the wheel brake cylinder. When the valve device is switched to the pressure decrease state, the fluid in the wheel brake cylinder is discharged to the low-pressure source, and the fluid pressure in the wheel brake cylinder is lowered.

In the conventional brake system, the highest fluid pressure in the wheel brake cylinder is determined by a pressure relief valve disposed between the delivery port of the pump and the low-pressure source, so that the fluid is returned from the wheel brake cylinder to the low-pressure source when the fluid pressure exceeds a predetermined upper limit. That is, when the valve device is placed in a state other than the pressure increase state the fluid delivered from the pump is not fed into the wheel brake cylinder, and is returned to the low-pressure source through the pressure relief valve when the delivery pressure of the pump exceeds a preset relief pressure of the relief valve, which is equal to the desired highest fluid pressure in the wheel brake cylinder.

In the convention brake system wherein the fluid delivered from the pump is not used for the wheel brake cylinder under some condition as described above, energy is more or less wasted by an electric motor used to operate the pump.

To return the fluid delivered from the pump to the master cylinder, the delivery pressure of the pump should be higher than the relief pressure of the pressure relief valve, and the load acting on the motor is accordingly increased, inevitably causing wasteful energy consumption by the motor.

SUMMARY OF THE INVENTION

It is therefore a principal object of the present invention to provide a brake control apparatus in a brake system of a motor vehicle equipped with a pump and traction control means for a brake cylinder for a vehicle drive wheel, which apparatus is adapted to reduce wasting of energy consumption by an electric motor for the motor.

It is a first optional object of this invention to reduce the energy consumption by the motor, by suitably controlling the valve device for the traction control.

It is a second optional object of this invention to prevent an excessive rise of the temperature of the fluid as well as to reduce the wasting of the energy consumption.

The principal object indicated above may be achieved according to the principle of the present invention, which provides an apparatus for controlling a brake for a drive wheel of a motor vehicle, comprising: (a) a low-pressure source; (b) a pump for pressurizing a working fluid received from the low-pressure source; (c) a valve device having at least a pressure increase state for permitting the fluid pressurized by the pump to be fed into the wheel brake cylinder so as to increase a pressure of the fluid in the wheel brake cylinder, and a pressure decrease state for permitting the fluid to be discharged from the wheel brake cylinder into the low-pressure source so as to decrease the pressure of the fluid in the wheel brake cylinder; (d) a traction controller for selectively placing the valve device in at least the pressure increase state and the pressure decrease state, to control the pressure of the fluid in the wheel brake cylinder for thereby controlling a drive force of the drive wheel so that an amount of slip of the drive wheel is held within a predetermined range; and (e) a pump delivery saving device for reducing a delivery pressure of the pump in at least a portion of a time period during which the valve device is placed in a state other than the pressure increase state.

The present brake control apparatus may comprise anti-lock control means and other hydraulic control means other than the traction controller. The anti-lock control means is adapted to control the fluid pressure in the wheel brake cylinder for the drive wheel or a wheel brake cylinder for a driven wheel of the vehicle, so that the amount of slip of the wheel upon brake application is held within a predetermined optimum range.

The valve device may include a single control valve or a combination of two or more control valves, provided the valve device is switchable between its pressure increase state and pressure decrease state. The valve device may have a pressure hold state for inhibiting the fluid flows into and from the wheel brake cylinder.

The time period during which the pump delivery saving device is operable to reduce the delivery pressure of the pump is at least a portion of the time period during which the valve device is placed in the pressure decrease state or any other state (for example, pressure hold state) other than the pressure increase state. Where the valve device has only the pressure increase state and the pressure decrease state, the delivery pressure of the pump is reduced by the pump delivery saving device in a portion or entirety of the time period during which the valve device is placed in the pressure decrease state. Where the valve device has the pressure hold state as well as the pressure increase state and pressure decrease state, the delivery pressure of the pump is reduced in a portion or entirety of the time period during which the valve device is placed in at least one of the pressure decrease and hold states.

The pump delivery saving device may include means for controlling the valve device, or means for controlling other device for reducing the delivery pressure of the pump.

In the present brake control apparatus, the valve device is controlled by the traction controller such that the valve device is placed selectively in at least the pressure increase and decrease states, to control the fluid pressure in the wheel brake cylinder for controlling the drive or traction force of the drive wheel so as to optimize the amount of slip of the drive wheel on the road surface, upon or immediately after starting of the vehicle, for example.

Further, the delivery pressure of the pump is reduced by the pump delivery saving device in at least a portion of the time period during which the valve device is not placed in the pressure increase state. Accordingly, the wasteful energy consumption by the motor for driving the pump is reduced.

When the valve device is placed in the pressure increase state, the fluid delivered from the pump is supplied to the wheel brake cylinder, and the delivery pressure of the pump is usually not so high.

When the valve device is placed in a state other than the pressure increase state, the fluid delivered from the pump is not supplied to the wheel brake cylinder, namely, not used for the wheel brake cylinder. In the conventional brake control apparatus, the fluid delivered from the pump and not supplied to the wheel brake cylinder is entirely returned to the low-pressure source through a pressure relief valve. In this conventional arrangement, the delivery pressure of the pump is raised to a relatively high relief pressure of the relief valve, and an appreciable amount of energy is wasted by the motor for the pump while the valve device is not placed in the pressure increase state. In the present brake control apparatus, however, the pump delivery saving device is provided to reduce the delivery pressure of the pump as needed while the valve device is not placed in the pressure increase state, so that the wasting of the energy by the motor is reduced or eliminated, and the overall amount of energy consumption by the motor is minimized.

In particular, the wasting of the energy by the motor is eliminated if the delivery pressure of the pump is reduced throughout the time period during which the valve device is placed in any state other than the pressure increase state.

Where the present brake control apparatus includes a pressure relief valve disposed in a relief passage which connects the delivery port of the pump and the low-pressure source, as in the conventional apparatus, the delivery pressure of the pump will be raised to the preset relief pressure of the relief valve even when the valve device is placed in the pressure increase state, if the pump has a delivery amount which is larger than the amount of the fluid which can flow through the valve device toward the wheel brake cylinder. In this case, a portion of the fluid delivered from the pump may be returned to the low-pressure source through the pressure relief valve. Although this rise of the delivery pressure of the pump in this condition requires an additional amount of energy consumption by the motor, this energy consumption is necessary to permit a sufficiently high rate of increase of the fluid pressure in the wheel brake cylinder. That is, the additional amount of energy consumption is not a waste.

Even where the delivery amount of the pump is smaller than the amount of the fluid that can flow through the valve device, only a portion of the fluid delivered from the pump when the valve device is in the pressure increase state may be supplied to the wheel brake cylinder, with the remaining portion being returned to the low-pressure source, after the fluid pressure in the wheel brake cylinder has been raised to a level close to the relief pressure of the relief valve. However, this is necessary to increase the fluid pressure in the wheel brake cylinder to a desired level while using the relief valve having a relatively low relief pressure. Therefore, the additional energy consumption is not a waste.

As described above, the present brake control apparatus is capable of reducing the delivery pressure of the pump in at least a portion of the time period during which the valve device is placed in any state other than the pressure increase state, and is therefore effective to reduce the wasting of the energy consumption by the motor used to operate the pump. Further, the present apparatus is effective to reduce the load of the motor, whereby the life expectancy of the motor is accordingly increased.

In addition, the reduction of the delivery pressure of the pump by the pump delivery saving device results in restricting the temperature rise of the fluid, and therefore reducing the deterioration of the fluid, leading to prolonged Service life of the fluid. The pump delivery saving device is also effective to prevent bubbling of the fluid, which would deteriorate the operating feel of the brake pedal.

The first optional object indicated above may be achieved according to a first preferred form of the invention, wherein the apparatus further comprises a master cylinder and a primary fluid passage connecting the master cylinder and the wheel brake cylinder, and the low-pressure source includes a primary reservoir for supplying the fluid to the master cylinder. In the present form of the invention, the pump is connected at a delivery port thereof to the primary fluid passage, and the valve device includes a first control valve disposed in a portion of the primary fluid passage between the master cylinder and a point of connection of the delivery port of the pump to the primary fluid passage, while the pump delivery saving device includes valve control means for controlling the first control valve. The first control valve has an open position for connecting the master cylinder and the delivery port of the pump to each other, and a closed position for disconnecting the master cylinder and the delivery port from each other. The valve control means is adapted to place the first control valve in the open position.

In the brake control apparatus constructed according to the first preferred form of the invention as described above, the delivery port of the pump and the master cylinder are disconnected from each other when the first control valve is placed in the closed position. When the first control valve is opened by the valve control means, the delivery port of the pump and the master cylinder are connected to each other, so that a surplus portion of the fluid delivered from the pump is returned to the master cylinder through the open first control valve. Therefore, it is not necessary to return the fluid to the master cylinder through a pressure relief valve as in the conventional apparatus. Accordingly, the delivery pressure of the pump is reduced when the first control valve is in the open position.

In the conventional brake control apparatus, the traction control of the drive wheel by controlling the fluid pressure in the wheel brake cylinder is effected while the wheel brake cylinder is disconnected from the master cylinder. Therefore, the fluid delivered from the pump should be returned to the master cylinder through the pressure relief valve after the fluid pressure in the wheel brake cylinder has been raised to a certain level. This arrangement causes an increase in the delivery pressure of the pump. In the present brake control apparatus, however, the first control valve may be opened by the valve control means of the pump delivery saving device when the valve device is placed in the pressure decrease state, for example, so that the surplus portion of the fluid pressurized by the pump is returned to the master cylinder through the opened first control valve. Thus, the present arrangement does not require the fluid to be returned to the master cylinder through the pressure relief valve, and therefore does not require the delivery pressure of the pump to be raised up to a preset relief pressure of the relief valve.

During the traction control, the fluid pressure in the master cylinder is almost equal to the atmospheric pressure, and the master cylinder can be considered as the low-pressure source. On the other hand, the primary reservoir for supplying the fluid to the master cylinder can be considered as the low-pressure source, at any time other than the traction control period.

According to one advantageous arrangement of the above first preferred form of the present invention, the valve device includes a second control valve disposed in a portion of the primary fluid passage between the wheel brake cylinder and the point of connection of the delivery port of the pump to the primary fluid passage, and a check valve provided in a by-pass passage which by-passes the second control valve. The second control valve has an open position for connecting the first control valve and the wheel brake cylinder to each other, and a closed position for disconnecting the first control valve and the wheel brake cylinder from each other. The check valve permits a flow of the fluid therethrough in a first direction from the wheel brake cylinder toward the master cylinder, and inhibits a flow of the fluid therethrough in a second direction opposite to the first direction. In this arrangement, the valve control means includes pressure hold means for placing the first control valve alternately in the open and closed positions at a controlled duty ratio, so as to maintain the pressure of the fluid in the wheel brake cylinder at a substantially constant level.

The pressure hold means, which is adapted to alternately opening and closing the first control valve, may be arranged to alternately opening and closing the second control valve.

As described above, the traction control is usually effected with the first control valve placed in the closed position. In the above advantageous arrangement wherein the second control valve and the check valve are provided as described above, the fluid delivered from the pump is supplied to the wheel brake cylinder when the second control valve is placed in the open position, and is not supplied to the wheel brake cylinder when the second control valve is placed in the closed position. The fluid is not discharged from the wheel brake cylinder through the second control valve.

When the first control valve is open, the fluid is returned from the wheel brake cylinder to the master cylinder through the check valve and the first control valve, even if the second control valve is in the closed position. Thus, it is not possible to maintain the fluid pressure in the wheel brake cylinder, while preventing a rise of the delivery pressure of the pump. In view of this fact, the present advantageous arrangement is adapted such that the pressure hold means alternately opens and closes the first control valve at the controlled duty ratio, so as to maintain the fluid pressure in the wheel brake cylinder while maintaining the delivery pressure of the pump at a relatively low level.

When the first control valve is alternately opened and closed with the second control valve held in the open position, the fluid is alternately fed into and discharged from the wheel brake cylinder in a repeated fashion, whereby the fluid pressure in the wheel brake cylinder is held at a substantially constant level. When the second control valve is open while the first control valve is closed, the fluid delivered from the pump is fed into the wheel brake cylinder. When the first and second control valves are open, the fluid delivered from the pump and the fluid discharged from the wheel brake cylinder are returned to the master cylinder through the first control valve. Consequently, the delivery pressure of the pump will not be raised during substantially the entire period of operation of the valve device in which the first control valve is alternately opened and closed with the second control valve held open. Thus, the present arrangement permits considerable reduction in the delivery pressure of the pump, as compared with the conventional arrangement.

In the present arrangement wherein the first control valve is alternately opened and closed with the second control valve held open, the fluid pressure near the point of connection of the delivery port of the pump to the primary fluid passage (i.e., near the point of connection of the by-pass passage to the primary fluid passage) is held substantially constant, if the amount of the fluid delivered from the pump is substantially equal to the amount of the fluid which is returned to the master cylinder through the open first control valve. In this case, the fluid delivered from the pump is almost entirely returned to the master cylinder through the first control valve, and there occurs substantially no increase in the delivery pressure of the pump.

The above advantageous arrangement of the first preferred form of the invention may be modified such that the second control valve as well as the first control valve are alternately opened and closed.

As described above, the present arrangement which uses the pressure hold means for alternately opening and closing the first control valve is capable of holding the fluid pressure in the wheel brake cylinder while maintaining the delivery pressure of the pump at a comparatively low level, even if the check valve is provided in the by-pass passage.

The first optional object indicated above may also be achieved according to a second preferred form of this invention, wherein the valve device includes a pressure increase valve and a pressure decrease valve, the pressure increase valve having a supply position for permitting a supply flow of the fluid delivered from the pump into the wheel brake cylinder, and a supply inhibit position for inhibiting the supply flow, the pressure decrease valve having a discharge position for permitting a discharge flow of the fluid from the wheel brake cylinder into the low-pressure source, and a discharge inhibit position for inhibiting the discharge flow, the pump delivery saving device including valve control means for placing the pressure decrease valve in the discharge position and the pressure increase valve in the supply position, in at least a portion of a time period during which the valve device is controlled by the traction controller.

The valve control means may be arranged to place the pressure increase valve in the supply position in at least a portion of a time period during which the pressure decrease valve is placed in the discharge position. Alternatively, the valve control means may be arranged to place the pressure decrease valve in the discharge position in at least a portion of a time period during which the pressure increase valve is placed in the supply position. In the present form of the invention, the pressure increase valve and the pressure decrease valve are placed in the supply and discharge positions, respectively, in at least a portion of the time period during which the valve device is controlled.

In a brake control apparatus including a pressure increase valve and a pressure decrease valve, the fluid pressure in the wheel brake cylinder is generally increased by placing the pressure increase valve in the supply position while the pressure decrease valve is placed in the discharge inhibit position, and the fluid pressure in the wheel brake cylinder is reduced by placing the pressure decrease valve in the discharge position while the pressure increase valve is placed in the supply inhibit position. In the present brake control apparatus according to the second preferred form of this invention as described above, the pressure increase valve and the pressure decrease valves are simultaneously placed in the supply position and the discharge position, respectively, in at least a portion of the time period during which the valve device is controlled.

If the amount of the fluid delivered from the pump to the wheel brake cylinder through the pressure increase valve is smaller than the amount of the fluid discharged from the wheel brake cylinder to the low-pressure source through the pressure decrease valve, the fluid pressure in the wheel brake cylinder is lowered. If, for example, the amount of the fluid which is permitted to flow through the pressure decrease valve is larger than the delivery amount of the pump, the fluid pressure in the wheel brake cylinder can be lowered by holding the pressure increase valve in the supply position and at the same time holding the pressure decrease valve in the discharge position. The fluid pressure in the wheel brake cylinder may be lowered or maintained by alternately placing the pressure decrease valve in the discharge position and discharge inhibit position at a controlled duty ratio. In any case, the fluid delivered from the pump is returned to the pump through the pressure increase and decrease valves. Thus, it is not necessary to return the fluid delivered from the pump to the low-pressure source through a pressure relief valve, as required in the conventional brake control device. Thus, the delivery pressure of the pump is lowered in the present second preferred form of the invention.

The second optional object indicated above may be achieved according to a third preferred form of this invention, wherein the apparatus further comprises enabling and disabling means for enabling and disabling the pump delivery saving device to operate to reduce the delivery pressure of the pump, depending upon fluid temperature information relating to a rise of a temperature of the working fluid.

In the present third preferred form of the invention, the enabling and disabling means determines, on the basis of the fluid temperature information, whether an operation of the pump delivery saving device to reduce the delivery pressure of the pump is permitted or inhibited. In the apparatus according to the principle of the present invention, the operation of the pump delivery saving device may or may not be limited depending upon the fluid temperature information. In this specific preferred form of the invention, the operation of the pump delivery saving device is limited depending upon the temperature of the fluid. For instance, the operation of this device is permitted if the actual temperature of the fluid has been excessively raised or if an excessive rise of the fluid temperature is highly expected. If not, the operation is inhibited. That is, the enabling and disabling means is adapted to enable the pump delivery saving device to operate only where there exist wasteful energy consumption by a motor for operating the pump, and an excessive rise of the fluid temperature, or where there is a high possibility of these wasteful energy consumption and excessive temperature rise. If the apparatus is not provided with the enabling and disabling means, the pump delivery saving device is always operable independently of the fluid temperature, to minimize possible wasting of energy by the pump motor.

The term "fluid temperature information" is interpreted to mean information relating to a rise of the temperature of the fluid, which includes information indicating the actual fluid temperature, information from which the fluid temperature can be estimated, and information indicating a high degree of probability that the fluid temperature will considerably rise in the near future.

For instance, the time of continuation of the operation of the traction controller is considered the information that can be used to estimate the fluid temperature. Further, information relating a specific running condition of the vehicle may be used to estimate the time of continuation of the operation of the traction controller, and can therefore be used as the fluid temperature information.

In the present third preferred form of the present invention wherein the pump delivery saving device is enabled or disabled depending upon the fluid temperature information, a rise of the fluid temperature is reduced or minimized when the operation of the pump delivery saving device is permitted. Therefore, the present brake control apparatus is capable of preventing early deterioration of the fluid, and bubbling or bubbling tendency of the fluid, for example. Usually, gases are dissolved in the fluid whose temperature is below a certain upper limit. When bubbles appear due to a rise of the fluid temperature, the babbles are compressed upon brake application by operation of a brake operating member such as a brake pedal. Thus, the bubbling causes deterioration of the operating feel of the brake operating member. The present apparatus is free from this drawback.

The excessive temperature rise of the fluid is represented, for example, by an amount or rate of increase of the temperature larger than a threshold, or the detected temperature higher than a threshold. These thresholds may be suitably determined depending upon an undesirable phenomenon that should be avoided by enabling the pump delivery saving device to operate.

According to a first advantageous arrangement of the above third preferred form of the invention, the enabling and disabling means includes temperature detecting means for detecting the temperature of the fluid, and first enabling means for enabling the pump delivery saving device to operate, if the temperature of the fluid detected by the temperature detecting means is higher than a predetermined upper limit.

In the above arrangement, the fluid temperature itself is detected. The actual fluid temperature is the most direct information indicative of a rise of the fluid temperature. This arrangement assures higher accuracy of operation of the enabling and disabling means, and prevents an excessive rise of the fluid temperature with higher reliability, than an arrangement wherein the actual fluid temperature is estimated from some other information.

According to a second advantageous arrangement of the third preferred form of this invention, the enabling and disabling means includes time obtaining means for obtaining a length of time relating to continuation of an operation of the traction controller to control the valve device, and second enabling means for enabling the pump delivery saving device to operate, if the length of time obtained by the time obtaining means is longer than a predetermined value.

The length of time relating to the continuation of the operation of the traction controller may be a time during which the traction controller is continuously operated, or a cumulative or total pressure decrease time during which the valve device is placed in the pressure decrease state. Where the valve device also has a pressure hold state for inhibiting the fluid from flowing into and from the wheel brake cylinder, the length of time relating to the continuation of the operation of the traction controller may be a sum of the cumulative pressure decrease time indicated above and a cumulative or total pressure hold time during which the valve device is placed in the pressure hold state, or may be the cumulative pressure hold time.

In the present second advantageous arrangement of the third preferred form of the invention, the pump delivery saving device is enabled to operate if the indicated length of time indicated above exceeds the predetermined value. That is, the actual fluid temperature is estimated on the basis of this length of time, which can be used as the fluid temperature information.

Where a pressure relief valve is provided in a relief passage between the delivery end of the pump and the low-pressure source, the delivery pressure of the pump is raised to a preset relief pressure of the relief valve when the fluid delivered from the pump is returned to the low-pressure source through the relief valve with the valve device placed in the pressure decrease state. In this case, the energy consumption by an electric motor for driving the pump is increased, and the fluid temperature is accordingly raised. Thus, the fluid temperature is likely to rise when the valve device is in the pressure decrease state. When the valve device is in the pressure increase state, on the other hand, the delivery pressure of the pump is considerably lower than the preset pressure of the relief valve, and the amount of the temperature rise is smaller than when the valve device is placed in the pressure decrease state. Hence, it is reasonable to assume that the fluid temperature increases with the cumulative or total pressure decrease time.

Another example of the length of time relating to the continuation of the operation of the traction controller is a total operation time of the traction controller during which the traction controller is held operated to control the valve device. Where the valve device has only the pressure increase state and the pressure decrease state, the total operation time is a sum of the cumulative pressure decrease time and the cumulative pressure increase time, which sum increases with an increase in the cumulative pressure decrease time. Although the cumulative pressure increase time is not so indicative of the fluid temperature rise as the cumulative pressure increase time, the fluid temperature more or less rises as the cumulative pressure increase time increases. Thus, there is a certain degree of correlation between the total operation time of the traction controller and the temperature rise of the working fluid, and the actual fluid temperature may be estimated on the basis of the total operation time.

Where the valve device has also the pressure hold state as indicated above, the temperature rise of the fluid is closely related to a sum of the cumulative pressure decrease time and the cumulative pressure hold time, or the cumulative pressure hold time. Therefore, these parameters may be used as the length of time relating to the continuation of the operation of the traction controller to control the valve device. In this respect, it is noted that the temperature will considerably rise when the fluid is returned to the low-pressure source through the pressure relief valve with the valve device placed in the pressure hold state.

The present second advantageous arrangement is available at a reduced cost than the first advantageous arrangement, because the length of time relating to the continuation of the operation of the traction controller is utilized as the fluid temperature information, and no sensor for detecting the fluid temperature is required.

According to a third advantageous arrangement of the third preferred form of this invention indicated above, the enabling and disabling means includes vehicle state detecting means for determining whether the motor vehicle is in a stuck state in which the vehicle is unable to start with the drive wheel slipping on a road surface, third enabling means for enabling the pump delivery saving device to operate, if the vehicle state detecting means determines that the vehicle is placed in the stuck state.

If the vehicle is in the stuck state, that is, if the vehicle is unable to start with the drive wheel slipping on the road surface, this indicates that there is a high possibility that the fluid temperature will considerably rise in the near future. Explained in detail, when the vehicle is stuck on the road surface, the time of operation of the traction controller to control the valve device tends to be long, and the fluid temperature is likely to rise. When the vehicle is stuck on a muddy road surface and unable to start with the drive wheel slipping on the road surface, the traction control is effected by the traction controller to control the valve device so as to reduce the drive or traction force of the drive wheel for thereby reducing the amount of slip of the drive wheel to an optimum value. In this case, it generally takes a long time before the drive force of the drive wheel has been optimized. Thus, the detection of the stuck state of the vehicle is an indication of high possibility that the fluid temperature will rise in the near future, and can be suitably utilized as the fluid temperature information. The present arrangement does not require an exclusive sensor for detecting the fluid temperature, and is capable of avoiding an excessive rise of the fluid temperature.

According to a fourth preferred form of this invention, the pump delivery saving device includes valve control means for controlling the valve device so as to reduce the delivery pressure of the pump.

According to a fifth preferred form of the invention, the pump delivery saving device includes a delivery saving valve other than the valve device, for reducing the delivery pressure of the pump, and control means for controlling the delivery saving valve.

As indicated above, the pump delivery saving device includes either the valve control means for controlling the valve device so as to reduce the delivery pressure of the pump, or the control means for controlling the delivery saving device (other than the valve device controlled by the traction controller) for reducing the delivery pressure of the pump.

In the former case according to the fourth preferred form of the invention, the valve device may include the first control valve or pressure hold means as provided in the first preferred form of the invention, or the pressure increase valve and pressure decrease valve which are provided in the second preferred form of the invention. The first control valve (pressure hold means) or the pressure increase and decrease valves of the valve device is/are controlled by the valve control means of the pump delivery saving device. This valve control means may be a part of the traction controller, or may be separate control means independent of the traction controller. Where the valve control means is independent of the traction controller, such first control valve or pressure increase and decrease valves is/are controlled by the traction controller to effect the traction control, and also by the pump delivery saving device (valve control means) to reduce the delivery pressure of the pump.

In the latter case according to the fifth preferred form of the invention, the delivery saving device may be a control valve which by-passes a pressure relief valve in a relief passage connecting a master cylinder and the delivery port of the pump, as described below in detail with respect to a seventh preferred form of the invention. In this case, the control means is adapted to control the control valve which by-passes the pressure relief valve.

According to a sixth preferred form of this invention, the apparatus further comprises a master cylinder, a primary fluid passage connecting the master cylinder and the wheel brake cylinder, and anti-lock control means for controlling the valve device during brake application with a pressure of the fluid being applied to the wheel brake cylinder. The low-pressure source includes a primary reservoir for supplying the fluid to the master cylinder. The anti-lock control means is operated to selectively place the valve device in at least the pressure increase state and the pressure decrease state, to control the pressure of the fluid in the wheel brake cylinder so that amount of slip of the drive wheel is held within a predetermined range.

The brake control apparatus according to the principle of the present invention, which requires the traction controller as an essential element, may or may not be provided with the anti-lock control means. The brake control apparatus may be provided with any other means for controlling the pressure of the fluid in the wheel brake cylinder.

The valve control means for controlling the valve device so as to reduce the delivery pressure of the pump according to the fourth preferred form of the invention described above may be incorporated in the anti-lock control means described above. In this case, the delivery pressure of the pump may be reduced by the valve control means of the pump delivery saving device even while the pressure of the fluid in the wheel brake cylinder is controlled in an anti-lock control fashion by the anti-lock control means.

According to a seventh preferred form of this invention, the apparatus further comprises a relief passage connecting the delivery port of the pump and the low-pressure source, and a pressure relief valve provided in the relief passage, and the pump delivery saving device includes a by-pass device for returning the fluid delivered from the pump to the low-pressure source or a suction port of the pump while by-passing the pressure relief valve.

The pressure relief valve is provided between the delivery port of the pump and the low-pressure source, for the purpose of setting the highest fluid pressure in the wheel brake cylinder or preventing the delivery pressure of the pump from exceeding a predetermined highest permissible level. In the presence of the relief valve, an excess amount of the fluid delivered from the pump should be returned to the low-pressure source through the relief valve. In this case, the delivery pressure of the pump is raised to a preset relief pressure of the relief valve.

In view of the above drawback, the by-pass device is preferably provided for returning the fluid delivered from the pump to the primary reservoir (low-pressure source) or to the suction port of the pump. This arrangement reduces the delivery pressure of the pump when the fluid is returned, whereby the energy consumption by a motor for driving the pump may be lowered.

Where the pressure relief valve is provided in the brake control apparatus according to the first and second preferred forms of this invention stated above, the by-pass device includes the first control valve and the valve control means therefor, the pressure hold means, the pressure increase and decrease valves and the valve control means therefor, which have been described.

In one advantageous arrangement of the above seventh preferred form of the invention, the low-pressure source includes a primary reservoir for supplying the fluid to a master cylinder, and the pressure relief valve is provided between the delivery port of the pump and the master cylinder. The by-pass device includes a by-pass control valve which is disposed between the delivery port of the pump and the master cylinder, in parallel connection with the pressure relief valve and a control valve of the valve device, and which has an open position and a closed position. The by-pass device further includes control means for placing the by-pass control valve in the open position to permit the fluid to be returned to the master cylinder through the by-pass control valve.

The traction control operation of the traction controller is usually effected while the wheel brake cylinder is disconnected from the master cylinder. In this condition, an excess amount of the fluid delivered from the pump should be returned to the master cylinder through the pressure relief valve, and the delivery pressure of the pump is inevitably raised to the preset relief pressure of the relief valve.

In the present arrangement wherein the by-pass control valve is provided, the excess amount of the fluid delivered from the pump is returned to the master cylinder through the by-pass control valve placed in the open position. Accordingly, it is not necessary to return the fluid to the master cylinder through the relief valve. Therefore, the delivery pressure of the pump when the fluid is returned to the master cylinder is lowered. In this arrangement, the by-pass control valve is not a part of the valve device for controlling the fluid pressure in the wheel brake cylinder, and is provided exclusively for reducing the delivery pressure of the pump. Unlike the first preferred form of the invention described above, the present arrangement makes it possible to reduce the delivery pressure of the pump, without opening the control valve provided between the master cylinder and the point of connection of the delivery port of the pump to the primary fluid passage.

The present by-pass control valve and control means therefor in the present advantageous arrangement of the seventh preferred form of the invention are included in the delivery saving device and the control means according to the fifth preferred form of the invention described above.

In the above advantageous arrangement, the apparatus may further comprise a primary fluid passage connecting the wheel brake cylinder and the master cylinder, a pump passage connecting the primary fluid passage and the delivery port of the pump, and a check valve which is disposed in a portion of the pump passage between the by-pass control valve and a point of connection of the pump passage to the primary fluid passage. The check valve permits a flow of the fluid therethrough in a first direction from the pump toward the primary fluid passage and inhibiting a flow of the fluid therethrough in a second direction opposite to the first direction.

In the presence of the check valve in the pump passage, a discharge flow of the fluid from the wheel brake cylinder is prevented by the check valve, and the fluid pressure in the wheel brake cylinder is not lowered, even when the by-pass control valve is placed in the open position. In this case, the fluid pressure in the wheel brake cylinder can be maintained without alternately opening and closing the by-pass control valve or the control valve of the valve device at a controlled duty ratio.

According to one feature of the advantageous arrangement of the first preferred form of the invention described above, the low-pressure source includes a secondary reservoir in addition to the primary reservoir, and the valve device further includes a third control valve disposed in a reservoir passage which connects the secondary reservoir and the wheel brake cylinder. The third control valve has an open position for connecting the secondary reservoir and the wheel brake cylinder, and a closed position for disconnecting the secondary reservoir and the wheel brake cylinder. In this instance, the pressure hold means indicated above is adapted to place the first control valve alternately in the open and closed positions at a controlled duty ratio while the third control valve is held in the closed position.

The traction control operation of the traction controller is effected while the first control valve is placed in the closed position. When the second and third control valves are placed in the open and closed positions, respectively, the fluid delivered from the pump is supplied to the wheel brake cylinder through the second control valve, so as to increase the fluid pressure in the wheel brake cylinder. When the second and third control valves are placed in the closed and open positions, respectively, the fluid is discharged from the wheel brake cylinder to the secondary reservoir through the third control valve, and the fluid pressure in the wheel brake cylinder is lowered. When the second and third control valves are both placed in the closed position, the fluid is neither supplied to nor discharged from the wheel brake cylinder, whereby the fluid pressure in the wheel brake cylinder remains unchanged.

When the first control valve is switched to the open position while the second and third control valves are both closed, the fluid is not discharged from the wheel brake cylinder to the secondary reservoir, but is returned to the master cylinder through the check valve in the by-pass passage and the first control valve. Thus, it is not possible to maintain the fluid pressure in the wheel brake cylinder if the first control valve is opened to reduce the delivery pressure of the pump, even when the second and third control valves are both closed. In the light of this fact, the first control valve is alternately opened and closed at a controlled duty ratio while the third control valve is held closed, so as to reduce the delivery pressure of the pump while maintaining the fluid pressure in the wheel brake cylinder.

Although the pressure hold means may be adapted to alternately open and close the third control valve in the arrangement of the first preferred form of the invention, the pressure hold means according to the present feature of the invention is adapted to alternately open and close the first control valve, without alternately opening and closing the third control valve or without holding the third control valve in the open position.

According to an eighth preferred form of the present invention, the apparatus further comprises a master cylinder, a primary fluid passage connecting the master cylinder and the wheel brake cylinder, a reservoir passage connected to the wheel brake cylinder, and the low-pressure source includes a primary reservoir for supplying the fluid to the master cylinder, and a secondary reservoir connected to the reservoir passage. The pump is connected at a delivery port thereof to the primary fluid passage, and the valve device includes a first control valve disposed in a portion of the primary fluid passage between the master cylinder and a point of connection of the delivery port of the pump to the primary fluid passage, a second control valve disposed in a portion of the primary fluid passage between the point of connection and the wheel brake cylinder, and a third control valve disposed in the reservoir passage connecting the wheel brake cylinder and the secondary reservoir. The first control valve has an open position for connecting the master cylinder and the delivery port of the pump to each other and a closed position for disconnecting the master cylinder and the delivery port from each other. The second control valve has an open position for connecting the first control valve and the wheel brake cylinder to each other and a closed position for disconnecting the first control valve and the wheel brake cylinder from each other. The third control valve has an open position for connecting the wheel brake cylinder and the secondary reservoir to each other and a closed position for disconnecting the wheel brake cylinder and the secondary reservoir from each other. In this case, the pump delivery saving device includes valve control means for placing both the second and third control valves in the open position in at least a portion of a time period during which the first control valve is held in the closed position.

When the valve device is controlled by the traction controller, the second and third control valves are placed in the open and closed positions, respectively, while the first control valve is placed in the closed position. When the second and third control valves are both open, the fluid delivered from the pump is returned to the suction side of the pump through the second and third control valves. Thus, the delivery pressure of the pump can be reduced, while the first control valve is held in the closed position.

The present eighth preferred form of the invention is applicable to return the fluid from the delivery port of the pump back to the suction port, during anti-lock control of the fluid pressure in the wheel brake cylinder effected while the first control valve is closed.

The second control valve in the present eighth preferred form may function as the pressure increase valve in the second preferred form of the invention described above. Similarly, the first and second third control valves may function as the pressure decrease valve. Alternatives, the first and second control valves may function as the pressure increase valve, while the third control valve may function as the pressure decrease valve. In any case, the pressure increase valve and the pressure decrease valves in the second preferred form of the invention should include the second and third control valves in the present eighth preferred form, respectively, irrespective of whether the first control valve is included in either or none of the pressure increase and decrease valves.

In one advantageous arrangement of the above eighth preferred form of the invention, the control means includes pressure hold means for placing said third control valve selectively in said open and closed positions at a controlled duty ratio while said second control valve is held in said open position.

When the first, second and third control valves are placed in the closed, open and closed positions, respectively, the fluid delivered from the pump is supplied to the wheel brake cylinder, but the fluid is not discharged from the wheel brake cylinder, whereby the fluid pressure in the wheel brake cylinder is increased. When the second and third control valves are both placed in the open position, the fluid delivered from the pump is supplied to the wheel brake cylinder, while the fluid is discharged from the wheel brake cylinder to the secondary reservoir, whereby the fluid pressure in the wheel brake cylinder is lowered. Accordingly, the delivery pressure of the pump can be reduced while the fluid pressure in the wheel brake cylinder is maintained, by alternately placing the third control valve in the open and closed positions at the controlled duty ratio with the second control valve placed in the open position, while the third control valve is held in the closed position.

According to one advantageous arrangement of the second preferred form of this invention described above, the valve control means includes pressure hold means for placing the pressure decrease valve selectively in the discharge position and the discharge inhibit position at a controlled duty ratio while the pressure increase valve is held in said supply position.

When the pressure increase valve is placed in the supply position while the pressure decrease valve is placed in the discharge inhibit position, the fluid delivered from the pump is supplied to the wheel brake cylinder, but the fluid is not discharged from the wheel brake cylinder, whereby the fluid pressure in the wheel brake cylinder is increased. When the pressure increase valve and the pressure decrease valve are placed in the supply and discharge positions, restrictively, the fluid discharged from the wheel brake cylinder is returned to the low-pressure source together with the fluid delivered from the pump, whereby the fluid pressure in the wheel brake cylinder is reduced. In the present advantageous arrangement of the second preferred form of the invention, the delivery pressure of the pump can be reduced while the pressure in the wheel brake cylinder is maintained, as in the advantageous arrangement of the eighth preferred form of the invention described above.

According to a ninth preferred form of this invention, the apparatus further comprises a relief passage connecting the delivery port of the pump and the low-pressure source, and a pressure relief valve provided in the relief passage, and the pump delivery saving device includes a fluid circulating circuit for returning the fluid delivered from the pump to a suction port of the pump while by-passing the pressure relief valve.

In the present form of the invention wherein the fluid circulating circuit is provided, the fluid delivered from the pump is returned to the suction side of the pump, without flowing through the relief valve, whereby the delivery pressure of the pump can be reduced. The fluid circulating circuit may be incorporated in the by-pass device according to the seventh preferred form of the invention described above.

According to a tenth preferred form of this invention, the apparatus further comprises a master cylinder, a primary fluid passage connecting the master cylinder to the wheel brake cylinder, and a secondary fluid passage for connecting the master cylinder to a secondary reservoir, and the low-pressure source includes a primary reservoir for supplying the master cylinder, and the secondary reservoir. In this form of the invention, the apparatus further comprises a reservoir filling valve device which is provided in the secondary fluid passage and which has an open position for connecting the master cylinder and the secondary reservoir to each other and a closed position for disconnecting the master cylinder and the secondary reservoir from each other.

Immediately after the traction control by the traction controller is initiated, the fluid pressure in the wheel brake cylinder is equal to the atmospheric pressure, and no fluid is accommodated in the secondary reservoir in some cases. That is, the secondary reservoir may be vacant upon initiation or during the traction control operation, while the fluid delivered from the pump should be supplied to the wheel brake cylinder. In view of this possibility, the reservoir filling valve device is provided in the secondary fluid passage, so that this valve device is opened to supply the fluid from the master cylinder (i.e., from the primary reservoir) to the secondary fluid passage to which the suction port of the pump and the secondary reservoir are connected. The fluid thus supplied to the secondary fluid passage through the reservoir filling valve device may be fed into the secondary reservoir or may be pressurized by the pump for delivery of the pressurized fluid to the wheel brake cylinder.

In one advantageous arrangement of the above tenth preferred form of the invention, the reservoir filling valve device includes a fourth control valve for opening and closing the secondary fluid passage, and the traction controller includes valve control means for opening the fourth control valve upon initiation of a traction control operation to control the valve device.

When the fourth control valve is opened upon initiation of the traction control, the fluid is supplied from the master cylinder to the secondary fluid passage through the fourth control valve, so that the fluid is pumped up by the pump and delivered to the wheel brake cylinder. The fourth control valve may permit the fluid to be returned from the secondary reservoir to the master cylinder.

In another advantageous arrangement of the above tenth preferred form of this invention, the reservoir filling valve device includes a pressure relief valve which is normally placed in a closed position and is opened when a pressure of the fluid in the master cylinder becomes higher than a pressure of the fluid in the secondary reservoir by more than a predetermined amount.

In a further advantageous arrangement of the same form of the invention, the reservoir filling valve device includes an in-flow control valve which is closed when an amount of the fluid in the secondary reservoir is larger than a predetermined value and is opened when the amount of the fluid in the secondary reservoir is smaller than the predetermined value.

The above two arrangements are adapted so that the fluid is supplied from the master cylinder to the secondary reservoir when the pressure or amount of the fluid in the secondary reservoir becomes lower or smaller than a certain limit. In these arrangements, however, the fluid cannot be returned from the secondary reservoir back to the master cylinder through the pressure relief valve or in-flow control valve.

According to an eleventh preferred form of this invention, the apparatus further comprises a pump passage connecting a suction port of the pump and the low-pressure source, and the pump delivery saving device includes a pump suction control valve which is disposed in the pump passage and which has an open position for connecting the suction port of the pump and the low-pressure source to each other and a closed position for disconnecting the suction port and the low-pressure source from each other. The pump delivery saving device further includes valve control means for placing the pump suction control valve in the closed position.

With the pump suction control valve placed in the open position, the fluid in the low-pressure source is pressurized by the pump, and the pressurized fluid delivered from the pump is supplied to the wheel brake cylinder. When the pump suction control valve is switched to the closed position, the pump is operated without delivering the pressurized fluid to the wheel brake cylinder, whereby there is produced no excess or surplus amount of the fluid delivered from the pump. Accordingly, the delivery pressure of the pump is accordingly lowered.

The pump suction control valve may be a part of the valve device. Alternatively, the pump suction control valve may be provided as a valve separate from the valve device, for the purpose of reducing the delivery pressure of the pump. In other words, the pressure control valve or second control valve indicated above may be used as the pump suction control valve, or may be provided in addition to the first, second and third control valves and the pressure increase and decrease valves which have been described above.

In the case where valve device incorporates the pump suction control valve such that the valve device is placed in the pressure increase and decrease states when the pump suction control valve is placed in the open and closed positions, respectively, the delivery pressure of the pump is always held at a reduced level. Namely, the pump delivery saving device is always operated.

According to an advantageous arrangement of the first preferred form of the invention described above, the pressure hold means includes pressure determining means for determining a level at which the fluid pressure in the wheel brake cylinder is maintained, on the basis of a sum of a cumulative pressure increase time during which the fluid pressure in the wheel brake cylinder is increased, and a cumulative pressure decrease time during which the fluid pressure in the wheel brake cylinder is decreased. In this arrangement, the pressure hold means further includes duty ratio determining means for determining the duty ratio of the first control valve on the basis of the sum. This arrangement is also applicable to the pressure decrease valve in the advantageous arrangement of the second preferred form of the invention, and to the third control valve in the advantageous arrangement of the eighth preferred form of the invention.

The current fluid pressure in the wheel brake cylinder can be estimated on the basis of the cumulative or total pressure increase time plus the cumulative or total pressure decrease time of the wheel brake cylinder. Thus, the level at which the fluid pressure in the wheel brake cylinder is maintained by duty-controlling the first control valve (pressure decrease valve or third control valve) can be determined on the basis of the sum of the cumulative pressure increase and decrease times. The duty ratio of the valve is determined such that the pressure increase time increases with an increase in the desired fluid pressure to be maintained.

Although the current fluid pressure in the wheel brake cylinder can be detected by a pressure sensor, the present arrangement is capable of estimating the current fluid pressure without using such a pressure sensor, and is available at an accordingly reduced cost.

In the second advantageous arrangement of the third preferred form of the invention described above, the time obtaining means may be adapted to obtain an operating time of the pump during the operation of the traction controller.

The fluid temperature rises with an increase in the cumulative pump operating time. When the pump is held operated throughout the operation of the traction controller, the pump operating time is equal to the traction control time.

According to a twelfth preferred form of the invention, the pump delivery saving device is adapted to reduce the delivery pressure of the pump while the valve device is placed in the pressure decrease state. Where a pressure relief valve is provided between the delivery port of the pump and the low-pressure source, the fluid delivered from the pump is generally required to be returned to the low-pressure source through the relief valve while the valve device is in the pressure decrease state. In this case, the pump delivery pressure is raised to the relief pressure of the relief valve. To avoid this increase of the delivery pressure of the pump, the pump delivery saving device according to the present arrangement is adapted to reduce the pump delivery pressure while the valve device is placed in the pressure decrease state. Where the valve device further has a pressure hold state, the pump delivery saving device may be adapted to reduce the pump delivery pressure also when the valve device is placed in the pressure hold state. However, the pump delivery pressure is desirably reduced at least when the valve device is in the pressure decrease state.

According to a thirteenth preferred form of this invention, the traction controller includes mode selecting means for selectively establishing one of a pressure increase mode, a pressure decrease mode and a pressure hold mode for increasing, decreasing and holding the fluid pressure in the wheel brake cylinder, and pump delivery saving device is operated to reduce the delivery pressure of the pump when at least one of the pressure decrease and hold modes is established by the mode selecting means.

In the present form of the invention, the pump delivery saving device is operated depending upon the currently selected or established mode of the traction controller, rather than the currently selected position of the valve device. More specifically, the pump delivery saving device is operated when the traction controller is placed in at least one of the pressure decrease and hold modes, which corresponds to the time period during which the valve device is placed in a state other than the pressure increase state.

The principal object indicated above may also be achieved according to a fourteenth preferred form of the present invention, wherein the apparatus further comprises a master cylinder, a primary fluid passage connecting the master cylinder and the wheel brake cylinder, a secondary fluid passage connecting the master cylinder and the low-pressure source, a reservoir communication valve provided in the secondary fluid passage and having an open position for connecting the master cylinder and the low-pressure source to each other and a closed position for disconnecting the master cylinder and the low-pressure source from each other, a relief passage connecting the master cylinder and a point of connection of the primary fluid passage to a delivery port of the pump, a pressure relief valve provided in the relief passage, and anti-lock control means means for controlling the valve device so as to control the pressure of the fluid in the wheel brake cylinder so that amount of slip of the wheel is held within a predetermined range. In the present preferred form of the invention, the valve device includes a master cylinder cut valve provided in the primary fluid passage and having an open position and a closed position for connecting and disconnecting the master cylinder to and from the point of connection, respectively, and a brake cylinder control valve device provided in a portion of the primary fluid passage between the master cylinder cut valve and the wheel brake cylinder. The brake cylinder control valve device includes at least a pressure increase state for permitting the fluid to be fed into the wheel brake cylinder and a pressure decrease state for permitting the fluid to be discharged from the wheel brake cylinder into the low-pressure source. The point of connection of the primary fluid passage to the delivery port of the pump is located between the master cylinder cut valve and the brake cylinder control valve device, and the pump is provided in a pump passage which connects the point of connection and the low-pressure source. The anti-lock control means is adapted to selectively place the brake cylinder control valve device in at least the pressure increase state and the pressure decrease state while the master cylinder cut valve and the reservoir communication valve are held in the open and closed positions, respectively. On the other hand, the traction control means is adapted to selectively place the brake cylinder control valve device in at least the pressure increase state and the pressure decrease state while the master cylinder cut valve and the reservoir communication valve are held in the closed and open positions, respectively. In this form of the invention, the pump delivery saving device is adapted to reduce the delivery pressure of the pump in at least a portion of a time period during which the brake cylinder control valve device is placed in a state other than the pressure increase state.

The brake cylinder control valve device may have a pressure hold state other than the pressure increase and decrease states.

The pressure increase and decrease states of the brake cylinder control valve device may be established by placing it in respective pressure increase and decrease positions thereof. In this case, the brake cylinder control valve device may be brought to the pressure increase and decrease states without an influence of the master cylinder cut valve or other valve. Alternatively, the brake cylinder control valve device may be brought to the pressure increase and decrease states and to another state (other than the pressure increase and decrease states) as described below, by placing the master cylinder cut valve in the open and closed positions, for example. In this case, the brake cylinder control valve device is influenced by the master cylinder cut valve.

For example, the brake cylinder control valve device may be arranged as follows: When the brake cylinder control valve device is placed in the pressure increase position while the master cylinder cut valve is placed in the closed position, the brake cylinder control valve device is placed in the pressure increase state in which the fluid can flow into the wheel brake cylinder. When the master cylinder cut valve is brought to the open position in this condition, the fluid can be discharged from the wheel brake cylinder to an intermediate portion of the primary fluid passage between the master cylinder cut valve and the brake cylinder control valve device. Thus, the brake cylinder control valve device may be switched between the pressure increase state and another state by placing the master cylinder cut valve in the closed and open positions while the brake cylinder control valve device is held in the pressure increase position.

The fluid discharged from the wheel brake cylinder to the intermediate portion of the primary fluid passage is returned to a primary reservoir for the master cylinder. In the present fourteen preferred form of the invention, the master cylinder is provided with the primary reservoir, while a secondary reservoir is provided as the low-pressure source. Therefore, "another state" indicated above should be distinguished from the pressure decrease state, and will be referred to as "fluid discharge state".

It will be understood that the master cylinder cut valve is one form of the first control valve provided in the first preferred form of the invention indicated above. The brake cylinder control valve device may include the second shut-off valve provided in the first advantageous arrangement of the first preferred form of the invention, and a check valve.

While the brake cylinder control valve device which is influenced by the master cylinder cut valve has been described above, the brake control apparatus may be arranged such that the brake cylinder control valve device is influenced by a valve other than the master cylinder cut valve and the reservoir communication valve, as described below by reference to FIGS. 19 and 20.

In the present fourteen preferred form of the invention, the pump delivery saving device is adapted to reduce the delivery pressure of the pump in at least a portion of the time period during which the brake cylinder control valve device is placed in a state other than the pressure increase state. If the brake cylinder control valve device has only the pressure increase and decrease positions, the pump delivery pressure is reduced in at least a portion of the time period during which the brake cylinder control valve device is placed in the pressure decrease state.

If the brake cylinder control valve device has the fluid discharge state ("another state" other than the pressure increase and decrease states) as described above, the pump delivery pressure may be reduced by the pump delivery saving device, in at least a portion of the time period during which the brake cylinder control valve device is placed in the fluid discharge state. In this fluid discharge state, the pump delivery pressure may be reduced even if the brake cylinder control valve device is placed in its pressure increase position.

If the brake cylinder control valve device has the pressure hold state other than the pressure increase and decrease states, the pump delivery saving device may be adapted to reduce the pump delivery pressure in at least a portion of the time period during which the brake cylinder control valve device is placed in the pressure hold state.

While the pump delivery saving device may be completely independent of the traction control means, a part or entirety of the pump delivery saving device may be provided by the traction control means. In this respect, it is noted that the pump delivery saving device is usually operated during an operation of the traction control means.

In the brake control apparatus according to the fourteenth preferred form of the invention as described above, the master cylinder cut valve and the reservoir communication valve are normally placed in the open and closed positions, respectively, while the brake cylinder control valve device is normally placed in the pressure increase state, so that the fluid pressurized by the master cylinder may be fed into the wheel brake cylinder through the master cylinder cut valve and the brake cylinder control valve device.

During the anti-lock control, the brake cylinder control valve device is alternately placed in at least the pressure increase and decrease states while the master cylinder cut valve and the reservoir communication valve are held in the open and closed positions, respectively, whereby the fluid pressure in the wheel brake cylinder is controlled so that the amount of slip (slip speed or slip ratio) of the wheel is held within a predetermined optimum range.

While the brake cylinder control valve device is placed in the pressure decrease state, the fluid is discharged from the wheel brake cylinder through the brake cylinder control valve device. While the brake cylinder control valve device is placed in the pressure increase state, the fluid pressurized by the master cylinder is fed into the wheel brake cylinder through the master cylinder cut valve and the brake cylinder control valve device. Further, the fluid discharged into to the low-pressure source is pressurized by the pump, and the pressurized fluid is returned to the master cylinder (or its reservoir). With the brake cylinder control valve device placed in the pressure increase state, the fluid from the master cylinder is primarily supplied to the wheel brake cylinder, and an excess amount of the fluid is returned to the master cylinder. In the pressure decrease or hold state, the fluid is returned by the pump to the master cylinder.

During the traction control, the brake cylinder control valve device is alternately placed in at least the pressure decrease and increase states while the master cylinder cut valve and the reservoir communication valve are held in the closed and open positions, respectively, whereby the fluid pressure in the wheel brake cylinder is controlled so that the amount of slip of the drive wheel is held within an optimum range.

While the brake cylinder control valve device is placed in the pressure increase position, the pump receives the fluid from the master cylinder through the reservoir communication valve, and the fluid pressurized by the pump is supplied to the wheel brake cylinder through the pump passage, intermediate portion of the primary fluid passage and brake cylinder control valve device. An excess amount of the fluid fed to the wheel brake cylinder is returned to the master cylinder.

While the brake cylinder control valve device is placed in the pressure decrease state, the fluid is discharged from the wheel brake cylinder into the low-pressure source through the brake cylinder control valve device. The fluid discharged to the low-pressure source is pumped by the pump and is returned to the intermediate portion of the primary fluid passage between the master cylinder cut valve and the brake cylinder control valve device.

In the pressure decrease state of the brake cylinder control valve device, the fluid returned to the intermediate portion of the primary fluid passage may be fed to the wheel brake cylinder. If the master cylinder cut valve is held in the closed position during the traction control as in the known brake control apparatus, the fluid cannot be returned to the master cylinder through the closed master cylinder cut valve. Therefore, the fluid should be returned to the master cylinder through the pressure relief valve. This causes a rise of the delivery pressure of the pump to the predetermined relief pressure of the pressure relief valve, and a consequent increase in the load which acts on the electric motor for driving the pump.

Where the brake cylinder control valve device has the pressure hold state, the pump receives the fluid from the master cylinder through the secondary fluid passage and delivers the pressurized fluid to the intermediate portion of the primary fluid passage, even when the pump does not receive the fluid discharged from the wheel brake cylinder. The fluid received by the pump from the master cylinder should also be returned to the master cylinder through the pressure relief valve. Accordingly, the load on the pump motor is further increased.

The relief pressure of the pressure relief valve is set at a level higher than the maximum pressure that is applied to the wheel brake cylinder during the traction control. While the brake cylinder control valve device is placed in the pressure increase state, however, the required delivery pressure of the pump is only slightly higher than the pressure in the wheel brake cylinder, even with the flow resistance of the fluid passages taken into account. Consequently, the delivery pressure of the pump is usually lower than the relief pressure of the pressure relief valve.

While the brake cylinder control valve is placed in the pressure decrease state or any state other than the pressure increase state, on the other hand, the excess fluid should be returned to the master cylinder through the pressure relief valve as long as the master cylinder cut valve is held closed. In this condition, the required delivery pressure of the pump is higher than the relief pressure of the relief valve, and the pump motor load is accordingly increased.

In the present fourteenth preferred form of the invention, the pump delivery saving device is operated to reduce the delivery pressure of the pump in at least a portion of the time period during which the brake cylinder control valve device is placed in any state other than the pressure increase state.

For instance, the delivery pressure of the pump may be reduced by returning the fluid delivered from the delivery port of the pump to the master cylinder without the fluid passing through the pressure relief valve, namely, by by-passing the pressure relief valve. In this case, the delivery pressure of the pump need not be higher than the relief pressure of the relief valve.

The fluid delivered from the pump may be returned to the secondary reservoir or to the suction port of the pump, rather than to the master cylinder or primary reservoir.

In one advantageous arrangement of the above fourteenth preferred form of the present invention, the pump delivery saving device includes means for placing the master cylinder cut valve in the open position to reduce the delivery pressure of the pump.

In another advantageous arrangement of the fourteenth preferred form of the invention, the brake cylinder control valve device includes a check valve provided in a by-pass passage which connects the wheel brake cylinder and the point of connection of the primary fluid passage. The check valve permits a flow of the fluid in a first direction from the wheel brake cylinder toward the point of connection, and inhibits a flow of the fluid in a second direction opposite to the first direction. In this case, the pump delivery saving device comprises pressure hold means for placing at least the master cylinder cut valve alternately in the open and closed positions, at a controlled duty ratio, so as to maintain the pressure of the fluid in the wheel brake cylinder at a substantially constant level. The duty control of the master cylinder cut valve makes it possible to maintain the fluid pressure in the wheel brake cylinder even where the brake cylinder control valve device includes the check valve.

The principal object indicated above may also be achieved according to a fifteenth preferred form of this invention wherein the apparatus further comprises a master cylinder, a primary fluid passage connecting the master cylinder and the wheel brake cylinder, a master cylinder cut valve provided in the primary fluid passage, a by-pass passage which by-passes the master cylinder cut valve, and a check valve provided in the by-pass passage. The master cylinder cut valve has an open position and a closed position for connecting and disconnecting the master cylinder to and from a point of connection of the primary fluid passage to a delivery port of the pump. The check valve permits a flow of the fluid in a first direction from the master cylinder toward the wheel brake cylinder, and inhibits a flow of the fluid in a second direction opposite to the first direction.

In the above form of the invention, the provision of the check valve makes it possible to avoid an increase in the size of the master cylinder cut valve, and minimize a delay of brake application to the wheel upon depression of the brake pedal while the master cylinder cut valve is placed in the closed position.

The master cylinder cut valve is normally placed in the open position with its solenoid being de-energized and with its spool being spaced apart from the valve seat. Upon energization of the solenoid, the spool is seated on the valve seat to place the valve in the closed position. In this closed position, the pressure in a portion of the primary fluid pressure on the side of the master cylinder acts on the valve spool in a direction for forcing the valve spool against the valve seat. If there is present a relatively large pressure difference across the master cylinder cut valve (between the upstream and downstream portions of the primary fluid passage with respect to the master cylinder cut valve), the biasing force of the spring required to move the valve spool away from the valve seat against a force based on the pressure difference upon de-energization of the solenoid should be relatively large. Accordingly, the size of the solenoid whose force should overcome the relatively large biasing force of the spring should be accordingly increased. Thus, the master cylinder cut valve is undesirably large-sized.

In view of the above drawback, the present preferred form of the invention uses the check valve provided in the by-pass passage which by-passes the master cylinder cut valve. The check valve permits the fluid in the master cylinder to be applied also to the portion of the primary fluid passage downstream of the master cylinder cut valve even when the master cylinder cut valve is placed in the closed position. Consequently, the check valve is effective to reduce the pressure difference across the master cylinder cut valve, thereby making it possible to avoid an increase in the size of the master cylinder cut valve.

If the brake pedal is depressed when the master cylinder cut valve is placed in the closed position, it takes a relatively long time for the master cylinder cut valve to be switched to its open position, due to the relatively large pressure difference across this valve. This causes a delay in the brake application to the wheel. However, the present brake control apparatus is free from this drawback, owing to the provision of the check valve through which the pressure in the master cylinder is also applied to the downstream side of the master cylinder cut valve, so as to reduce the pressure difference across this valve. Thus, the check valve permits the master cylinder cut valve to be quickly brought to its open position, thus preventing the otherwise possible brake application delay.

BRIEF DESCRIPTION OF THE DRAWINGS

The above and other objects, features, advantages and technical significance of the present invention will be better understood by reading the following detailed description of presently preferred embodiments of the invention, when considered in connection with the accompanying drawings, in which:

FIG. 11 is a table stored in the read-only memory of the solenoid/motor control computer, which represents predetermined relationships between anti-lock brake control modes and respective combinations of the operating states of four solenoid-operated shut-off valves;

FIG. 12 is a the stored in the read-only memory of the solenoid/motor control computer, which represents predetermined relationships between the normal traction control modes and respective combinations of the operating states of the solenoid-operated shut-off valves;

FIG. 13 is a table stored in the read-only memory of the solenoid-motor control computer, which represents the pump delivery saving traction control modes and respective combinations of the operating states of the shut-off valves;

FIG. 18 is a table stored in the read-only memory of the solenoid/motor control computer, which represents a predetermined relationship between the pump delivery saving traction control modes and respective combinations of the operating states of the shut-off valves provided in the brake system of FIG. 17;

FIG. 20 is a table stored in the read-only memory of the solenoid/motor control computer, which represents a predetermined relationship between the pump delivery saving traction control modes and respective combinations of the operating states of the shut-off valves provided in the brake system of FIG. 19;

FIG. 22 is a table stored in the read-only memory of the solenoid/motor control computer, which represents a predetermined relationship between the pump delivery saving traction control modes and respective combinations of the operating states of the shut-off valves, according to the seventh embodiment;

FIG. 24 is a table stored in the read-only memory of the solenoid/motor control computer, which represents a predetermined relationship between the pump delivery saving traction control modes and respective combinations of the operating states of the shut-off valves provided in the brake system of FIG. 23.

DETAILED DESCRIPTION OF THE PREFERRED EMBODIMENTS

Figure 1:
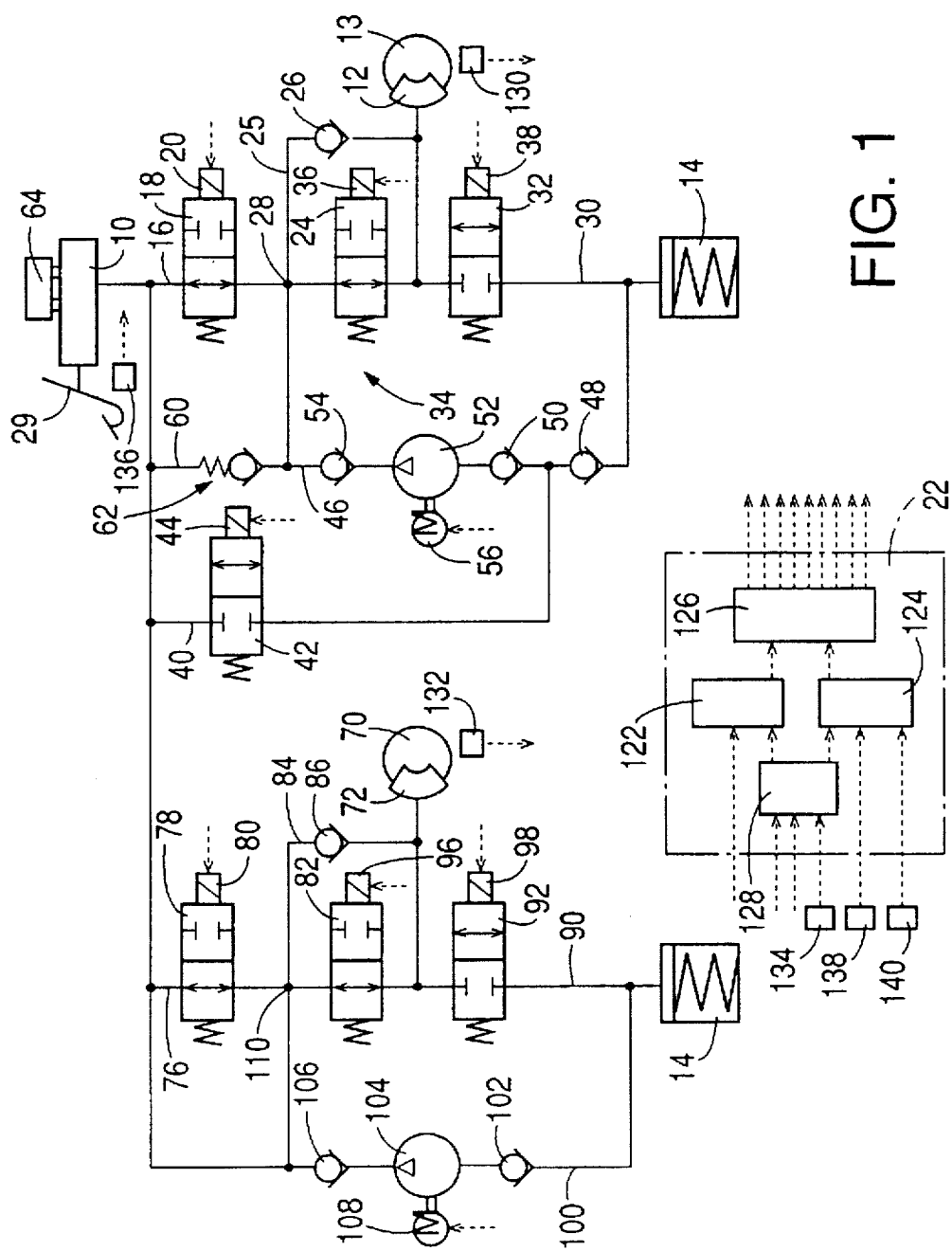
FIG. 1 is a schematic view illustrating a motor vehicle brake system provided with a brake control apparatus of the present invention constructed according to a first embodiment of this invention.

Referring first to FIG. 1, there is shown a brake system of a motor vehicle including a master cylinder 10, a wheel brake cylinder 12 for braking a drive wheel 13, and a low-pressure source in the form of a secondary reservoir 14. The drive wheel 13 shown is one of right and left drive wheels of the vehicle, and each drive wheel is provided with the wheel brake cylinder 12.

The master cylinder 10 is connected to the wheel brake cylinder 12 by a primary fluid passage 16 in which there is provided a first control valve in the form of a first solenoid-operated shut-off valve 18 which has a solenoid 20. The shut-off valve 18 is normally placed in an open position indicated in FIG. 1 for fluid communication between the master cylinder 10 and the wheel brake cylinder 12. With the solenoid 20 energized, the shut-off valve 18 is brought to a closed position for disconnecting the primarily fluid passage 16. The solenoid 20 is controlled by a hydraulic control device 22, which will be described.

In a portion of the primary fluid passage 16 between the wheel brake cylinder 12 and the first shut-off valve 18, there is provided a control valve in the form of a second solenoid-operated shut-off valve 24. A by-pass passage 25 is provided in parallel connection with the second shut-off valve 24, so as to by-pass the shut-off valve 24. The by-pass passage 25 has a check valve 26, and is connected at one end to the wheel brake cylinder 12 and at the other end 28 to an intermediate portion of the primary fluid passage 16 between the first and second shut-off valves 18, 24.

The check valve 26 allows a flow of a working fluid in a direction from the wheel brake cylinder 12 toward the end 28 of the by-pass passage 25 (toward the intermediate portion of the passage 16), and inhibits a flow of the fluid in the opposite direction. The by-passage 25 and check valve 26 are provided for rapidly returning the pressurized fluid from the wheel brake cylinder 12 to the master cylinder 10 at the end of brake application to the drive wheel 13 or traction control of the drive wheel 13. The by-pass passage 25 and check valve 26 also function to return the fluid from the Wheel brake cylinder 12 to the master cylinder 10 when a brake pedal 29 which has been depressed is released during anti-lock control of a fluid pressure in the wheel brake cylinder 12.

A third control valve in the form of a third solenoid-operated shut-off valve 32 is provided in a reservoir passage 30 which connects the wheel brake cylinder 12 and the secondary reservoir 14.

The second shut-off valve 24 and the third shut-off valve 32 are provided with respective solenoids 36, 38. The second shut-off valve 24 is normally placed in an open position of FIG. 1, and is brought to a closed position when the solenoid 36 is energized. The third shut-off valve 32 is normally placed in a closed position of FIG. 1, and is brought to an open position when the solenoid 38 is energized. The first, second and third shut-off valves 18, 24, 32 and check valve 26 cooperate to constitute a major part of a valve device 34 for controlling the fluid pressure in the wheel brake cylinder 12. This valve device 34 is normally placed in a pressure increase state in which the fluid is permitted to be fed into the wheel brake cylinder 12. When the hydraulic control device 22 is placed in an anti-lock control mode or a traction control mode, the solenoids 20, 36, 38 are appropriately controlled by the control device 22 through respective driver circuits, so that the valve device 34 is placed selectively in the pressure increase state, a pressure decrease state and a pressure hold state, as described below.

In the present embodiment, the shut-off valve 18 serves as a master cylinder cut valve, while the shut-off valves 24, 32 and check valve 26 serve as a brake cylinder control valve device. The master cylinder cut valve has an open position for connection of the master cylinder 10 to the brake cylinder control valve device 24, 32, 26 and a closed position for disconnecting the master cylinder 10 from the brake cylinder control valve device. The brake cylinder control valve device 24, 32, 26 has a pressure increase state, a pressure decrease state and a pressure hold state. The pressure increase state is established when the shut-off valves 24 and 32 are placed in the open and closed positions, respectively. The pressure decrease state is established when the shut-off valves 24 and 32 are placed in the closed and open positions, respectively. The pressure hold state is established when the shut-off valves 24 and 32 are both placed in the closed position. In the anti-lock control mode, the fluid pressure in the wheel brake cylinder 12 is increased, decreased and maintained when the brake cylinder control valve device 24, 32 is placed in the pressure increase state, pressure decrease state and pressure hold state, respectively. In the traction control mode, however, these pressure increase, decrease and hold states of the brake cylinder control valve device 24, 32, 26 do not necessarily correspond to the pressure increase, decrease and hold states of the wheel brake cylinder 12. For instance, when the master cylinder cut valve 18 is switched to the open position while the brake cylinder control valve device 24, 32, 26 is placed in the pressure increase state, the check valve 26 permits the fluid to be discharged from the wheel brake cylinder 12.

The master cylinder 10 and the secondary reservoir 14 are connected to each other also by a secondary fluid passage 40 in which is provided a fourth control valve in the form of a fourth solenoid-operated shut-off valve 42 having a solenoid 44. The shut-off valve 42 serves as a reservoir communication valve as is apparent from the following description. The shut-off valve 42 is normally placed in a closed position indicated in FIG. 1, and is brought to an open position upon energization of the solenoid 44.

The primary fluid passage 16 is connected to the secondary reservoir 14 by a pump passage 46 in which are provided two check valves 48, 50, a pump 52 and another check valve 54. The pump passage 46 has a delivery portion and a suction portion. The delivery portion is connected at one end to the delivery port of the pump 52 and at the other end 28 to the portion of the primary fluid passage 16 between the shut-off valves 18 and 24. The suction portion is connected at one end to the suction port of the pump 52 and at the other end to the secondary reservoir 14. It will be understood that reference numeral 28 denotes the delivery end of the pump passage 46 and the end of the by-pass passage 25, at which the passages 46, 25 are connected to the primary fluid passage 16. The pump 52 is driven by an electric motor 56, which is operated through a driver circuit controlled by the hydraulic control device 22.

The check valve 48 has a relatively low opening pressure at which it is opened. This check valve 48 is provided to prevent lowering of the fluid in the wheel brake cylinder 12 below the atmospheric pressure, which would occur due to suction of the fluid from the wheel brake cylinder 12 by the pump 52 during a time period between the termination of a traction control operation (which will be described) and a complete stop of the motor 56.

The master cylinder 10 is connected to the delivery end 28 of the pump passage 46 by a relief passage 60 in which there is provided a pressure relief valve 62. The pressure relief valve 62 functions to limit the fluid pressure at the delivery end 28 of the pump passage 46 during the traction control of the drive wheel 13. When the fluid pressure at the delivery end 28 is higher than a relief pressure of the relief valve 62, the pressurized fluid is returned to the master cylinder 10 through the relief valve 62. In this respect, it is noted that the fluid pressure to be applied to the brake wheel cylinder 12 during the traction control need not to be higher than the relief pressure of the relief valve 62.

Thus, the fluid pressure in the master cylinder 10 is held lower than that in the brake wheel cylinder 12 during the traction control. In this sense, the master cylinder 10 is considered as a low-pressure source during the traction control. The master cylinder 10 is supplied with the working fluid from a primary reservoir or master reservoir 64. The primary reservoir 64 is considered as a permanent low-pressure source, since the pressure in the primary reservoir 64 is always lower than that in the wheel brake cylinder 12. Thus, both the secondary reservoir 14 and the primary reservoir 64 may be considered as a low-pressure source. When the valve device 34 is in the pressure decrease state, the fluid in the wheel brake cylinder 12 is returned to the secondary reservoir 14 under a certain condition, and to the primary reservoir 64 under another condition. Further, only the secondary reservoir 14 may be considered as the low-pressure source.

The master cylinder 10 is also connected to a wheel brake cylinder 72 of a driven wheel 70 through another primary fluid passage 76. A solenoid-operated shut-off valve 78 is provided in the primary fluid passage 76. The shut-off valve 78 has a solenoid 80 which is energized or de-energized by a driver circuit controlled by the hydraulic control device 22. The driven wheel 70 is one of right and left driven wheels of the vehicle, and each driven wheel is provided with the wheel brake cylinder 72.

In a portion of the primary fluid passage 76 between the wheel brake cylinder 72 and the shut-off valve 78, there is provided a solenoid-operated shut-off valve 82. A by-pass passage 84 is provided in parallel connection with the shut-off valve 82, so as to by-pass the shut-off valve 82. The by-pass passage 84 is provided with a check valve 86. In a fluid passage 90 between the wheel brake cylinder 72 and the secondary reservoir 14, there is provided a shut-off valve 92. The shut-off valves 82, 92 have respective solenoids 96, 98 which are controlled by the hydraulic control device 22 through respective driver circuits.

A pump passage 100 is connected to the secondary reservoir 14, in parallel connection with the shut-off valves 82, 92. A check valve 102, a pump 104 and a check valve 106 are provided in the pump passage 100. The pump 104 has a delivery port connected to an intermediate portion 110 of the primary fluid passage 76 between the shut-off valves 78, 82. That is, the delivery end of the pump passage 100 is connected to the intermediate portion 110. The pump 104 is driven by an electric motor 108.

The traction control of the driven wheel 70 is not effected. Therefore, valves corresponding to the pressure relief valve 62 and shut-off valve 42 which are provided for the wheel brake cylinder 12 for the drive wheel 13 are not provided for the wheel brake cylinder 72 for the driven wheel 70.

The hydraulic control device 22 incorporates a plurality of computers including an anti-lock control computer 122, a traction control computer 124, a solenoid/motor control computer 126, and an arithmetic computer 128. To an input portion of the arithmetic computer 128, there are connected wheel speed sensors 130, 132 and a vehicle speed sensor 134. The arithmetic computer 128 incorporates a read-only memory (ROM) which stores various control programs such as a wheel slip ratio calculating program, a vehicle speed calculating program and a vehicle acceleration calculating program. The anti-lock control computer 122 and traction control computer 124 are connected to an output portion of the arithmetic computer 128, so that the computers 122, 124 may receive the slip ratios of the wheels 13, 70 and vehicle speed and acceleration, which are calculated by the arithmetic computer 128.

The anti-lock control computer 122 has an input portion adapted to receive an output signal of a brake switch 136 as well as the output signals of the arithmetic computer 128, and an output portion connected to the solenoid/motor control computer 126. The anti-lock control computer 122 incorporates a read-only memory (ROM) which stores control programs such as a program for executing a routine (not shown) for determining an anti-lock control mode in which the fluid pressures in the wheel brake cylinders 12, 72 are controlled.

Figure 9:
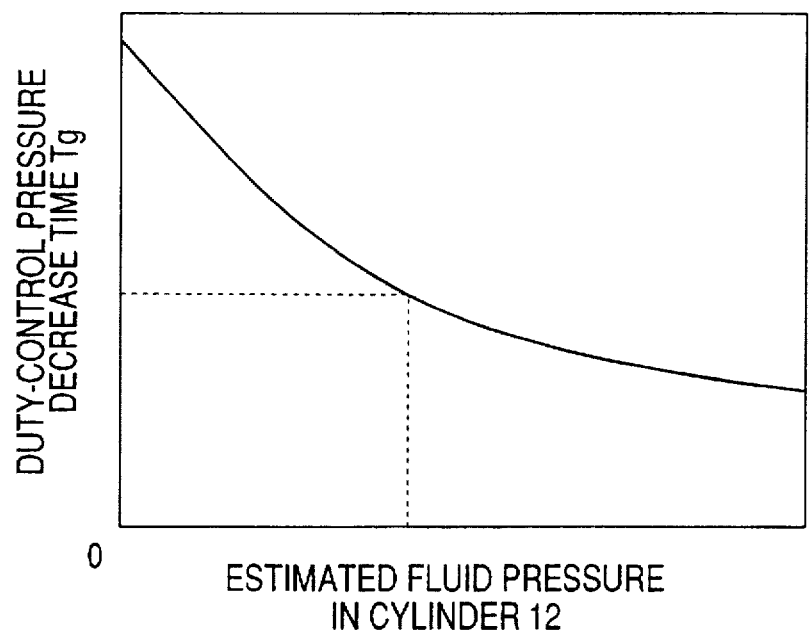
FIG. 9 is a graph indicating a predetermined relationship represented by a data map stored in a read-only memory of the traction control computer, for determining a duty-control decrease time of a shut-off valve provided in the brake system of FIG. 1.

The traction control computer 124 has an input portion adapted to receive output signals of an accelerator switch and a temperature sensor 140 as well as the output signals of the arithmetic computer 128. To an output portion of the traction control computer 124, there is connected the solenoid/motor computer computer 126. The traction control computer 124 incorporates a read-only memory (ROM) which stores various control programs such as a program for executing a routine illustrated in the flow chart of FIG. 7, for determining a traction control mode (in which the fluid pressure in the wheel brake cylinder 12 for each of the drive wheels 13 is controlled). The ROM of the traction control computer 124 also stores a data map representative of a predetermined relationship between a duty-control pressure decrease time Tg and an estimated fluid pressure, as indicated in the graph of FIG. 9.

The traction control mode and the anti-lock control mode are determined on the basis of the wheel slip ratios and vehicle speed and acceleration.

The solenoid/motor control computer 126 is adapted to control the solenoids 20, 36, 38, 44, 80, 96 and 98 of the shut-off valves 18, 24, 32, 78, 82, 92, and the motors 56, 108 for the pumps 52, 104, in the anti-lock control mode and the traction control mode which are determined by the respective computers 122, 124. These solenoids and motors are connected to an output portion of the control computer 126 through respective driver circuits. The control computer 126 incorporates a read-only memory (ROM) which stores various programs such as a program for executing a solenoid control routine illustrated in the flow chart of FIG. 8, and a motor control program. The ROM of the computer 126 also stores tables as indicated in FIGS. 11–13, which represent predetermined relationships between the control modes and respective combinations of the operating states of the four solenoid-operated valves 18, 24, 38, 42.

The wheel speed sensors 130, 132 function to detect the rotating speeds of the wheels 13, 70, and the vehicle speed sensor 134 is a Doppler-effect type ground speed sensor. The running speed of the vehicle is calculated according to a vehicle speed calculating routine, on the basis of the output signal of the vehicle speed sensor 134. The vehicle speed calculating routine may be modified to estimate the vehicle speed on the basis of the wheel speeds detected by the wheel speed sensors 130, 132.

The output signal of the brake switch 136 is used to determine whether the brake pedal 29 is depressed, and the output signal if the accelerator switch 138 is used to determine whether an accelerator pedal is depressed.

The temperature sensor 140 is disposed in the vicinity of the delivery port of the pump 52, to detect the temperature of the working fluid within the pump passage 46. In this respect, it is noted that the pump 52 is one of the components of an actuator assembly for effecting the traction control of the drive wheels 13.

There will be described operations of the brake system constructed as described above.

Normally, the first through fourth solenoid-operated shut-off valves 18, 24, 32 and 42 for the drive wheels 13 and the solenoid-operated shut-off valves 78, 82, 92 for the driven wheels 70 are placed in the original positions of FIG. 1.

When the brake pedal 29 is depressed by a vehicle operator, the fluid pressurized by the master cylinder 10 is fed to the wheel brake cylinder 12 through the first and second shut-off valve 18, 24, and to the wheel brake cylinder 72 through the shut-off valves 78, 82, whereby the brakes 13, 70 are braked on the basis of the fluid pressures in the wheel brake cylinders 12, 72. When the brake pedal 29 is released, the fluid in the wheel brake cylinder 12 is returned to the master cylinder 10 partly through the shut-off valves 24, 18, and partly through the check valve 26 and shut-off valve 18. Similarly, the fluid in the wheel brake cylinder 72 is returned to the master cylinder 10 partly through the shut-off valves 82, 78, and partly through the check valve 86 and shut-off valve 78.

The anti-lock control of the fluid pressures in the wheel brake cylinders 13 or 72 is initiated when the predetermined anti-lock control initiating conditions are satisfied. These conditions include a condition that at least one of the drive wheels 13 or driven wheels 70 has a locking tendency (with the slip ratio larger than a predetermined limit) while the brake pedal 29 is in a depressed position. The anti-lock control for the drive wheels 13 and the anti-lock control for the driven wheels 70 are effected independently of each other by the anti-lock control computer 122. There will be described an anti-lock control operation of the drive wheels 13, by way of example.

The anti-lock control computer 122 first determines or selects one of four anti-lock control modes as indicated in the table of FIG. 11. The four anti-lock control modes consist of a pressure increase mode, a pressure decrease mode, a pressure hold mode and a terminate mode. The anti-lock control computer 122 commands the solenoid/motor control computer 126 to control the solenoids 20, 36, 38, 44 and motor 56 in the selected anti-lock control mode. The anti-lock control mode determining routine (not shown) is executed by the anti-lock control computer 122 with a cycle time of 5 ms, while the solenoid control routine of FIG. 8 is executed by the solenoid/motor control computer 126 with a shorter cycle time, for example, 1 ms.

Figure 8:
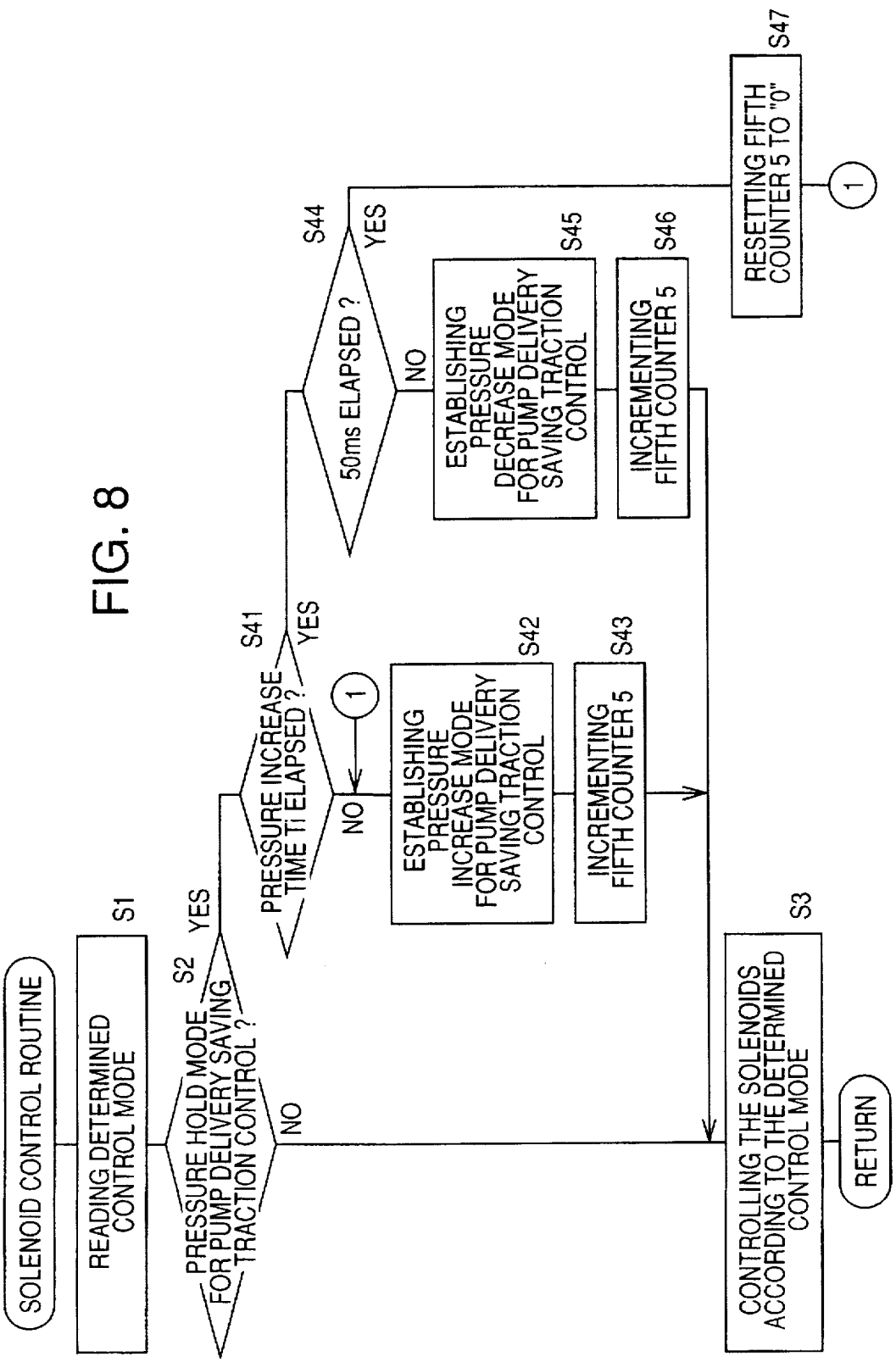
FIG. 8 is a flow chart illustrating a solenoid control routine stored in the read-only memory of a solenoid/motor control computer of the brake control apparatus.

The solenoid control routine of FIG. 8 is initiated with step S1 to read the control mode determined by the anti-lock control computer 122 or traction control computer 124. Step S1 is followed by step S2 to determine whether the determined control mode is a pressure hold mode selected in pump delivery saving traction control of the drive wheel 13 (which will be described). Since this pressure hold mode is selected only in the pump delivery saving traction control, a negative decision (NO) is obtained in step S2 during an anti-lock control operation, and the control flow goes to step S3 in which the solenoids 20, 26, 38, 44 are controlled in the control mode which was read in step S1.

The anti-lock control modes are established by appropriately opening or closing the first, second, third and fourth solenoid-operated shut-off valves 18, 24, 32 and 42 as indicated in the table of FIG. 11, that is, by appropriately de-energizing or energizing the solenoids 20, 26, 38, 44. The motor 56 is controlled according to a suitable control program. Briefly described, the motor 56 is turned on upon starting of the anti-lock control operation with the pressure decrease mode or pressure hold mode being initially established, and is turned off a predetermined time after the anti-lock control computer 122 commands the solenoid/motor control computer 126 to terminate the anti-lock control operation. The motor 56 remains operated during this predetermined time for the purpose of returning the entire fluid in the secondary reservoir 14 back to the master cylinder 10.

During the anti-lock control, the solenoids 20, 44 are held de-energized to keep the shut-off valve 18 open, and keep the shut-off valve 42 closed, as indicated in the table of FIG. 11.

When the pressure decrease mode is established during the anti-lock control, the solenoids 36, 38 are energized to close the shut-off valve 24 and open the shut-off valve 32, as also indicated in FIG. 11. As a result, the valve device 34 is placed in the pressure decrease state, so that the fluid in the wheel brake cylinder 12 is discharged into the secondary reservoir 14 through the shut-off valve 32, to reduce the pressure in the brake cylinder 12.

When the pressure increase mode is established during the anti-lock control, the solenoids 36, 38 are de-energized to open the shut-off valve 24 and close the shut-off valve 32. As a result, the valve device 34 is placed in the pressure increase state, so that the fluid pressurized by the master cylinder 10 is fed into the wheel brake cylinder 12 through the shut-off valves 18, 24, to increase the pressure in the brake cylinder 12.

When the pressure hold mode is established during the anti-lock control, the solenoid 36 is energized while the solenoid 38 is de-energized, to close both of the shut-off valves 24, 32. As a result, the valve device 34 is placed in the pressure hold state, so that the fluid flows into and from the wheel brake cylinder 12 are inhibited, to maintain the pressure in the cylinder 12 at the present level.

The terminate mode is established when an anti-lock control operation is terminated.

During the anti-lock control operation, the motor 56 is kept operated to keep the pump 52 operated to suck the fluid from the secondary reservoir 14. When the valve device 34 is placed in the pressure increase state, the pressurized fluid delivered from the pump 52 is supplied to the wheel brake cylinder 12, and a surplus of the delivered fluid is returned to the master cylinder 10. When the valve device 34 is placed in the pressure decrease or hold state, the fluid delivered from the pump 52 is entirely returned to the master cylinder 10.

There will next be described traction control operations performed by the traction control computer and the solenoid/motor control computer 126. A traction control operation is initiated when a predetermined condition is satisfied, that is, when at least one of the drive wheels 13 has an excessively high slipping tendency while the accelerator pedal is depressed. In the present embodiment of the invention, there are selectively available two types of traction control, namely, normal traction control, and pump delivery saving traction control. The pump delivery saving traction control is permitted or selected when any one of predetermined conditions is satisfied as described below. If any of the predetermined conditions is not satisfied, the normal traction control is selected and effected.

The normal traction control is similar to a traction control operation generally known in the art.

In the normal traction control, four control modes as indicated in the table of FIG. 12 are available. When one of these control modes is selected by the traction control computer 124 according to the routine of FIG. 7, the solenoids 20, 36, 38, 44 are controlled in the selected mode according to the routine of FIG. 8. As is apparent from the table of FIG. 12, the solenoids 20, 44 are held in the energized state, to keep the shut-off valve 18 closed and keep the shut-off valve 42 open, during the normal traction control. The motor 56 is turned on upon starting of the traction control operation with the pressure increase mode being initially established, and is turned off a predetermined time after the traction control computer 124 commands the solenoid/motor control computer 126 to terminate the normal traction control operation. As described above with respect to the anti-lock control operation, this predetermined time is provided to return the fluid from the secondary reservoir 14 to the master cylinder 10.

Figure 3:
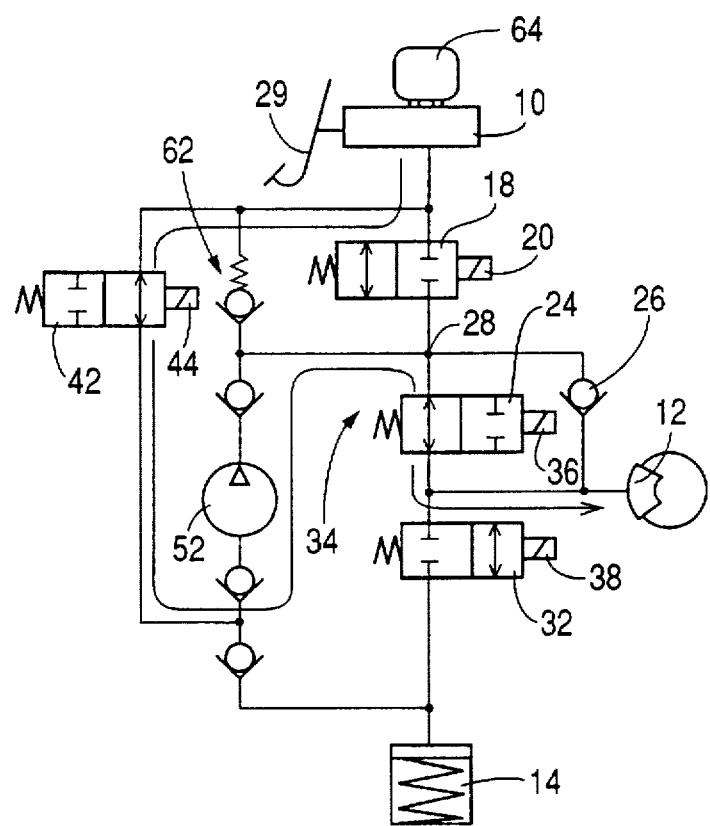
FIG. 3 is a schematic view showing the brake system when the brake control apparatus is placed in a pressure increase mode during normal traction control of the vehicle.

When the pressure increase mode is selected in the normal traction control, the first through fourth shut-off valves 18, 24, 32, 42 are placed in the positions indicated in FIG. 3. That is, the valve device 34 is placed in the pressure increase state. In this pressure increase state, the solenoids 36, 38 are held de-energized to keep the shut-off valve open and keep the shut-off valve 32 closed, while the fluid in the master cylinder 10 is sucked through the shut-off valve 42 by the pump 52 to feed the thus pressurized fluid to the wheel brake cylinder 12 through the pump passage 46 (delivery end 28) and the shut-off valve 24.

In the normal pressure increase mode, the delivery pressure of the pump 52 is slightly higher than the pressure in the wheel brake cylinder 12, by an amount determined by taking into account the resistance to a flow of the fluid from the pump 52 to the cylinder 12. In the present embodiment, the amount of the fluid which can flow through the shut-off valve 24 is determined to be larger than the delivery amount of the pump 52, and the relief pressure of the pressure relief valve 62 is made sufficiently higher than the highest fluid pressure to be applied to the wheel brake cylinder 12. According to this arrangement, the delivery pressure of the pump 52 will not exceed the relief pressure of the pressure relief valve 62, so that the fluid delivered by the pump 52 is substantially entirely fed to the wheel brake cylinder 12.

If the relief pressure of the pressure relief valve 62 is set to be equal or close to the highest fluid pressure to be applied to the wheel brake cylinder 12, the delivery pressure of the pump 52 may be higher than the relief pressure in the normal pressure increase mode. Described in detail, in the case where the pressure in the wheel brake cylinder 12 should be raised to a level close to the relief pressure of the relief valve 62, there is only a small difference between the pressure at the delivery end 28 of the pump passage 46 and the pressure in the wheel brake cylinder 12, whereby the amount of the fluid fed into the cylinder 12 is reduced and may be smaller than the delivery amount of the pump 52. In this condition, therefore, the delivery pressure of the pump 56 may reach the relief pressure even with the shut-off valve 24 held open, and a portion of the fluid delivered from the pump 52 may be returned to the master cylinder 10 through the relief valve 62.

If the delivery amount of the pump 52 is set to be larger than the amount of the fluid which can flow through the shut-off valve 24, the entire amount of the fluid delivered from the pump 52 is not supplied to the wheel brake cylinder 12, that is, a portion of the fluid delivered from the pump 52 is returned to the master cylinder 10 through the pressure relief valve 62, even when the shut-off valve 24 is held open.

However, the above setting of the relief pressure of the relief valve 62 or the above setting of the delivery amount of the pump 52 is necessary to maximize the relief pressure of the relief valve 62 or maximize the rate of increase of the pressure in the wheel brake cylinder 12. Therefore, an increase in the energy consumption by the motor 56 due to the operation of the pump 52 when its delivery pressure exceeds the relief pressure is not considered wasteful.

Figure 4:
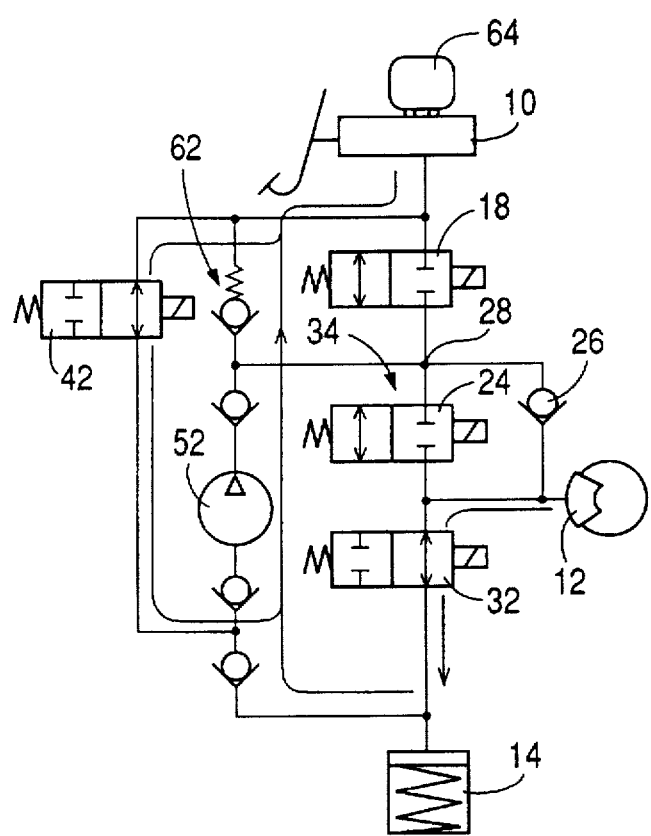
FIG. 4 is a schematic view showing the brake system when the brake control apparatus is placed in a pressure decrease mode during the normal traction control.

When the pressure decrease mode is selected in the normal traction control, the valve device 34 is placed in the pressure decrease state with the shut-off valve 24 being closed while the shut-off valve 32 being open, as indicated in FIG. 4. In this pressure decrease state, the fluid is discharged from the wheel brake cylinder 12 into the secondary reservoir 14, while the fluid in the reservoir 14 is sucked up by the pump 52.

In the condition of FIG. 4 wherein the shut-off valves 18 and 24 are closed, the delivery pressure of the pump 52 should be higher than the relief pressure of the relief valve 62 so that the fluid delivered from the pump 52 may be returned to the master cylinder 10 through the relief valve 62. Further, a portion of the fluid in the secondary reservoir 14 is returned to the master cylinder 10 through the shut-off valve 42 placed in the open position. In this condition, the brake cylinder control valve 24, 32 is placed in the pressure decrease state to reduce the pressure in the wheel brake cylinder 12.

Figure 5:
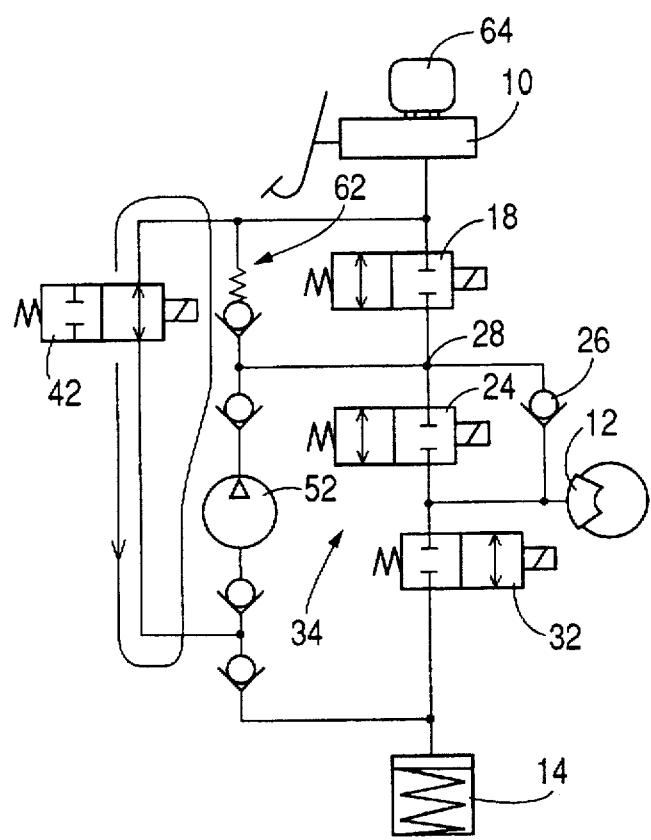
FIG. 5 is a schematic view showing the brake system when the brake control apparatus is placed in a pressure hold mode during the normal traction control.

When the pressure hold mode is selected in the normal traction control, the valve device 34 is placed in the pressure hold state with the shut-off valves 24, 32 being both closed, as shown in FIG. 5. In the pressure hold state, the flows of the fluid into and from the wheel brake cylinder 12 through the shut-off valves 24, 32 are inhibited, while the pump 52 is held operated so that the fluid in the master cylinder 10 is sucked up by the pump 52 through the secondary fluid passage 40 and is returned to the master cylinder 10 through the pump passage 46 and relief passage 60. For the fluid to flow through the relief valve 62, the delivery pressure of the pump 52 is made higher than the relief pressure of the relief valve 62. Accordingly, a discharge flow of the fluid from the wheel brake cylinder 12 to the intermediate portion 28 of the primary fluid passage 16 through the check valve 26 is inhibited, whereby the pressure in the cylinder 12 is maintained. In this condition, the brake cylinder control valve 24, 32 is placed in the pressure hold state to maintain the pressure in the wheel brake cylinder 12.

As described above, the pump 52 should be kept operated to return the fluid to the master cylinder through the pressure relief valve 62 when the pressure decrease or hold mode is established during the normal traction control operation. This requirement results in an increased load on the motor 56, leading to wasteful energy consumption of the motor 56.

It is also noted that if the delivery pressure of the pump 52 is kept at a high level for a long period of time, the temperature of the fluid is raised, and the fluid is accordingly deteriorated. Further, gases normally dissolved in the fluid tend to appear as bubbles as the fluid temperature is raised. To avoid this problem, the present embodiment of the invention is arranged such that the traction control is effected with reduced delivery pressure of the pump 52, that is, the pump delivery saving traction control is effected, on the basis of information which indicates a rise of the temperature of the working fluid.

As described below by reference to the flow chart of FIG. 7, the terminate mode is established when a traction control operation is terminated.

In the pump delivery saving traction control, the solenoids 20, 36, 38, 44 are controlled in traction control modes as indicated in the table of FIG. 13.

When the pressure increase mode is selected in the pump delivery saving traction control, the solenoids are controlled in the same manner as in the pressure increase mode in the normal traction control. That is, the shut-off valve 18 is closed, and the fluid in the reservoir 14 is returned by the pump 52 to the wheel brake cylinder 12, so as to increase the pressure in this cylinder 12.

Figure 2:
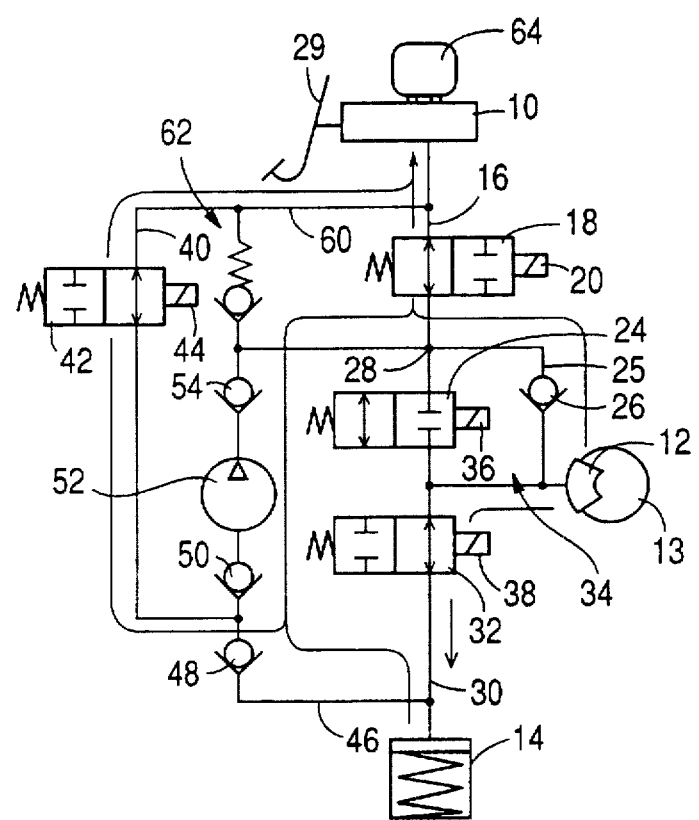
FIG. 2 is a schematic view showing a part of the brake system of FIG. 1 when the brake control apparatus is placed in a pressure decrease mode during pump delivery saving traction control of vehicle.

When the pressure decrease mode is selected in the pump delivery saving traction control, the shut-off valves 18 and 32 are opened while the shut-off valve 24 is closed, as indicated in FIG. 2. The fluid in the wheel brake cylinder 12 is discharged into the secondary reservoir 14 through the shut-off valve 32, and the fluid in the reservoir 14 is returned by the pump 52 to the master cylinder through the pump passage 46, intermediate portion 28 of the primary fluid passage 28 and shut-off valve 18. Since the shut-off valve 18 is open, the fluid pressure at the delivery end 28 of the pump passage 46 is lower than that in the wheel brake cylinder 12, so that the fluid in the cylinder 12 is returned to the master cylinder through the check valve 26 and shut-off valve 18. Namely, the fluid flow from the cylinder 10 to the master cylinder 10 while by-passing the relief valve 62.

In the pressure decrease mode during the pump delivery saving traction control, it is not necessary to return the fluid from the wheel 12 to the master cylinder 10 through the pressure relief valve 62, since the shut-off valve 18 is placed in the open position. Therefore, the delivery pressure of the pump 52 can be lowered, whereby the energy consumption by the motor 56 for the pump 52 can be accordingly reduced, and an excessive rise of the fluid temperature can be avoided.

When the pressure hold mode is selected in the pump delivery saving traction control, the shut-off valve 18 is alternately opened and closed at a controlled duty ratio while the shut-off valves 24 and 32 are held open and closed, respectively.

If the shut-off valve 18 is held open, the fluid in the wheel brake cylinder 12 is discharged through the check valve 26 to the intermediate portion 28, even if the shut-off valves 24, 32 are both closed. That is, as long as the shut-off valve 18 is open, the pressure in the wheel brake cylinder 12 is made lower than the fluid pressure at the delivery end 28 of the pump passage 46, and the fluid is discharged from the cylinder 12 through the check valve 26. Therefore, the pressure in the cylinder 12 cannot be maintained, if the shut-off valve 18 is held open.

Figure 6:
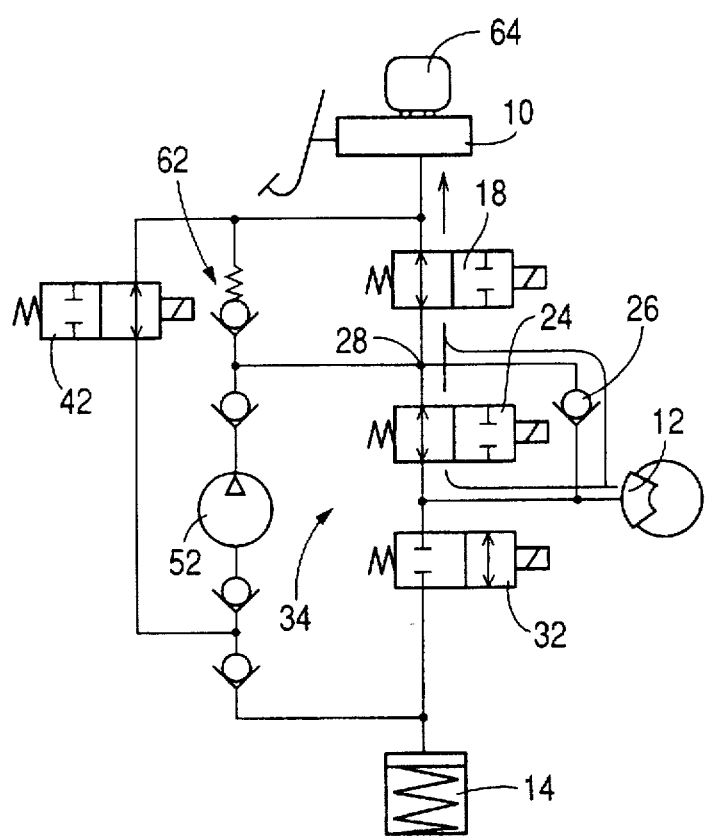
FIG. 6 is a schematic view showing the brake system when the brake control apparatus is placed in a pressure hold mode during the pump delivery saving traction control.

In view of the above fact, the shut-off valve 18 is alternately placed in the pressure increase or closed position of FIG. 3 and the pressure decrease or open position of FIG. 6, at the duty ratio determined in the manner as described below. When the valve 18 is in the pressure increase position, the valve device 34 is placed in the same pressure increase state as established in the normal traction control, so that the fluid delivered from the pump 52 is supplied to the wheel brake cylinder 12 to increase the pressure in the cylinder 12. When the valve 18 is switched to the pressure decrease position while the shut-off valves 24 and 32 are held open and closed, respectively, as indicated in FIG. 6, the fluid is partly returned from the cylinder 12 to the master cylinder 10 through the check valve 26 and shut-off valve 18, and is partly returned to the master cylinder 10 through the shut-off valves 24, 18, so that the fluid pressure in the cylinder 12 is reduced.

Thus, in the pump delivery saving traction control, the pressure in the wheel brake cylinder 12 is maintained by alternately closing and opening the shut-off valve 18 at the controlled duty ratio while the shut-off valves 24, 32 are held open and closed, respectively.

With the shut-off valve 18 operated at the controlled duty ratio, the delivery pressure of the pump 52 is reduced. Described more specifically, when the valve device 34 is placed in the pressure increase state of FIG. 3 during the duty control of the shut-off valve 18, the fluid pressure applied to the wheel brake cylinder 12 is lower than the relief pressure of the pressure relief valve 62, and the delivery pressure of the pump 52 will not exceed the relief pressure, as described above with respect to the pressure increase mode in the normal traction control. When the valve device 34 is placed in the pressure decrease state during the duty control of the shut-off valve 18, the delivery pressure of the pump 52 does not exceed the relief pressure of the relief valve 62, either, because the shut-off valve 18 is open. It will therefore be understood that the required delivery pressure of the pump 52 is substantially equal to the fluid pressure in the wheel brake cylinder 12.

It is also noted that the fluid pressure in the wheel brake cylinder 12 can be maintained at a substantially constant level, by merely alternately opening and closing the valve 18 at the controlled duty ratio, that is, without switching the shut-off valves 24, 32.

There will next be described the manner of determination of the duty ratio of the shut-off valve 18.

The duty ratio of the shut-off valve 18 is determined on the basis of the fluid pressure in the wheel brake cylinder 12, which is estimated from time to time. In the present embodiment which does not has a pressure sensor for detecting the pressure in the cylinder 12, the pressure in the cylinder 12 is estimated on the basis of a cumulative or total pressure increase time and a cumulative or total pressure decrease time.

The cumulative pressure increase time is the total time during which the pressure in the cylinder 12 has been raised in the pressure increase mode in the normal traction control or pump delivery saving traction control after the initiation of the traction control operation. This total pressure increase time is a sum of the total pressure increase time in the normal traction control and the total pressure increase time in the pump delivery saving traction control. Similar, the cumulative pressure decrease time is the total time during which the pressure in the cylinder 12 has bee lowered in the pressure decrease mode in the normal traction control or pump delivery saving traction control after the initiation of the traction control operation. This total pressure decrease time is a sum of the total pressure decrease time in the normal traction control and the total pressure decrease time in the pump delivery saving traction control.

Assuming that the rate of increase and the rate of decrease of the pressure in the wheel brake cylinder 12 during the traction control of the drive wheel 13 are substantially equal to each other, the fluid pressure in the cylinder 12 is estimated to be equal to the atmospheric pressure (pressure prior to the initiation of the traction control) if the cumulative pressure increase time and the cumulative pressure decrease time are substantially equal to each other.

In the present embodiment, it is also assumed for simplification that the rate of decrease of the pressure in the cylinder 12 in the normal traction control is equal to that in the pump delivery saving traction control.

If the first assumption indicated above is not met, the duty ratio of the shut-off valve 18 may be determined on the basis of the cumulative pressure increase time and cumulative pressure decrease time which are multiplied by respective coefficients which correspond to the different rates of pressure increase and decrease. If the second assumption indicated above is not met, the cumulative pressure decrease times in the normal and pump delivery saving traction controls are multiplied by respective coefficients corresponding to the different rates of pressure decrease, and the thus obtained sum is used to determine the duty ratio.

A difference obtained by subtracting the cumulative pressure decrease time from the cumulative pressure increase time is considered to be an effective pressure increase time. If the above assumptions are met, it is considered that the fluid pressure in the wheel brake cylinder 12 increases with an increase in the effective pressure increase time, according to a given relationship. This relationship between the fluid pressure in the cylinder 12 and the effective pressure increase time is stored as a data map in the ROM of the traction control computer 124. The fluid pressure in the wheel brake cylinder 12 is estimated on the basis of the effective pressure increase time and according to the predetermined relationship stored in the ROM. This pressure is referred to as "estimated fluid pressure" of the wheel brake cylinder 12.

On the basis of the estimated fluid pressure of the wheel brake cylinder 12, a duty-control pressure decrease time Tg during which the shut-off valve 18 is held in the pressure decrease position of FIG. 6 is determined according to a predetermined relationship as indicated in the graph of FIG. 9. This relationship is also stored as a data map in the ROM of the traction control computer 124. As is apparent from the graph of FIG. 9, the duty-control pressure decrease time Tg of the shut-off valve 18 decreases with an increase in the estimated fluid pressure of the cylinder 12. In this respect, it is noted that the amount of the fluid which is discharged from the cylinder 12 per unit time increases with an increase of the fluid pressure.

Figure 10:
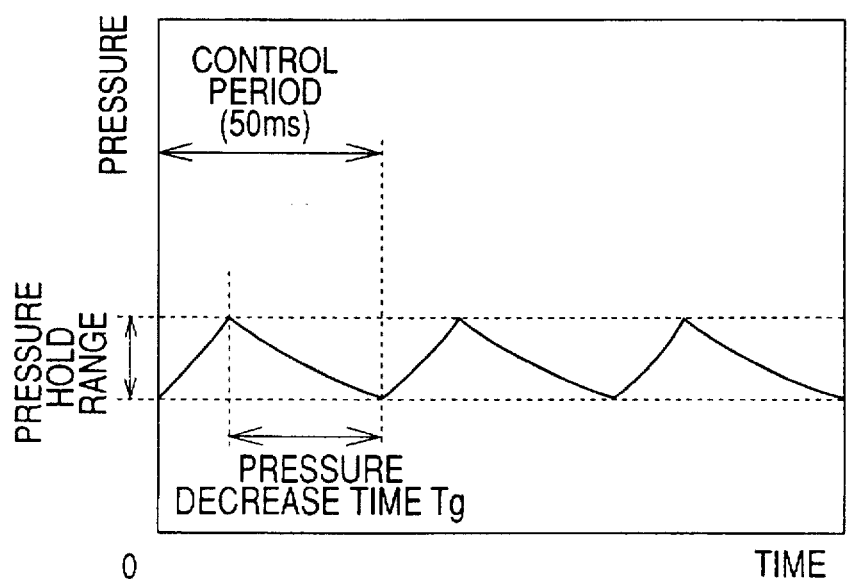
FIG. 10 is a graph showing a change in wheel brake cylinder in the pressure hold mode during the pump delivery saving traction control.

In the present embodiment wherein the control period in the pressure hold mode during the pump delivery saving traction control is 50 ms, a pressure increase time Ti during which the shut-off valve 18 is held in the pressure increase position of FIG. 3 is equal to (50 ms–Tg). With the shut-off valve 18 controlled at the thus determined duty ratio, the amount of fluid flow into the cylinder 12 is substantially equal to the amount of fluid flow from the cylinder 12, and the fluid pressure in the cylinder 12 may be maintained substantially constant, as indicated in the graph of FIG. 10.

As indicated above, the determination as to whether the normal traction control or the pump delivery saving traction control is effected is made on the basis of information (hereinafter referred to as "fluid temperature information") indicative of or relating to a temperature rise of the working fluid in the hydraulic circuit of the brake system.

The fluid temperature information includes: information representing the actual temperature of the working fluid; information from which the actual fluid temperature can be estimated; and information which indicates a temperature rise of the fluid in the near future. The pup delivery saving traction control is effected when any one of the predetermined conditions is satisfied. The predetermined conditions include: a condition that the detected actual fluid temperature is higher than a predetermined upper limit; a condition that the estimated actual fluid temperature is hiker than the upper limit; and a condition that there is a high possibility that the fluid temperature will rise above the upper limit in the near future. If none of the predetermined conditions indicated above is satisfied, the pump delivery saving traction control is inhibited, and the normal traction control is effected as long as the predetermined conditions for effecting the normal traction control are satisfied.

If only the pump delivery saving traction control were available, namely, if the normal traction control were not effected under any condition, it would be possible to prevent a temperature rise of the working fluid. In this case, however, the shut-off valve 18 should be operated always in the duty-control fashion when the pressure hold mode is selected, and the accuracy of control of the fluid pressure in the wheel brake cylinder 12 may be lowered. In the light of this drawback, the present brake control apparatus is adapted to effect the appropriate one of the normal traction control and the pump delivery saving traction control, depending upon the fluid temperature information indicated above.

In the present embodiment, the pump delivery saving traction control is permitted while the actual fluid temperature as detected by the temperature sensor 140 is higher than a predetermined upper limit TH1 (e.g., 70° C.). If the fluid temperature is higher than the upper limit TH1, the gases dissolved in the fluid tend to appear as bubbles.

The present embodiment is also adapted such that the normal traction control is switched to the pump delivery saving traction control if a sum Ts of the cumulative pressure decrease time and the cumulative pressure hold time during the normal traction control exceeds a predetermined time T1, for example, 10 seconds. Namely, the fluid temperature is estimated to exceed the upper limit if the sum exceeds the predetermined time T1. In this respect, it is noted that the delivery pressure of the pump 52 is higher than the relief pressure of the pressure relief valve 62, leading to a temperature rise of the working fluid, when the valve device 34 is placed in the normal pressure decrease or hold state (during the normal traction control) in which the fluid is returned to the master cylinder 10 through the relief valve 62. When the valve device 34 is placed in the normal pressure increase state, on the other hand, the delivery pressure of the pump 52 need not be higher than the relief pressure, and the working fluid is less likely to suffer from a temperature rise, than when the valve device 34 is placed in the normal pressure decrease or hold state. In view of these facts, it is considered that the temperature of the fluid increases with an increase in the sum Ts of the cumulative pressure decrease time and the cumulative pressure hold time during the normal traction control.

The present brake control apparatus is also arranged such that the pump delivery saving traction control is effected when the vehicle is stuck on a road surface. That is, if the vehicle is held in a "stuck state" (which is defined as described below) for a long time, it indicates a high possibility of a temperature rise of the working fluid above the upper limit.

The "stuck state" of the vehicle is a state in which the vehicle is unable to start on a bad road surface (e.g., muddy road surface) with one or both of the drive wheels 13 kept in an almost completely slipping state for more than a predetermined time. This stuck state of the vehicle is detected if the normal traction control is effected for at least one of the two drive wheels 13, and if the vehicle running speed is held lower than a predetermined limit of 4 km/h (1.1 m/s) for more than the predetermined time (e.g., 5 seconds).

In the "stuck state" of the vehicle, the amount of slipping of the drive wheel or wheels 13 is excessive, and the traction control is initiated for such drive wheel or wheels. For the vehicle to get out of the stuck state, however, it is advantageous in some cases to increase the drive torque of the drive wheel or wheels, rather than reduce the drive torque by the traction control. In other words, the traction control to reduce the drive torque of the drive wheel or wheels may simply increase the difficulty of the vehicle in getting out of the stuck state, resulting in continuation of the traction control for a long time.

Thus, there is a high tendency that the traction control time is increased (the cumulative pressure decrease time and cumulative pressure hold time are increased), leading to a high possibility of the fluid temperature rise above the upper limit, if the vehicle is held in the "stuck state".

Referring next to the flow chart of FIG. 7, there will be described in detail the routine for determining the traction control mode. This routine is executed with the cycle time of 1 ms.

The routine is initiated with step S9 to determine whether a TRC flag is set at "1". This TRC flag is set to "1" when a traction control operation of the drive wheel 13 (either the normal traction control or the pump delivery saving traction control) is started. The TRC flag is reset to "0" when the traction control operation is terminated. Initially, this TRC flag is set at "0", and a negative decision (NO) is obtained in step S9. Accordingly, step S10 is then implemented to reset counters 1–5 to "0". The first counter 1 is a time counter for measuring the sum of the cumulative pressure increase time during the normal traction control and the cumulative pressure increase time during the pump delivery saving traction control. The second counter 2 is a time counter for measuring the cumulative pressure decrease time during the normal traction control. The third counter 3 is a time counter for measuring the cumulative pressure hold time during the normal traction control. The fourth counter 4 is a time counter for measuring the pressure decrease time during the pump delivery saving traction control. The fifth counter 5 is a time counter for measuring a time which has passed after the pressure decrease mode is selected during the pump delivery saving traction control.

Step S10 is followed by step S11 to determine whether the predetermined traction control initiating condition is satisfied, that is, whether the drive wheel 13 has an excessively high slipping tendency. If an affirmative decision (YES) is obtained in step S11, the control goes to step S12. If a negative decision (NO) is obtained in step S11, the control returns to step S9, and steps S9–S11 are repeatedly implemented until the affirmative decision (YES) is obtained in step S11, namely, until the drive wheel 13 has an excessively high slipping tendency.

If the affirmative decision (YES) is obtained in step S11, step S12 is implemented to set the TRC flag to "1", and step S13 is then implemented to determine whether a predetermined condition for terminating the traction control is satisfied, for example, whether the accelerator pedal has been released during the traction control. Initially, a negative decision (NO) is obtained in step S13, and the control flow goes to step S14. If an affirmative decision (YES) is obtained in step S13, the control flow goes to step S25 to reset the TRC flag to "0", and to step S26 to establish the terminate mode as indicated in the table of FIG. 12. In the terminate mode, the shut-off valves 18 and 24 are open, while the shut-off valves 32 and 42 are closed. Then, the control returns to step S9.

If the negative decision (NO) is obtained in step S13, the control flow goes to steps S14, S15 and S16 to determine whether the pump delivery saving traction control should be effected or inhibited, on the basis of the fluid temperature information explained above. Step S14 is provided to determine whether the vehicle is held in the "stuck state". Step S15 is provided to determine whether the sum Ts (cumulative normal pressure decrease time+cumulative normal pressure hold time) is equal to or longer than the predetermined time T1. The sum Ts is calculated on the basis of the present contents of the second counter 2 and the third counter 3. Step S16 is provided to determine whether the fluid temperature detected by the temperature sensor 140 is equal to or higher than the predetermined upper limit TH1 (e.g. 70° C.). If a negative decision (NO) is obtained in all of these three steps S14–S16, it means that the delivery pressure of the pump 52 need not be lowered. In this case, the control flow goes to step S17 and the following steps to effect the normal traction control, while inhibiting the pump delivery saving traction control.

If an affirmative decision (YES) is obtained in any one of steps S14–S16, it means that the delivery pressure of the pump 52 need to be lowered. In this case, the control flow goes to step S27 and the following steps to effect the pump delivery saving traction control.

If the normal traction control is effected, step S17 is implemented to determine whether a condition for establishing the pressure increase mode is satisfied. If an affirmative decision (YES) is satisfied, step S17 is followed by step S18 to establish the normal pressure increase mode. Step S18 is followed by step S19 in which the first counter 1 is incremented.

If a negative decision (NO) is obtained in step S17, the control flow goes to step S20 to determine whether a condition for establishing the pressure decrease mode is satisfied. If an affirmative decision (YES) is obtained in step S20, the control flow goes to steps S21 to establish the normal pressure decrease mode and increment the second counter 2. If a negative decision (NO) is obtained in step S20, the control flow goes to steps S23 and S24 to establish the normal pressure hold mode and increment the third counter 3.

If an affirmative decision (YES) is obtained in any one of the above-indicated steps S14–S16 during the normal traction control, the control flow goes to step S27 to determine whether a condition for establishing the pressure increase mode for the pump delivery saving traction control is satisfied. If an affirmative decision (YES) is obtained in step S27, the control flow goes to step S28 to establish the pressure increase mode for the pump delivery saving traction control, and to step S29 to increment the first counter 1. If a negative decision (NO) is obtained in step S27, step S30 is implemented to determine whether the pressure decrease mode for the pump delivery saving traction control is satisfied. If an affirmative decision (YES) is obtained in step S30, the control flow goes to step S31 to establish the pressure decrease mode for the pump delivery saving traction control and to step S32 to increment the fourth counter 4.

If a negative decision (NO) is obtained in step S30, the control flow goes to step S33 to establish the pressure hold mode for the pump delivery saving traction control, and determine the duty ratio of the first solenoid-operated shut-off valve 18 as described above. In this respect, it is noted that the content of the first counter 1 represents the cumulative pressure increase time during the normal traction control and during the pump delivery saving traction control, and that the cumulative pressure decrease time during the normal and pump delivery saving traction controls is represented by a sum of the content of the second counter 2 and the content of the fourth counter 4. Therefore, the effective pressure increase time indicated above is represented by the content of the first counter 1 minus the sum of the contents of the second and fourth counters 2, 4. The fluid pressure in the wheel brake cylinder 12 is estimated on the basis of the thus obtained effective pressure increase time, and the duty-control pressure decrease time Tg is determined on the basis of the estimated fluid pressure and according to the predetermined relationship as indicated in the graph of FIG. 9. We duty-control pressure increase time Ti can then be determined. The duty ratio of the shut-off valve 18 is thus determined in step S33.

Figure 7:
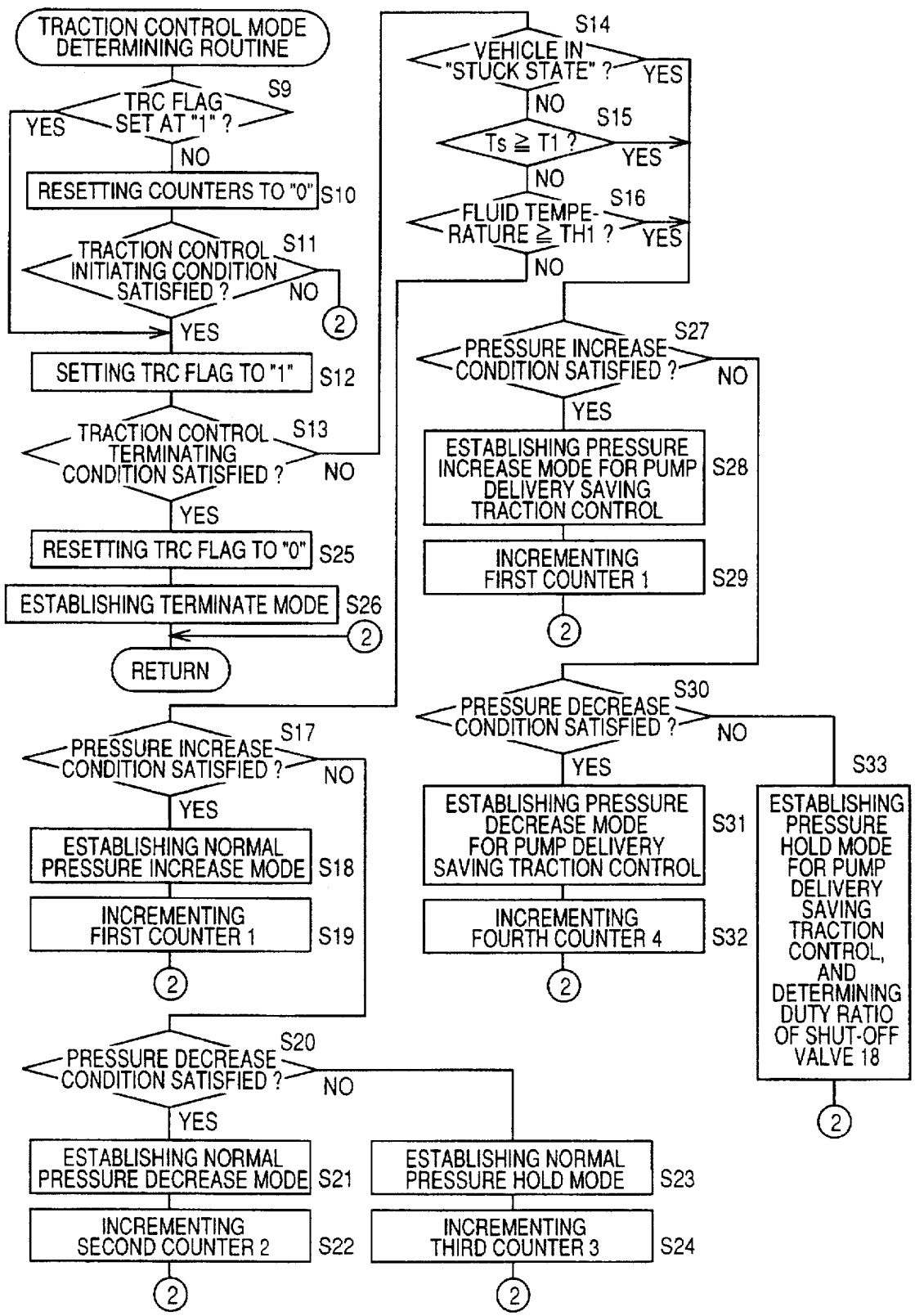
FIG. 7 is a flow chart illustrating a traction control mode determining routine stored in a read-only memory of a traction control computer of the brake control apparatus.

If the pressure hold mode for the pump delivery saving traction control is established in step S33 of the traction control mode determining routine of FIG. 7, an affirmative decision (YES) is obtained in step S2 of the solenoid control routine of FIG. 8. In this case, step S41 is implemented to determine whether the determined pressure increase time Ti has passed after the affirmative decision (YES) is obtained in step S2, namely, after the pressure hold mode for the pump delivery saving traction control is established. In the pressure hold mode in the pump delivery saving traction control, the shut-off valve 18 is first placed in the pressure increase position for the determined pressure increase the Ti, and then placed in the pressure decrease position for the determined pressure decrease time Tg=50 ms-Ti, as described above by reference to the graph of FIG. 10.

The determination in step S41 is effected on the basis of the content of the fifth counter 5 adapted to measure the time which has passed after the pressure hold mode for the pump delivery saving traction control is established. Initially, the content of the fifth counter 5 (incremented in step S43) is zero, and a negative decision (NO) is obtained in step S41, whereby the pressure increase mode (for the pump delivery saving traction control) is established in step S42. Step S42 is followed by step S43 to increment the fifth counter 5. Then, step S3 is implemented to control the solenoids 20, 36, 38, 44 to place the valve device 34 in the pressure increase state of FIG. 3. Namely, the shut-off valve 18 is placed in the closed position.

In the present embodiment wherein the solenoid control routine of FIG. 8 is executed with the cycle time of 1 ms, the count of the fifth counter 5 represents the time in millisecond.

When the determined pressure increase time Ti has passed, that is, if an affirmative decision (YES) is obtained in step S41, the control flow goes to step S44 to determine whether 50 ms has passed after the pressure hold mode for the pump delivery saving traction control is first established, that is, whether the determined pressure decrease time Tg has passed after the pressure increase time Ti has passed. When step S44 is implemented for the first time, a negative decision (NO) is obtained in step S44, and the control flow goes to step S45 to establish the pressure decrease mode for the pump delivery saving traction control, and to step S46 to increment the fifth counter 5. In this case, the solenoids are controlled in step S3 to place the valve device 34 in the pressure decrease state of FIG. 6. Namely, the shut-off valve 18 is switched from the closed position to the open position.

When the time represented by the content of the fifth counter 5 has reached 50 ms, an affirmative decision (YES) is obtained in step S44, and step S47 is implemented to reset the fifth counter 5 to "0". Then, the control flow goes to step S42 to establish again the pressure increase mode for the pump delivery saving traction control. Steps S1–S3 and S41–S47 are repeatedly implemented to alternately close and open the shut-off valve 18 at the determined duty ratio for alternately increasing and decreasing the fluid pressure in the wheel brake cylinder 12 as indicated in the graph of FIG. 10, so as to hold the fluid pressure within a relatively narrow range indicated by dotted lines in FIG. 10.

In the present embodiment, the duty ratio of the shut-off valve 18 determined on the basis of the effective pressure increase time upon establishment of the pressure hold mode for the pump delivery saving traction control is maintained throughout a pump delivery saving traction control operation in the pressure hold mode. If the pressure hold mode for the pump delivery saving traction control is still established after the control period of 50 ms has passed, the shut-off valve 18 is controlled in the duty-control fashion with steps S41–S47 and S3 being repeatedly implemented.

If the negative decision (NO) is obtained in all of the three steps S14, S15 and S16 during the pump delivery saving traction control, the normal traction control is effected. Thus, either the normal traction control or the pump delivery saving traction control is selectively effected depending upon the decisions in steps S14–S16, that is, depending upon the fluid temperature information.

In the present brake system including the brake control apparatus constructed according to the principle of this invention, the first solenoid-operated shut-off valve 18 is opened at least during the period of the pump delivery saving traction control in the pressure decrease mode and during the pressure decrease period of the pressure hold mode in the pump delivery saving traction control. During these periods, it is not necessary to return the fluid to the master cylinder 10 through the pressure relief valve 62. Accordingly, the required delivery pressure of the pump 52 can be lowered. This makes it possible to avoid wasteful energy consumption by the motor 56 for operating the pump 52, and reduce the load of the motor 56, resulting in increased life expectancy of the motor 56.

When the pressure hold mode for the pump delivery saving traction control is selected, the shut-off valve 18 is alternately opened and closed at the controlled duty ratio, so that the fluid pressure in the wheel brake cylinder 12 can be maintained at a substantially constant level, while permitting a rapid return of the fluid back to the master cylinder 10 through the check valve 26 at the end of brake application to the drive wheel 13. Further, the duty control of the shut-off valve 18 is effected while the shut-off valve 24 is held open. This arrangement allows easier control of the brake system than the arrangement in which the shut-off valve 18 and the shut-off valve 24 are both operated in the duty control fashion.

The present brake system does not use a pressure sensor for detecting the fluid pressure in the wheel brake cylinder 12, and the cost of manufacture of the brake system is accordingly lowered. To determine the duty ratio of the shut-off valve 18 in the pressure hold mode for the pump delivery saving traction control, the fluid pressure in the cylinder 12 is estimated on the basis of the cumulative pressure decrease time and the cumulative pressure increase time as explained above.

The present embodiment is also advantageous in that the pump delivery saving traction control is effected when needed, depending upon the fluid temperature information. In other words, the delivery pressure of the pump 52 is reduced only when the affirmative decision (YES) is obtained in any one of the steps S14–S16, namely, only when the detected fluid temperature is higher than the upper limit or the fluid temperature is estimated or expected to exceed the upper limit. The selective traction control in the normal or pump delivery saving fashion is also effective to reduce the energy consumption by the motor while assuring improved accuracy of control of the fluid pressure in the cylinder 12, contrary to the arrangement in which only the pump delivery saving traction control is available.

Further, the present embodiment is adapted to prevent an excessive temperature rise of the working fluid, and minimize deterioration of the fluid, leading to increased life expectancy of the fluid. This arrangement is also effective to avoid bubbling of the fluid due to gases normally dissolved in the fluid, making it possible to prevent deterioration of the operating feel of the brake pedal 29, which would occur due to compression of the bubbles upon brake application.

It will be understood from the foregoing description of the present embodiment of the invention that a pump delivery saving device for reducing the delivery pressure of the pump 52 is constituted by the first control valve in the form of the solenoid-operated shut-off valve 18 with the solenoid 20, and a portion of the solenoid/motor control computer 126 (hydraulic control device 22) assigned to implement the solenoid control routine of FIG. 8 (in particular, steps S1–S3 and S45 to open the shut-off valve 18). The shut-off valve 18 also serves as part of the valve device 34.

In the illustrated first embodiment described above, the pump delivery saving device also functions as a by-pass device for permitting the fluid to be returned from the wheel brake cylinder 12 to the master cylinder 10, while by-passing the pressure relief valve 62. Namely, the fluid is returned to the master cylinder 10 when the shut-off valve 18 (which is a part of the pump delivery saving device) is open. However, the pump delivery saving device may not include the shut-off valve 18. In this case, the shut-off valve 18 is considered as an element of the traction control means.

The pump delivery saving device includes valve control means for controlling the shut-off valve 18 as the first control valve, more specifically, for opening the first control valve 18 when the pressure decrease or hold mode is selected in the pump delivery saving traction control. This valve control means includes pressure hold means for holding the fluid pressure in the wheel brake cylinder 12, by alternately opening and closing the first control valve 18. The valve control means and the pressure hold means may be incorporated within traction control means for controlling the traction or drive force of the drive wheel 13, or may be provided independently of the traction control means.

It will also be understood that a portion of the traction control computer 124 (hydraulic control device 22) assigned to implement steps S14–S16 of the traction control mode determining routine of FIG. 7 constitutes enabling and disabling means for enabling or disabling the pump delivery saving device to operate to effect the pump delivery saving traction control, depending upon the fluid temperature information described above. The enabling and disabling means includes vehicle state detecting means for detecting the "stuck state" of the vehicle, time obtaining means for obtaining the sum of the cumulative normal pressure decrease time and the cumulative normal pressure hold time, and temperature detecting means for detecting the fluid temperature. Described more specifically, the vehicle state detecting means is constituted by a portion of the traction control computer 124 assigned to implement step S14, and the time obtaining means and the temperature detecting means are constituted by respective portions of the computer 124 which are assigned to implement steps S15 and S16, respectively. Further, the portions of the computer 124 assigned to implement steps S14–S16 and a portion of the computer 124 assigned to implement steps S27, S28, S30, S31 and S33 cooperate to constitute enabling means for enabling the pump delivery saving device to operate depending upon the running condition of the vehicle, the cumulative pressure decrease and hold time during the normal traction control, and the temperature of the working fluid.

The second and third counters 2, 3 and a portion of the traction control computer 124 assigned to implement steps S22 and S24 constitute means for detecting the cumulative pressure decrease and hold time during the normal traction control.

While the present embodiment is adapted to permit the pump delivery saving traction control if any one of the three predetermined conditions is satisfied, namely, if the affirmative decision (YES) is obtained in any one of the above-indicated steps S14–S16. However, the present embodiment may be modified to permit the pump delivery saving traction control if at least two of the three predetermined conditions are satisfied.

It is to be understood that the specific values used in the present embodiment such as the threshold time T1 and upper temperature limit TH1 are given byway of example only, and may be changed as needed. In the illustrated embodiment, the sum Ts of the cumulative pressure decrease and hold time in the normal traction control is used as part of the fluid temperature information. However, the sum Ts may be replaced by the cumulative pressure decrease time or pressure hold time in the normal traction control, or the cumulative normal traction control time.

Although the pressure decrease time Tg for the duty control of the shut-off valve 18 is determined on the basis of the estimated fluid pressure in the wheel brake cylinder 12, this determination may be made on the basis of the fluid pressure actually detected by a pressure sensor, for improving the accuracy of control of the fluid pressure in the cylinder 12.

In the illustrated embodiment of FIGS. 7 and 8, both the normal traction control and the pump delivery saving traction control are selectively effected. That is, the pump delivery saving traction control is effected when the affirmative decision (YES) is obtained in any one of the steps S14–S16. However, the traction control may be effected always at the reduced delivery pressure .of the pump 52, in the modes as indicated in the table of FIG. 13. In this case, the energy consumption by the motor 56 is further reduced.

The third solenoid-operated shut-off valve 32 may be closed to establish the pressure decrease mode in the pump delivery saving traction control. In this case, the fluid is returned from the wheel brake cylinder 12 to the master cylinder 10 through the check valve 26 and the shut-off valve 18 placed in the open position. In this modified arrangement, the rate of decrease of the pressure in the cylinder 12 is lower than that in the illustrated embodiment in which the shut-off valve 32 is closed in the pressure decrease mode in the pump delivery saving traction control as indicated in FIG. 13. Alternatively, the pressure decrease mode in the pump delivery saving traction control may be established by closing the shut-off valve 32 and opening the shut-off valves 18 and 24, as indicated in FIG. 6.

Rile the illustrated embodiment is adapted to effect the anti-lock control of the fluid pressures in the drive and driven wheels 13, 70 while the shut-off valve 18 is held in the open position as indicated in FIG. 11, the anti-lock control may be effected while the shut-off valve 18 is held in the closed position. This modified arrangement is effective to avoid a undesirable kick-back phenomenon of the brake pedal 29 during the anti-lock control. However, the modified arrangement may suffer from excessive reduction of the amount of the fluid in the secondary reservoir 14. To avoid this problem, the shut-off valve 42 or 18 may be opened when the detected mount of the fluid in the secondary reservoir 14 is reduced below a predetermined value.

Figure 14:
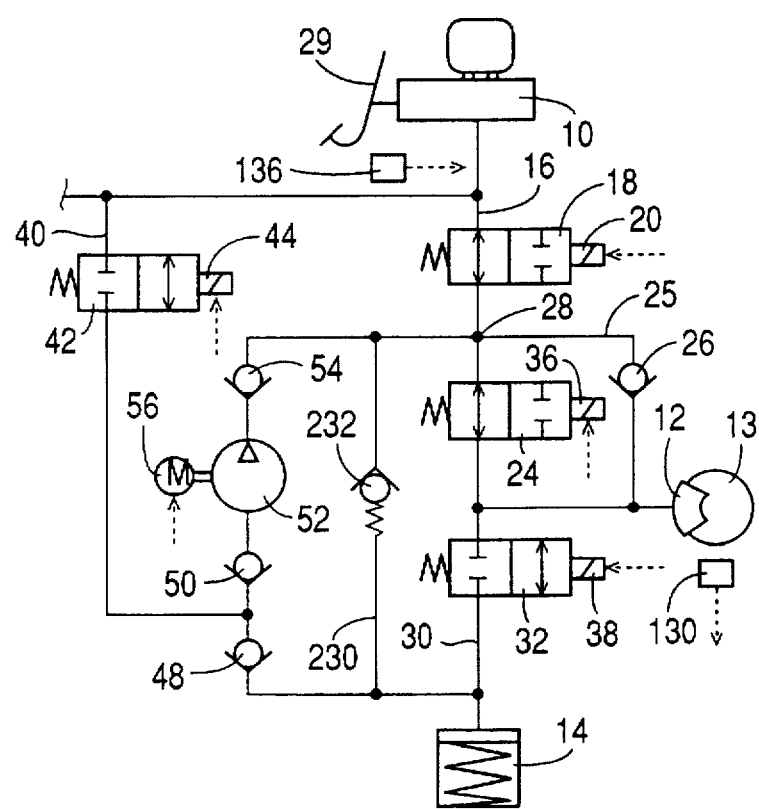
FIG. 14 is a schematic view illustrating a brake system controlled by a brake control apparatus according to a second embodiment of this invention.

In the illustrated embodiment of FIG. 1, the pressure relief valve 62 is disposed between the master cylinder 10 and the delivery port of the pump 52. However, a pressure relief valve 232 may be disposed in a relief passage 230 which collects the delivery port of the pump 52 and the secondary reservoir 14, as shown in FIG. 14, according to a second embodiment of the present invention. Like the relief valve 62, the relief valve 232 has a relief pressure which is equal to the highest fluid pressure during the traction control. When the delivery pressure of the 52 reaches the relief pressure of the relief valve 232, the fluid delivered from the pump 52 is partly returned to the secondary reservoir 232 through the relief valve 232.

The pressure relief valve 232 may be disposed in a fluid passage which connects the delivery and suction ports of the pump 52.

The fourth solenoid-operated valve 42 may be replaced by a pilot-operated shut-off valve which is adapted to receive as a pilot pressure the pressure in the master cylinder 10. This pilot-operated shut-off valve is closed when the pressure in the master cylinder 10 is higher than a predetermined level, and is opened when the master cylinder pressure is lowered below the predetermined level. Described more particularly, the pilot-operated shut-off valve is closed during normal brake application or anti-lock control of the brake pressure, since the master cylinder pressure is raised above the predetermined level by depression of the brake pedal 29. During the traction control of the drive wheel 13, the pilot-operated shut-off valve is opened since the master cylinder pressure is not higher than the predetermined level with the brake pedal 29 placed in the non-operated position.

Figure 15:
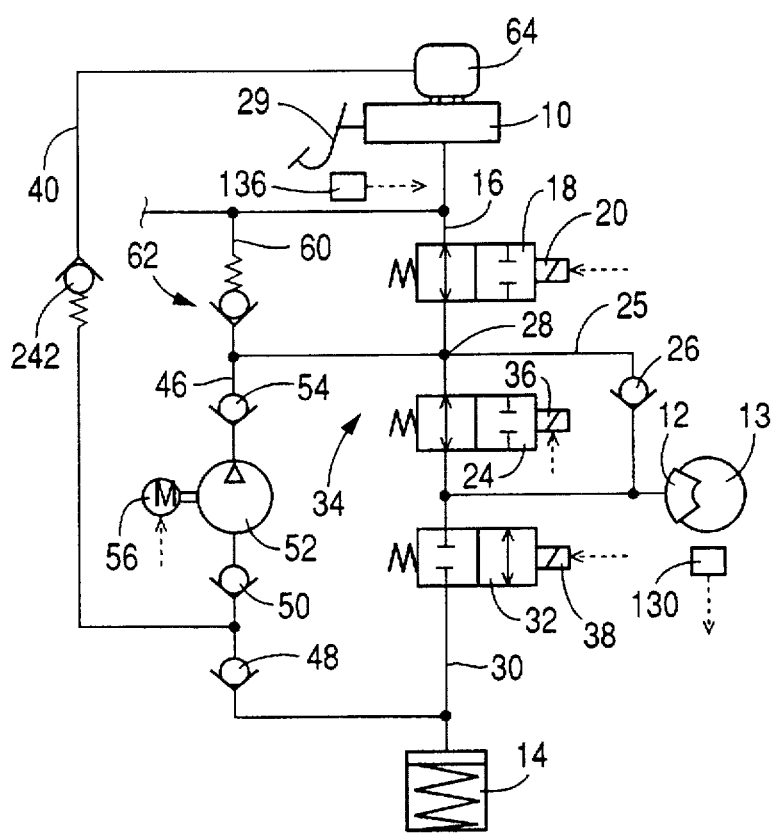
FIG. 15 is a schematic view illustrating a brake system controlled by a brake control apparatus according to a third embodiment of the invention.

The fourth solenoid-operated shut-off valve 42 provided in the secondary fluid passage 40 in the embodiment of FIG. 1 may be replaced by a pressure relief valve 242, as shown in FIG. 15. The relief valve 242 is opened to permit a flow of the fluid from the primary reservoir 64 to the secondary reservoir 14, when the pressure in the primary reservoir 64 is higher than the pressure in the suction portion of the pump passage 46, by more than a predetermined amount.

In the third embodiment of FIG. 15, it is desirable to set the relief pressure of the relief valve 242 as low as possible, while preventing the fluid flow from the primary reservoir 64 through the relief valve 242 unless the reservoir 14 is completely vacant. Explained more specifically, the pump 52 is operated upon initiation of the traction control operation, but no fluid is stored in the secondary reservoir 14 at that time. Consequently, the reservoir 14 and the suction portion of the pump passage 46 are evacuated. As a result, the pressure difference of the primary reservoir 64 with respect to the suction portion of the pump passage 64 exceeds the predetermined amount, and the fluid is fed from the primary reservoir 64 through the pressure relief valve 242 into the suction portion of the pump passage 46, and is sucked up and pressurized by the pump 52. During the traction control, too, the fluid is fed from the reservoir 64 into the suction portion of the pump passage 46 when the pressure difference indicated above exceeds the predetermined amount. This arrangement is effective prevent shortage of the pressurized fluid that is delivered by the pump 52. Since excessively high vacuum in the suction portion of the pump passage 46 is not desirable. In this respect, it is desirable that the relief pressure of the pressure relief valve 242 be as low as possible, but high enough to prevent the fluid flow from the primary reservoir 64 into the suction portion of the pump passage 46 through the relief valve 242 as long as some amount of the fluid remains in the secondary reservoir 14.

In the embodiment of FIG. 15, the fluid accommodated in the secondary reservoir 14 will not be returned to the primary reservoir 64 through the pressure relief valve 64.

The embodiment of FIG. 15 which does not include the solenoid-operated shut-off valve 42 is accordingly easier to control, and permits the fluid flow from the primary reservoir 64 to the suction portion of the pump passage 46 if the pressure difference between the primary and second reservoirs 64, 14 exceeds the predetermined amount, even during the anti-lock control operation.

Figure 16:
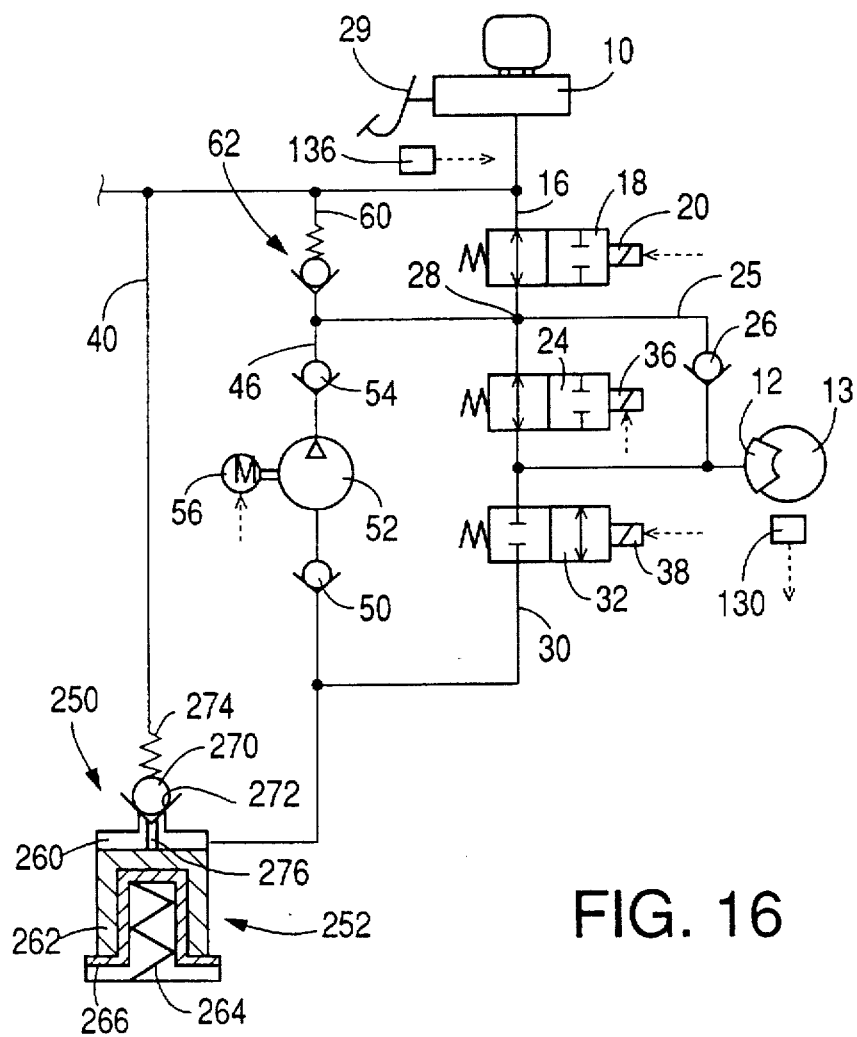
FIG. 16 is a schematic view illustrating a brake system controlled by a brake control apparatus according to a fourth embodiment of the invention.

The shut-off valve 42 and the secondary reservoir 14 provided in the first embodiment of FIG. 1 may be replaced by a reservoir 252 which incorporates an in-flow control valve 250, as shown in FIG. 16. The in-flow control valve 150 used in this fourth embodiment of FIG. 16 is a shut-off valve sensitive to the amount of fluid stored in a reservoir chamber 260.

The reservoir 252 includes a piston 262 which cooperates with the housing to define the reservoir chamber 260, biasing means in the form of a spring 264 for biasing the piston 262, and a spring retainer 266 which engages the piston-262 and receives a biasing force of the spring 264. The piston 262 is substantially fluid-tightly and slidably received in a cylinder bore formed in the housing, so as to change the volume of the reservoir chamber 260. The piston 262 is biased by the spring 264 via the retainer 266 in a direction toward the reservoir chamber 260.

The movement of the retainer 266 toward the reservoir chamber 260 is limited by abutting contact of a flange portion of the retainer 262 with a shoulder portion of the housing of the reservoir 252. The retainer 266 loosely engages the piston 262, so that when the volume of the reservoir chamber 260 is reduced, the piston 262 is movable in the upward direction as seen in FIG. 16, away from the retainer 266 held in its original position in contact with the shoulder portion of the housing. When the volume of the reservoir chamber 260 is increased, the piston 262 is moved in the downward direction together with the retainer 266, against the biasing action of the spring 264.

The in-flow control valve 250 includes a ball 270, a valve seat 272, and a pin 276 fixed to the end face of the reservoir piston 262. When the volume of the reservoir chamber 260 (amount of the fluid accommodated therein) is larger than the predetermined value, the pin 272 is spaced apart from the ball 270, whereby the ball 270 is seated on the valve seat 272. That is, the in-flow control valve 250 is normally placed in a closed position to inhibit the fluid from flowing into the reservoir chamber 260. When a traction control operation is initiated with the pump 52 started to suck up the fluid from the reservoir chamber 260, the pressure in the chamber 260 is made negative, and the piston 262 is moved so as to reduce the volume of the reservoir chamber 260. When the volume of the reservoir chamber 260 is reduced and becomes smaller than the predetermined value, the pin 276 fixed to the piston 262 pushes the ball 270 away from the valve seat 272, whereby the in-flow control valve 250 is opened to allow the fluid from the master cylinder 10 to be fed into the reservoir chamber 260 through the secondary fluid passage 40. Thus, the in-flow control valve 250 is opened immediately after the traction control is initiated. However, this valve 250 is also opened when the fluid pressure in the chamber 260 falls below a certain level during the traction control operation.

In the present fourth embodiment of FIG. 16 which uses the secondary reservoir 252 with the in-flow control valve 250, otherwise possible shortage of the pressurized fluid to be delivered by the pump 52 during the traction control is effectively prevented by the in-flow control valve 250.

In the above embodiments of FIGS. 1, 14, 15 and 16, only the shut-off valve 18 is operated in the duty control fashion while the shut-off valves 24 and 32 are held in the open and closed positions, respectively, when the valve device 34 is placed in the pressure hold mode in the pump delivery saving traction control. However, at least one of the shut-off valves 24 and 32 may be operated in the duty control fashion in synchronization with the shut-off valve 18.

The valve device 34 may be modified as needed. For example, the shut-off valves 24 and 32 may be replaced by a single 3-position control valve. Similarly, the shut-off valves 18 and 24, or the shut-off valves 18 and 32, or the shut-off valves 18, 24 and 32 may be replaced by a single 3-position control valve.

The check valve 26 provided in the valve device 34 in the above embodiments is not essential. In a fifth embodiment of FIG. 17, a valve device 210 (brake cylinder control valve 24, 32) does not include the check valve 26 and is controlled by a hydraulic control device 290. In this embodiment, the pump delivery saving control modes (pressure increase mode, pressure decrease mode and pressure hold mode) are established by the control device 290 which is adapted to control the shut-off valves 18, 24, 32, 42, as indicated in the table of FIG. 18. In the pressure hold mode, the pressure in the wheel brake cylinder 12 can be maintained, without alternately opening and closing the shut-off valve 18. That is, the fluid pressure in the cylinder 12 can be maintained by placing the shut-off valve 18 in the open position and placing the shut-off valves 24, 32 in the closed position, as indicated in the table.

Figure 17:
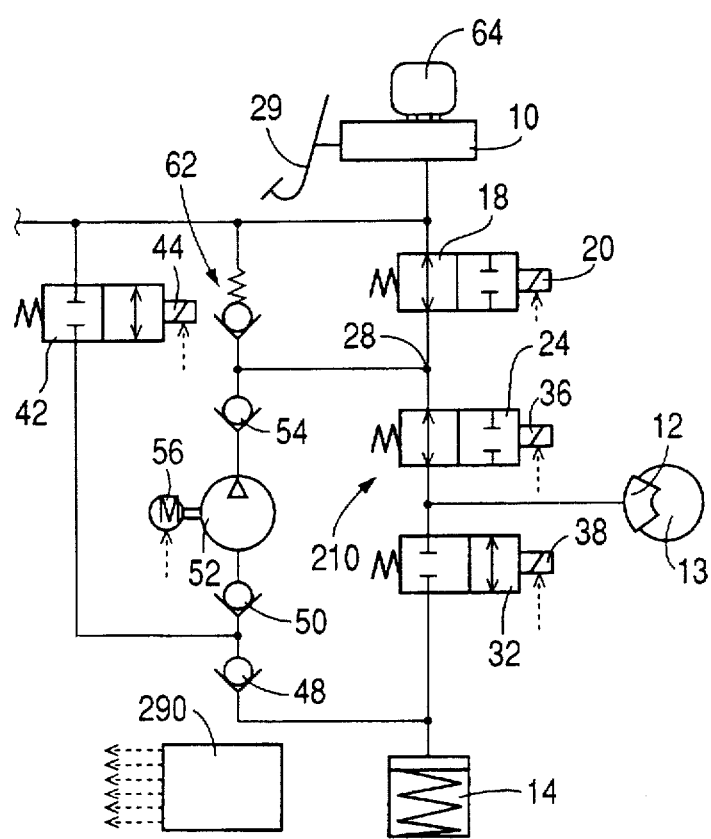
FIG. 17 is a schematic view illustrating a brake system controlled by a brake control apparatus according to a fifth embodiment of the invention.

The operating states of the shut-off valves 18, 24, 32, 42 when the pressure increase mode is established in the pump delivery saving traction control in the embodiment of FIGS. 17 and 18 are the same as in the preceding embodiments (See FIG. 13). In this pressure increase mode, the fluid pressurized by the pump 452 is supplied to the wheel brake cylinder 12 through the shut-off valve 24 placed in the open position.

When the pressure decrease mode is selected in the pump delivery saving traction control, the shut-off valves 18 and 32 are opened, and the shut-off valve 24 is closed, so that the fluid is returned from the wheel brake cylinder 12 to the secondary reservoir 14 through the shut-off valve 32 placed in the open position, while the fluid delivered from the pump 52 is returned to the master cylinder 10 through the delivery portion of the pump passage 46 (delivery end 28 of the pump passage 46) and the shut-off valve 18 also placed in the open position.

When the pressure hold mode is selected in the pump delivery saving traction control, the shut-off valve 18 is opened, and the shut-off valves 24, 32 are both closed. In the present embodiment of FIG. 17 wherein the by-pass passage 25 and the check valve 26 are not provided, the fluid pressure in the cylinder 12 can be maintained even with the shut-off valve 18 placed in the open position, since the opening of the shut-off valve 18 does not cause the fluid to be discharged from the cylinder 12 to the master cylinder 10. Thus, it is not necessary to alternately open and close the shut-off valve 18 to hold the pressure in the cylinder 12.

In the embodiment of FIG. 18 which does not have the by-pass passage 25, it takes a comparatively long time to return the fluid from the wheel brake cylinder 12 to the master cylinder 10 at the end of normal brake application, anti-lock control of the brake pressures or traction control of the drive force of the drive wheel 13. However, the present embodiment having this disadvantage is desirable because of its capability of maintaining the pressure in the cylinder 12 while holding the shut-off valve 18 open, which leads to reduced frequency of switching of the shut-off valve 18, and improved accuracy of control of the pressure in the cylinder 12, as well as reduced delivery pressure of the pump 52.

Figure 19:
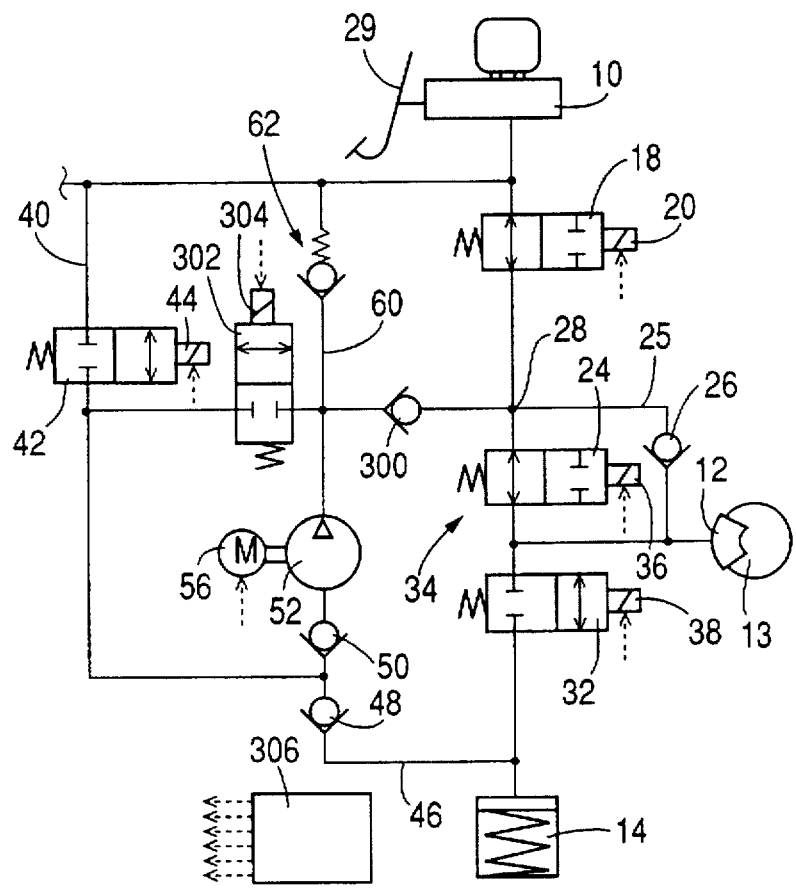
FIG. 19 is a schematic view illustrating a brake system controlled by a brake control apparatus according to a sixth embodiment of the invention.

Referring to FIG. 19, there is shown a sixth embodiment of this invention, which is adapted to reduce the delivery pressure of the pump 52 without opening the shut-off valve 18 as the first control valve of the valve device 34, and to hold the pressure in the cylinder 12 without alternately opening and closing the shut-off valve 18 at the controlled duty ratio.

In the embodiment of FIG. 19, a check valve 300 is provided in the delivery portion of the pump passage 46, namely, between the delivery port of the pump 52 and the delivery end 28 of the pump passage 46. Further, the delivery port of the pump 52 is connected through a shut-off valve 302 to a portion of the secondary fluid passage 40 which is downstream of the shut-off valve 42. The check valve 300 permits a flow of the fluid in a direction from the pump 52 toward the wheel brake cylinder 12, but inhibits a flow of the fluid in the opposite direction. The check valve 300 functions to prevent the discharge flow of the fluid from the cylinder 12 when the delivery pressure of the pump 52 is lowered with the shut-off valve 302 placed in the open position.

The shut-off valve 302 has a solenoid 304 controlled by a hydraulic control device 306 through a driver circuit. The pressure increase mode, pressure decrease mode and pressure hold mode are established in the pump delivery saving traction control, by the hydraulic control device 306 adapted to control the shut-off valves 18, 24, 32, 42, 302 as indicated in the table of FIG. 20.

When the normal traction control is effected, the solenoid 304 is de-energized, and the shut-off valve is held in the closed position. The solenoids 20, 36, 38, 44 of the other shut-off valves are controlled in the same manner as indicated in the table of FIG. 12 described above with respect to the first embodiment.

When the pressure increase mode is selected in the pump delivery saving traction control, the shut-off valves are controlled in the same manner as in the normal traction control. In this case, the shut-off valve 302 is held in the closed position. The fluid in the master cylinder 10 is pressurized by the pump 52 and fed to the cylinder 12 through the check valve 300 and the shut-off valve 24.

When the pressure decrease mode is selected in the pump delivery saving traction control, the shut-off valve 24 is closed, and the shut-off valve 32 is opened, while the solenoid 304 is energized to open the shut-off valve 302. As a result, the fluid in the cylinder 12 is returned to the secondary reservoir 14 through the shut-off valve 32, and the fluid in the reservoir 14 is returned to the master cylinder 10 through the pump passage 46, shut-off valve 302 and shut-off valve 42. Thus, it is not necessary to return the fluid from the cylinder 12 to the master cylinder 10 through the pressure relief valve 62, and the delivery pressure of the pump 52 is accordingly reduced.

In the presence of the check valve 300, the pressure at the delivery end 28 of the pump passage 46 is not lowered below the pressure in the cylinder 12, and the fluid is not discharged from the cylinder 12 to the delivery end 28 through the check valve 26.

When the pressure hold mode is selected in the pump delivery saving traction control, the shut-off valves 24, 32 are both closed, and the shut-off valve 302 is opened. The check valve 300 inhibits a flow of the fluid in the direction from the delivery end 28 of the pump passage 46 toward the shut-off valve 302, even when the delivery pressure of the pump 52 is lowered with the shut-off valve 302 placed in the open position. Therefore, the fluid is not discharged from the cylinder 12 through the check valve 26, and the pressure in the cylinder is maintained.

Thus, the delivery pressure of the pump 52 can be lowered even when the valve device 34 is placed in the pressure hold state in the pump delivery saving traction control.

It is noted that the shut-off valve 24 may be open in the pressure hold mode in the pump delivery saving traction control, since the discharge flow of the fluid from the cylinder 12 is prevented by the shut-off valve 18 and check valve 300.

The brake system according to the present sixth embodiment of FIG. 19 is obtained by providing the brake system of FIG. 1 with the shut-off valve 302 and the check valve 300. In the brake system of FIG. 1, the shut-off valve 18 is generally required to have a large size to assure a sufficiently large cross sectional area of fluid flow when placed in the open position. Further, the shut-off valve 18 used in the brake system of FIG. 1 should exhibit an excellent response, because the valve 18 is operated at the determined duty ratio in the pressure hold mode during the pump delivery saving traction control.

In the embodiment of FIG. 19, on the other hand, the shut-off valves 18, 302 are not operated in the duty control fashion. Therefore, the shut-off valve 18 need not have an excellent response characteristic, and an ordinary shut-off valve may be used as the shut-off valve 302. Accordingly, the cost of the brake system as a whole can be reduced, without deteriorating the control accuracy.

In the embodiment of FIG. 19, the pump delivery saving device is constituted by the shut-off valve 302, and a portion of the solenoid/motor control computer of the hydraulic control device 306 which is assigned to energize the solenoid 304 to open the shut-off valve 302. In this respect, it is noted that the shut-off valve 302 is not a part of the valve device 34, but is a delivery pressure reducing valve which is exclusively provided to reduce the delivery pressure of the pump 52 and which is controlled by the above-indicated portion of the solenoid/motor control computer. Thus, the valve device 34 and the pump delivery pressure reducing valve 302 are independent of each other, in the present embodiment. Thus, the pump delivery saving device controls the shut-off valve 302 which is not a part of the valve device 34. The shut-off valve 302 is not a part of the brake cylinder control valve, either.

It will be understood that the shut-off valve 302 functions as a by-pass control valve which is in parallel connection with the relief valve 62 and the first control valve 18, for returning the fluid delivered from the pump 52 to the master cylinder 10, while by-passing the relief valve 62.

Figure 21:
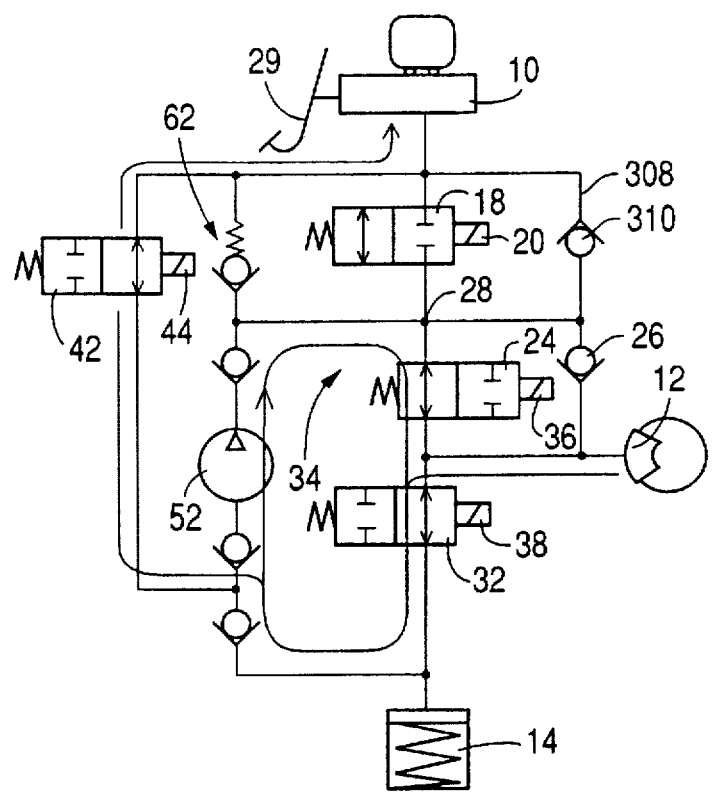
FIG. 21 is a schematic view illustrating the brake system of FIG. 1 when the brake control apparatus is placed in the pressure decrease mode during the pump delivery saving traction control, according to a seventh embodiment of the invention.

Referring to FIGS. 21 and 22, a seventh embodiment of the present invention will be described. This embodiment is a modification of the brake system of FIG. 1, relating to the pump delivery saving traction control by the hydraulic control device 22. That is, the shut-off valves 18, 24, 32, 42 are controlled by the solenoid/motor control computer 126, as indicated in the table of FIG. 22 which represents the relationship between the pump delivery saving control modes and the operating states or positions of the shut-off valves. This relationship is stored in the read-only memory of the computer 126, in place of the relationship shown in FIG. 13 used in the first embodiment.

Further, the present seventh embodiment is different from the first embodiment of FIG. 1, in that a check valve 310 is provided in a by-pass passage 308 in the seventh embodiment. The by-pass passage 308 is provided to by-pass the first solenoid-operated shut-off valve 18, and the check valve 310 permits a flow of the fluid in a direction from the master cylinder 10 toward the delivery end 28 of the pump passage, but inhibits a flow of the fluid in the opposite direction.

A primary function of the check valve 310 is to reduce the required size of the shut-off valve 18.

If the traction control terminating condition is satisfied with the throttle valve returned to the engine idling position with the accelerator pedal being fully released during a traction control operation, the traction control operation is terminated. That is, the solenoids 20, 36, 38 and 44 are de-energized so that the shut-off valve 18 is placed in the open position while the shut-off valve 32 is placed in the closed position. Consequently, the fluid pressurized by the master cylinder 10 upon subsequent depression of the brake pedal 29 is fed into the wheel brake cylinder 12, to apply brake to the drive wheel 13.

If the brake pedal 29 is depressed immediately after the accelerator pedal is fully released, the fluid pressure in the master cylinder 10 is increased before the shut-off valve 18 is brought to the open position. In this case, the pressure difference across the shut-off valve 18 increases. Further, the brake pedal 29 may possibly be depressed while the accelerator pedal is being depressed. In this case, too, the pressure difference across the shut-off valve 18 increases.

The solenoid 20 of the normally-open shut-off valve 18 is normally placed in the de-energized state so that the valve 18 is normally placed in the open position with its spool being unseated. When the solenoid 20 is energized, the spool of the valve 18 is seated to bring the valve 18 to the closed position. The shut-off valve 18 is designed so that the pressure in a portion of the primary fluid passage 18 on the side of the master cylinder 10 acts on the valve spool in a direction for forcing the valve spool against the valve seat. If the shut-off valve 18 is designed so that the pressure on the side of the master cylinder 10 acts on the valve spool in the opposite direction so as to move the spool away from the valve seat, the force generated by the solenoid should be large enough to overcome the pressure on the side of the master cylinder. In this case, the solenoid should have a large capacity so that the valve spool can be held seated on the valve seat even when the pressure on the side of the master cylinder 10 is relatively high. Therefore, the solenoid tends to have an accordingly large size.

If the shut-off valve 18 is designed so that the pressure on the side of the master cylinder 10 acts on the spool so as to force the spool against the valve seat, the spring used to bias the spool in the direction away from the valve seat upon de-energization of the solenoid 20 should have a large biasing force depending upon the pressure difference across the shut-off valve 18. Accordingly, the solenoid 20 should be accordingly large sized because the force generated by the solenoid 20 should overcome the biasing force of the spring to place the valve 18 in the closed position.

In the present seventh embodiment of FIG. 21 wherein the check valve 310 is provided, the pressure in the master cylinder 10 is also applied through the check valve 310 to the portion of the primary fluid passage 16 between the shut-off valves 18, 24, whereby the pressure difference across the shut-off valve 18 is reduced. This arrangement is effective to reduce the required size of the shut-off valve 18 (required size of the solenoid 20).

Another function of the check valve 310 is to minimize a delay of brake application to the wheel 13 when the brake pedal 29 is depressed while the shut-off valve 18 is placed in the closed position.

In the presence of the check valve 310 in parallel with the shut-off valve 18, the fluid pressure in the master cylinder 10 is also applied to the shut-off valve 24 even while the shut-off valve 18 is closed, as described above. If the shut-off valve 24 is open at this time, the pressure in the master cylinder 10 is applied to the wheel brake cylinder 12 through the shut-off valve 24. Thus, the otherwise possible dealy of the brake application to the wheel 13 is completely prevented.

If the shut-off valve 24 is closed upon depression of the brake pedal 29 with the shut-off valve 18 being closed, the pressure in the master cylinder 10 is applied to the shut-off valve 24 through the check valve 310. Therefore, as soon as the shut-off valve 24 is opened, the pressure in the master cylinder 10 is applied to the wheel brake cylinder 12. Further, the relatively low pressure difference across the shut-off valve 18 permits the shut-off valve 18 to be quickly opened upon de-energization of the solenoid 20. This also contributes to minimizing the delay of the brake application. In other words, the provision of the check valve 310 reduces the pressure difference across the shut-off valve 18, thereby reducing the required length of time from the moment of de-energization of the solenoid 20 to the moment when the spool of the shut-off valve 18 is moved away from the valve seat.

In the present seventh embodiment, the operating positions of the shut-off valves upon selection of the pressure increase mode in the present embodiment of FIG. 22 are the same in the embodiment of FIG. 13.

When the pressure decrease mode is selected, the shut-off valve 18 remains in the closed position in the embodiment of FIG. 22, and the shut-off valve 24 is opened as indicated in FIG. 21. In the embodiment of FIG. 13, the shut-off valve 18 is opened.

The fluid delivered from the pump 52 is returned to the secondary reservoir 14 through the delivery portion of the pump passage 46 and the shut-off valves 24 and 32. The fluid in the cylinder 12 is also returned to the secondary reservoir 14, through the shut-off valve 32. A portion of the fluid returned to the reservoir 14 is sucked up by the pump 52, while the rest of the fluid in the reservoir 14 is returned to the master cylinder 10 through the shut-off valve 42.

Thus, there are two fluid flow paths indicated by arrows in FIG. 21. The first fluid flow path is a closed fluid circulating circuit which includes the pump 52, shut-off valve 24 and shut-off valve .32. The second fluid flow path is an open fluid flow passage including the wheel brake cylinder 12, shut-off valve 32, shut-off valve 42 and master cylinder 10. This arrangement does not require the fluid delivered from the pump 52 to be returned to the master cylinder 10 through the pressure relief valve 62. Thus, the pressure in the cylinder 12 can be lowered while the delivery pressure of the pump 52 is held comparatively low.

When the pressure hold mode is selected in the pump delivery saving traction control in the present embodiment of FIG. 22, the shut-off valve 32 is alternately closed and opened at the determined duty ratio, while the shut-off valves 18 and 24 are held in the closed and open positions, respectively. This arrangement of FIG. 22 is contrary to the arrangement of FIG. 13 in which the shut-off valve 18 is operated in the duty control fashion while the shut-off valves 24 and 32 are held in the open and closed positions, respectively.

With the shut-off valve 32 placed in the closed position, the fluid delivered from the pump 52 is supplied to the cylinder 22, and the discharge flow of the fluid from the cylinder 12 is prevented, whereby the pressure in the cylinder 12 is raised. With the shut-off valve 32 placed in the open position, the pressure in the cylinder 12 is lowered. Therefore, the fluid in the cylinder 12 can be maintained at a substantially constant level, by alternately closing and opening the shut-off valve 32 at the suitably determined duty ratio.

In the pressure hold mode, there is a time period during which the shut-off valves 24 and 32 are both placed in the open position, so that the fluid delivered from the pump 52 is returned back to the pump 52 through a closed circuits in which the shut-off valves 24, 32 are connected substantially in series with each other.

The present seventh embodiment of FIGS. 22 is advantageous over the first embodiment of FIG. 13, in the accuracy of control of the fluid pressure in the wheel brake cylinder 12. In the first embodiment wherein the shut-off valve 18 is open in the pressure decrease mode in the pump delivery saving traction control, the fluid discharged from the cylinder 12 is returned to the master cylinder 10 partly through the shut-off valve 18, and partly through the shut-off valves 32 and 42. In the present seventh embodiment wherein the shut-off valve 18 is held closed, any portion of the fluid is not returned to the master cylinder through the shut-off valve 18, and the entire portion of the fluid is returned through the shut-off valve 42. Consequently, the rate of decrease in the pressure in the cylinder 12 is lowered, and the accuracy of control of the pressure in the cylinder 12 is accordingly improved.

It is noted that the cross sectional area of fluid flow through the shut-off valve 42 can be more easily reduced, than that of the shut-off valve 18. It is not desirable to reduce the cross sectional area of fluid flow through the shut-off valve 18 disposed in the primary fluid passage 16, because the fluid pressurized by the master cylinder 10 upon brake application is fed to the brake wheel cylinder 12 through the primary fluid passage 16. On the other hand, the shut-off valve 42 is provided in the secondary fluid passage 40 for the purpose of returning the fluid delivered by the pump 52. Since the amount of the fluid delivered from the pump 52 is relatively small, the shut-off valve 42 may have a comparatively small cross sectional area of fluid flow therethrough. In this respect, too, the rate of decrease of the pressure in the cylinder 12 can be reduced to improve the accuracy of pressure control of the cylinder 12.

The accuracy of control of the pressure in the wheel brake cylinder 12 is further improved in the present embodiment of FIG. 22, since the pressure in the cylinder 12 can be maintained without alternately opening and closing the shut-off valve 18.

It will be understood from the above description of the present embodiment of FIG. 22 that the shut-off valve 24 functions to increase the pressure in the cylinder 12, while the shut-off valve 32 functions to reduce the pressure in the cylinder 12. The shut-off valve 24 permits a supply flow of the fluid into the cylinder 12 when it is open, and inhibits this supply flow when it is closed. The shut-off valve 32 permits a discharge flow of the fluid from the cylinder 12 when it is open, and inhibits this discharge flow when it is closed.

It may be considered that the shut-off valves 18 and 24 function to increase the pressure in the cylinder 12 while the shut-off valve 34 functions to reduce the pressure in the cylinder 12. In this case, the supply flow of the fluid into the cylinder 12 is permitted when the shut-off valve 24 is open while the shut-off valve 18 is closed, and the supply flow is inhibited when the shut-off valve 24 is closed while the shut-off valves 18 and 32 are both open.

It may also be considered that the shut-off valve 24 functions to increase the pressure in the cylinder 12 while the shut-off valves 18 and 32 function to reduce the pressure in the cylinder 12. In this case, the discharge flow of the fluid from the cylinder 12 to the secondary reservoir 14 is permitted when the shut-off valve 18 is closed while the shut-off valve 32 is open. This discharge flow is inhibited when the shut-off valves 18 and 32 are not closed and open, respectively.

In the present seventh embodiment, too, the shut-off valve 18 serves as the master cylinder cut valve, while the shut-off valves 24, 32 and the check valve 26 serve as the brake cylinder control valve device. When the pressure decrease mode is selected during the pump delivery saving traction control, the shut-off valves 24, 32 are both placed in the open position, and the brake cylinder control valve device 24, 32, 26 is not placed in the pressure decrease state, but is placed in a state other than the pressure increase, decrease and hold states described above with respect to the first embodiment. The pressure decrease state is established when the shut-off valve 24 is closed while the shut-off valve 32 is closed.

It will be understood that the control arrangement according to the present seventh embodiment of FIG. 22 is applicable to the brake systems according to the second through sixth embodiments of FIGS. 14–17 and 19. Further, the by-pass passage 308 and check valve 310 may be provided in the first through sixth embodiments of FIGS. 1, 14–17 and 19.

The control arrangement of FIG. 22 according to the seventh embodiment may be modified such that the shut-off valve 18 is operated in the duty control fashion in the pressure hold mode during the pump delivery saving traction control, as in the control arrangement of FIG. 13 according to the first embodiment.

It is noted that the shut-off valve 24 is not essential in the seventh embodiment of FIG. 22, since this valve 24 is held open during the pump delivery saving traction control.

Figure 23:
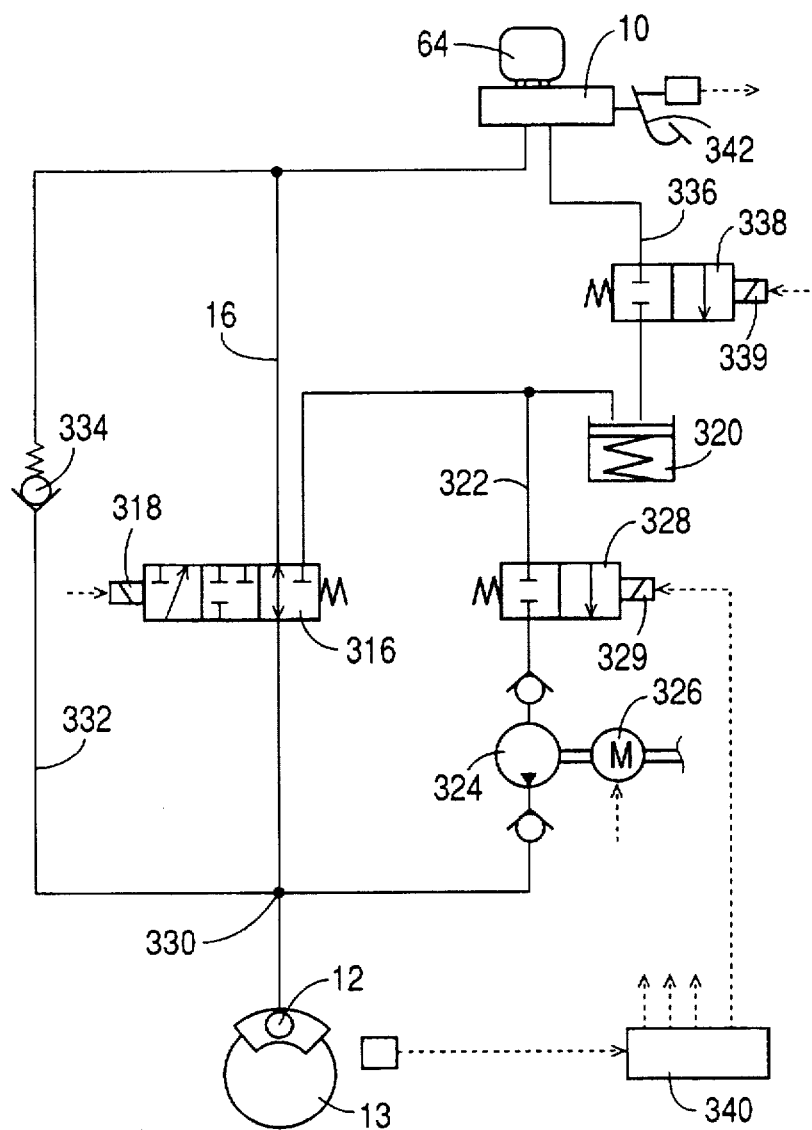
FIG. 23 is a schematic view illustrating a brake system controlled by a brake control apparatus according to an eighth embodiment of the invention.

Referring net to FIG. 23, there will be described a brake system equipped with a brake control apparatus according to an eighth embodiment of this invention.

In the present brake system, a 3-position control valve 316 is provided in the primary fluid passage 16 connecting the master cylinder 10 and the brake wheel cylinder 12. This 3-position control valve 316 has a solenoid 318 which is normally held in a de-energized state. That is, the control valve 316 is normally placed in a pressure increase position in which the master cylinder 10 is connected to the cylinder 12 and is disconnected a secondary reservoir 320. With the solenoid 318 energized by a relatively small amount of current, the 3-position control valve 316 is brought to a pressure hold position in which the wheel brake cylinder 12 is disconnected from both of the master cylinder 10 and the secondary reservoir 320. When the solenoid 318 is energized by a relatively large amount of current, the control valve 316 is brought to a pressure decrease position in which the wheel brake cylinder 12 is connected to the secondary reservoir 320 and is disconnected from the master cylinder 10.

To the secondary reservoir 320, there is connected a pump passage 322 in which a pump 324 is provided. The pump 324 is driven by an electric motor 326 which is controlled by a hydraulic control device 340 (which will be described), such that the motor 326 is kept operated during an anti-lock or traction control operation of the brake system. A shut-off valve 328 is provided, as a pump suction control valve, in a suction portion of the pump passage 322 between the suction port of the pump 324 and the secondary reservoir 320. The shut-off valve 328 has a solenoid 329 which is normally de-energized. That is, the shut-off valve 328 is normally placed in a closed position for disconnecting the pump 324 from the secondary reservoir 320. With the solenoid 329 energized, the shut-off valve 328 is opened for connecting the pump 324 to the reservoir 320, to increase the pressure in the wheel brake cylinder 12. The pump passage 322 is connected at its delivery end 330 to a portion of the primary fluid passage 16 between the 3-position control valve 316 and the wheel brake cylinder 12.

The master cylinder 10 is connected to the wheel brake cylinder 12 also through a relief passage 332, which is connected at one end 330 to the portion of the primary fluid passage 16 between the control valve 316 and the cylinder 12. A pressure relief valve 334 is provided in the relief passage 332. The relief pressure of the relief valve 334 is set to be equal to the highest fluid pressure in the wheel brake cylinder 12 during the traction control. When the delivery pressure of the pump 324 or the pressure in the cylinder 12 exceeds the relief pressure of the relief valve 334, the fluid is returned to the master cylinder 10 through the relief valve 334.

The master cylinder 10 is connected to the secondary reservoir 320 through a secondary fluid passage 336. A fourth control valve in the form of a solenoid-operated shut-off valve 338 is provided in the secondary fluid passage 336. This shut-off valve 338 is normally placed in a closed position with its solenoid 339 being de-energized, so that the master cylinder 10 is disconnected from the reservoir 320. When the traction control is initiated, the solenoid 339 is energized, and the shut-off valve 338 is opened to connect the master cylinder 10 to the reservoir 320.

The solenoids 318, 329 and 339 of the valves 316, 328 and 338 and the motor 326 are controlled by the hydraulic control device 340 through respective driver circuits. Like the hydraulic control device 22, the hydraulic control device 340 incorporates an anti-lock control computer, a traction control computer and a solenoid/motor control computer. The solenoid/motor control computer includes a read-only memory which stores data representative of a predetermined relationship between the traction control modes and the operating states of the valves 316, 328 and 338, as indicated in the table of FIG. 24. As described above, the motor 326 is kept operated during the anti-lock or traction control operation.

When a brake pedal 342 is depressed, the fluid pressurized by the master cylinder 10 is fed to the wheel brake cylinder 12 through the 3-position control valve 316 placed in the pressure increase position. When the brake pedal 342 is released, the fluid in the cylinder 12 is returned to the master cylinder 10 through the primary fluid passage 16.

When the rear drive wheel 13 has a locking tendency during brake application, the fluid pressure in the wheel brake cylinder 12 is controlled in the anti-lock fashion with the 3-position control valve 316 placed in the pressure hold or pressure decrease position, so that the amount of slip of the wheel 13 on the road surface is held within a predetermined optimum range. In the pressure decrease position, the fluid is the cylinder 12 is discharged into the secondary reservoir 320. In the pressure hold position, the fluid pressure in the cylinder 12 is maintained. During the anti-lock control, the shut-off valve 328 is held in the closed position. To increase the fluid pressure in the cylinder 12, the 3-position control valve 316 is placed in the pressure hold position, and the shut-off valve 328 is placed in the open position, so that the fluid in the reservoir 320 is pressurized by the pump 324, and supplied to the cylinder 12.

The shut-off valve 338 is held closed, in principle, during the anti-lock control of the pressure in the wheel brake cylinder 12. The shut-off valve 338 is opened only when the amount of the fluid stored in the secondary reservoir 320 becomes smaller than a predetermined limit. The amount of the fluid in the reservoir 320 is preferably detected by a position sensor adapted to detect the position of the piston of the reservoir 320 for thereby detecting the amount of the fluid accommodated in the reservoir chamber. In the present embodiment, however, the amount of the fluid in the reservoir 320 is estimated on the basis of the time period during which the 3-position control valve 316 is held in the pressure decrease position, and the time period during which the shut-off valve 328 is held in the open position.

The 3-position control valve 316 may be switched to the pressure increase position when the fluid amount in the reservoir 320 becomes smaller than the predetermined limit, so that the fluid is supplied from the master cylinder 10 directly to the wheel brake cylinder 12 through the valve 316.

When the pressure in the cylinder 12 is controlled to control the drive force of the drive wheel 13, that is, when the traction control is effected, the 3-position control valve 316 is placed in the pressure hold or decrease position, as in the anti-lock control, so that the amount of slip of the drive wheel 13 due to excessive traction force of the wheel 13 is held within a predetermined optimum range. At this time, the shut-off valve 338 is held open to supply the fluid from the master cylinder 10 to the secondary reservoir 320.

The traction control is effected by controlling the 3-position control valve 316 and shut-off valves 328, 338 as indicated in FIG. 24. In the pressure increase mode, the control valve 316 is placed in the pressure hold mode, and the shut-off valve 328 is placed in the open position, so that the fluid in the reservoir 320 is pressurized by the pump 324 and supplied to the wheel brake cylinder 12. In the pressure decrease mode, the control valve 316 is placed in the pressure decrease position, and the shut-off valve 328 is closed. As a result, the pump 324 kept in operation does not receive the fluid from the reservoir 320 and does not delivery pressurized fluid. Therefore, it is not necessary to return the fluid to the master cylinder 10 through the pressure relief valve 334. In the pressure hold mode, the control valve 316 is placed in the pressure hold position, and the shut-off valve 328 is placed in the closed position. In this case, too, the pump 324 does not deliver pressurized fluid, and it is not necessary to return the fluid to the master cylinder 10 through the relief valve 334.

In the present eighth embodiment of FIGS. 23 and 24, the shut-off valve 328 is closed to prevent the pump 324 from delivering pressurized fluid, when the brake control apparatus is placed in the pressure decrease mode or pressure hold mode. Therefore, it is not necessary to return the fluid to the master cylinder 10 through the pressure relief valve 324, and the delivery pressure of the pump 324 is reduced to zero. Thus, the traction control in the present embodiment is always equivalent to the pump delivery traction control in the preceding embodiments wherein the normal traction control and the pump delivery saving traction control are selectively effected. Accordingly, the effect of saving the delivery pressure of the pump 324 and reducing the energy consumption by the motor 324 is maximized in the present embodiment.

In the present embodiment of FIGS. 23 and 24, the 3-position control valve 316 and the shut-off valve 328 cooperate to constitute a valve device. The shut-off valve 328 with the solenoid 329 also cooperates with the traction control computer and solenoid/motor control computer of the hydraulic control device 340, to constitute a pump delivery saving device for reducing the delivery pressure of the pump 324. The pump delivery saving device includes control means for controlling the shut-off valve 328, which control means also function as a traction controller for controlling the drive force of the drive wheel 13.

The 3-position control valve 316 corresponds to the first and third control valves (shut-off valves 18, 32) in the first embodiment, and the shut-off valve 328 corresponds to the second control valve (shut-off valve 24) of the first embodiment. The 3-position control valve 316 and the shut-off valve 328 function to increase the pressure in the wheel brake cylinder 12, while the control valve 316 functions to decrease the pressure in the cylinder 12.

Although the present embodiment is adapted such that the shut-off valve 328 is closed in the pressure decrease mode, the shut-off valve 328 may be open in the pressure decrease mode. When the 3-position control valve 316 is placed in the pressure decrease position and the shut-off valve 328 is placed in the open position, the fluid delivered by the pump 324 is returned to the pump 324 through the control valve 316 and shut-off valve 328. In other words, there is a closed fluid circuit for circulating including the fluid through the valves 316, 328 and pump 324, and therefore the fluid delivered by the pump 324 need not be returned to the master cylinder 10 through the relief valve 334.

While the present invention has been described in detail in its presently preferred embodiments, for illustrative purpose only, it is to be understood that the invention is not limited to the details of the illustrated embodiments, but may be embodied with various changes, modifications and improvements, which may occur to those skilled in the art, without departing from the spirit and scope of the invention defined in the following claims.

What is claimed is:

1. An apparatus for controlling a brake for a drive wheel of a motor vehicle, said apparatus comprising:

a low-pressure source;

a pump for pressurizing a working fluid received from said source;

a valve device having at least a pressure increase state for permitting the fluid pressurized by said pump to be fed into a wheel brake cylinder for braking said drive wheel so as to increase a pressure of the fluid in said wheel brake cylinder, and a pressure decrease state for permitting the fluid to be discharged from said wheel brake cylinder into said low-pressure source so as to decrease the pressure of the fluid in said wheel brake cylinder;

a traction controller for effecting a traction control by selectively placing said valve device in at least said pressure increase state and said pressure decrease state, to control the pressure of the fluid in said wheel brake cylinder thereby controlling a drive force of said drive wheel so that an amount of slip of the drive wheel is held within a predetermined range;

a pump delivery saving device including at least one electrically controlled valve which is operated during said traction control for reducing a delivery pressure of said pump while said pump is operated in at least a portion of a time period during which said valve device is placed in a state other than said pressure increase state; and enabling and disabling means for enabling and disabling said pump delivery saving device to reduce said delivery pressure of said pump, depending upon fluid temperature information relating to a rise of a temperature of said working fluid.

2. An apparatus according to claim 1, further comprising a master cylinder and a primary fluid passage connecting said master cylinder and said wheel brake cylinder, and wherein said low-pressure source includes a primary reservoir for supplying the fluid to said master cylinder, and said pump is connected at a delivery port thereof to said primary fluid passage, and wherein said valve device includes a first control valve disposed in a portion of said primary fluid passage between said master cylinder and a point of connection of said delivery port of said pump to said primary fluid passage, said first control valve having an open position for connecting said master cylinder and said delivery port of said pump to each other, and a closed position for disconnecting said master cylinder and said delivery port from each other, said pump delivery saving device including valve control means for placing said first control valve in said open position.

3. An apparatus according to claim 2, wherein said valve device includes a second control valve disposed in a portion of said primary fluid passage between said wheel brake cylinder and said point of connection, said second control valve having an open position for connecting said first control valve and said wheel brake cylinder to each other, and a closed position for disconnecting said first control valve and said wheel brake cylinder from each other, said valve device further including a check valve provided in a by-pass passage which by-passes said second control valve, said check valve permitting a flow of the fluid therethrough in a first direction from said wheel brake cylinder toward said master cylinder, and inhibiting a flow of the fluid therethrough in a second direction opposite to said first direction, and wherein said valve control means includes pressure hold means for placing said first control valve alternately in said open and closed positions, at a controlled duty ratio, so as to maintain the pressure of the fluid in said wheel brake cylinder at a substantially constant level.

4. Apparatus according to claim 3, wherein said low-pressure source includes a secondary reservoir in addition to said primary reservoir, and said valve device further includes a third control valve disposed in a reservoir passage which connects said secondary reservoir and said wheel brake cylinder, said third control valve having an open position for connecting said secondary reservoir and said wheel brake cylinder, and a closed position for disconnecting said secondary reservoir and said wheel brake cylinder, said pressure hold means places said first control valve in said open and closed positions while said third control valve is held in said closed position.

5. An apparatus according to claim 3, wherein said pressure hold means includes pressure determining means for determining a level at which the fluid pressure in said wheel brake cylinder is maintained, on the basis of a sum of a cumulative pressure increase time during which the fluid pressure in said wheel brake cylinder is increased, and a cumulative pressure decrease time during which the fluid pressure in said wheel brake cylinder is decreased, said pressure hold means further including duty ratio determining means for determining said duty ratio on the basis of said sum.

6. An apparatus according to claim 1, wherein said valve device includes a pressure increase valve and a pressure decrease valve, said pressure increase valve having a supply position for permitting a supply flow of the fluid delivered from said pump into said wheel brake cylinder, and a supply inhibit position for inhibiting said supply flow, said pressure decrease valve having a discharge position for permitting a discharge flow of the fluid from said wheel brake cylinder into said low-pressure source, and a discharge inhibit position for inhibiting said discharge flow, said pump delivery saving device including valve control means for placing said pressure decrease valve in said discharge position and said pressure increase valve in said supply position, in at least a portion of a time period during which said valve device is controlled by said traction controller.

7. An apparatus according to claim 6, wherein valve control means includes pressure hold means for placing said pressure decrease valve selectively in said discharge position and said discharge inhibit position at a controlled duty ratio while said pressure increase valve is held in said supply position.

8. An apparatus according to claim 1, wherein said enabling and disabling means includes temperature detecting means for detecting the temperature of said fluid, and first enabling means for enabling said pump delivery saving device to operate, if the temperature of the fluid detected by said temperature detecting means is higher than a predetermined upper limit.

9. An apparatus according to claim 1, wherein said enabling and disabling means includes time obtaining means for obtaining a length of time relating to continuation of an operation of said traction controller to control said valve device, and second enabling means for enabling said pump delivery saving device to operate, if said length of time obtained by said time obtaining means is longer than a predetermined value.

10. An apparatus according to claim 9, wherein said time obtaining means obtains, as said length of time relating to continuation of an operation of said traction controller, an operating time of said pump during the operation of said traction controller.

11. An apparatus according to claim 1, wherein said enabling and disabling means includes vehicle state detecting means for determining whether said motor vehicle is in a stuck state in which the vehicle is unable to start with said drive wheel slipping on a road surface third enabling means for enabling said pump delivery saving device to operate, if said vehicle state detecting means determines that said vehicle is placed in said stuck state.

12. An apparatus according to claim 1, wherein said pump delivery saving device includes valve control means for controlling said valve device so as to reduce the delivery pressure of said pump.

13. An apparatus according to claim 1, wherein said pump delivery saving device includes a delivery saving valve other than said valve device, for reducing the delivery pressure of said pump, and control means for controlling said delivery saving valve.

14. An apparatus according to claim 1, further comprising a master cylinder and a primary fluid passage connecting said master cylinder and said wheel brake cylinder, and wherein said low-pressure source includes a primary reservoir for supplying the fluid to said master cylinder, said apparatus further comprising anti-lock control means for selectively placing said valve device in at least said pressure increase state and said pressure decrease state, during brake application with a pressure of the fluid being applied to said wheel brake cylinder, so as to control the pressure of the fluid in said wheel brake cylinder so that amount of slip of said drive wheel is held within a predetermined range.

15. An apparatus according to claim 1, further comprising a relief passage connecting said delivery port of said pump and said low-pressure source, and a pressure relief valve provided in said relief passage, and wherein said pump delivery saving device includes a by-pass device for returning the fluid delivered from said pump to one of said low-pressure source and a suction port of the pump, while by-passing said pressure relief valve.

16. An apparatus according to claim 15, wherein said low-pressure source includes a primary reservoir for supplying the fluid to a master cylinder, and said pressure relief valve is provided between said delivery port of said pump and said master cylinder, said by-pass device including a by-pass control valve which is disposed between said delivery port of said pump and said master cylinder, in parallel connection with said pressure relief valve and a control valve of said valve device, said by-pass control valve having an open position and a closed position, said by-pass device further including control means for placing said by-pass control valve in said open position to permit the fluid to be returned to said master cylinder through said by-pass control valve.

17. An apparatus according to claim 16, further comprising a primary fluid passage connecting said wheel brake cylinder and said master cylinder, a pump passage connecting said primary fluid passage and the delivery port of said pump, and a check valve which is disposed in a portion of said pump passage between said by-pass control valve and a point of connection of said pump passage to said primary fluid passage, said check valve permitting a flow of the fluid therethrough in a first direction from said pump toward said primary fluid passage and inhibiting a flow of the fluid therethrough in a second direction opposite to said first direction.

18. An apparatus according to claim 1, further comprising a master cylinder, a primary fluid passage connecting said master cylinder and said wheel brake cylinder, a reservoir passage connected to said wheel brake cylinder, and wherein said low-pressure source includes a primary reservoir for supplying the fluid to said master cylinder, and a secondary reservoir connected to said reservoir passage, said pump being connected at a delivery port thereof to said primary fluid passage, said valve device including a first control valve disposed in a portion of said primary fluid passage between said master cylinder and a point of connection of said delivery port of said pump to said primary fluid passage, a second control valve disposed in a portion of said primary fluid passage between said point of connection and said wheel brake cylinder, and a third control valve disposed in said reservoir passage connecting said wheel brake cylinder and said secondary reservoir, said first control valve having an open position for connecting said master cylinder and said delivery port of said pump to each other and a closed position for disconnecting said master cylinder and said delivery port from each other, said second control valve having an open position for connecting said first control valve and said wheel brake cylinder to each other and a closed position for disconnecting said first control valve and said wheel brake cylinder from each other, said third control valve having an open position for connecting said wheel brake cylinder and said secondary reservoir to each other and a closed position for disconnecting said wheel brake cylinder and said secondary reservoir from each other, and wherein said pump delivery saving device includes valve control means for placing both said second and third control valves in said open position in at least a portion of a time period during which said first control valve is held in said closed position.

19. An apparatus according to claim 16, wherein said valve control means includes pressure hold means for placing said third control valve selectively in said open and closed positions at a controlled duty ratio while said second control valve is held in said open position.

20. An apparatus according to claim 1, further comprising a relief passage connecting said delivery port of the pump and the low-pressure source, and a pressure relief valve provided in the relief passage, wherein the pump delivery saving device includes a fluid circulating circuit for returning the fluid delivered from the pump to a suction port of the pump while by-passing the pressure relief valve.

21. An apparatus according to claim 1, further comprising a master cylinder, a primary fluid passage connecting said master cylinder to said wheel brake cylinder, and a secondary fluid passage for connecting said master cylinder to a secondary reservoir, and wherein said low-pressure source includes a primary reservoir for supplying said master cylinder, and said secondary reservoir, said apparatus further comprising a reservoir filling valve device which is provided in said secondary fluid passage and which has an open position for connecting said master cylinder and said secondary reservoir to each other and a closed position for disconnecting said master cylinder and said secondary reservoir from each other.

22. An apparatus according to claim 21, wherein said reservoir filling valve device includes a fourth control valve for opening and closing said secondary fluid passage, and said traction controller includes valve control means for opening said fourth control valve upon initiation of a traction control operation to control said valve device.

23. An apparatus according to claim 21, wherein said reservoir filling valve device includes a pressure relief valve which is normally placed in a closed position and is opened when a pressure of the fluid in said master cylinder becomes higher than a pressure of the fluid in said secondary reservoir by more than a predetermined amount.

24. An apparatus according to claim 21, wherein said reservoir filling valve device includes an in-flow control valve which is closed when an amount of the fluid in said secondary reservoir is larger than a predetermined value and is opened when the amount of the fluid in said secondary reservoir is smaller than said predetermined value.

25. An apparatus according to claim 1, further comprising a pump passage connecting a suction port of said pump and said low-pressure source, and wherein said pump delivery saving device includes a pump suction control valve which is disposed in said pump passage and which has an open position for connecting the suction port of the pump and the low-pressure source to each other and a closed position for disconnecting said suction port and the low-pressure source from each other, and valve control means for placing said pump suction control valve in said closed position.

26. An apparatus according to claim 1 wherein said pump delivery saving device reduces the delivery pressure of said pump while said valve device is placed in said pressure decrease state.

27. An apparatus according to claim 1, wherein said traction controller includes mode selecting means for selectively establishing one of a pressure increase mode, a pressure decrease mode and a pressure hold mode for increasing, decreasing and holding the fluid pressure in said wheel brake cylinder, said pump delivery saving device being operated to reduce the delivery pressure of said pump when at least one of said pressure decrease and hold modes is established by said mode selecting means.

28. An apparatus according to claim 1 characterized by further comprising a master cylinder, a primary fluid passage connecting said master cylinder and said wheel brake cylinder, a secondary fluid passage connecting said master cylinder and said low-pressure source, a reservoir communication valve provided in said secondary fluid passage and having an open position for connecting said master cylinder and said low-pressure source to each other and a closed position for disconnecting said master cylinder and said low-pressure source from each other, a relief passage connecting said master cylinder and a point of connection of said primary fluid passage to a delivery port of said pump, a pressure relief valve provided in said relief passage, and anti-lock control means means for controlling said valve device so as to control the pressure of the fluid in said wheel brake cylinder so that amount of slip of said wheel is held within a predetermined range, and wherein said valve device includes a master cylinder cut valve provided in said primary fluid passage and having an open position and a closed position for connecting and disconnecting said master cylinder to and from said point of connection, respectively, and a brake cylinder control valve device provided in a portion of said primary fluid passage between said master cylinder cut valve and said wheel brake cylinder, said brake cylinder control valve device including at least a pressure increase state for permitting the fluid to be fed into said wheel brake cylinder and a pressure decrease state for permitting the fluid to be discharged from said wheel brake cylinder into said low-pressure source, and wherein said point of connection of said primary fluid passage to said delivery port of said pump is located between said master cylinder cut valve and said brake cylinder control valve device, said pump being provided in a pump passage which connects said point of connection and said low-pressure source, said anti-lock control means selectively placing said brake cylinder control valve device in at least said pressure increase state and said pressure decrease state while said master cylinder cut valve and said reservoir communication valve are held in said open and closed positions, respectively, said traction control means selectively placing said brake control valve device in at least said pressure increase state and said pressure decrease state while said master cylinder cut valve and said reservoir communication valve are held in said closed and open positions, respectively, said pump delivery saving device reducing said delivery pressure of said pump in at least a portion of a time period during which said brake cylinder control valve device is placed in a state other than said pressure increase state.

29. An apparatus according to claim 28, wherein said pump delivery saving device includes means for placing said master cylinder cut valve to reduce the delivery pressure of said pump.

30. An apparatus according to claim 28, wherein said brake cylinder control valve device includes a check valve provided in a by-pass passage which connects said wheel brake cylinder and said point of connection of said primary fluid passage, said check valve permitting a flow of the fluid in a first direction from said wheel brake cylinder toward said point of connection, and inhibiting a flow of the fluid in a second direction opposite to said first direction, and wherein said pump delivery saving device comprises pressure hold means for placing at least said master cylinder cut valve alternately in said open and closed positions, at a controlled duty ratio, so as to maintain the pressure of the fluid in said wheel brake cylinder at a substantially constant level.

31. An apparatus according to claim 1, characterized by further comprising a master cylinder, a primary fluid passage connecting said master cylinder and said wheel brake cylinder, a master cylinder cut valve provided in said primary fluid passage, a by-pass passage which by-passes said master cylinder cut valve, and a check valve provided in said by-pass passage, said master cylinder cut valve having an open position and a closed position for connecting and disconnecting said master cylinder to and from a point of connection of said primary fluid passage to a delivery port of said pump, said check valve permitting a flow of the fluid in a first direction from said master cylinder toward said wheel brake cylinder, and inhibiting a flow of the fluid in a second direction opposite to said first direction.

32. An apparatus according to claim 1, wherein said electrically controlled valve is opened to reduce said delivery pressure of said pump to a level substantially equal to an atmospheric pressure.

33. An apparatus according to claim 1 wherein said electrically controlled valve is opened so that the fluid delivered from said pump is returned to a suction portion of said pump.

34. An apparatus according to claim 1, wherein said electrically controlled valve functions as part of said valve device.

35. An apparatus for controlling a brake for a drive wheel of a motor vehicle, said apparatus comprising:

a low-pressure source;

a pump for pressurizing a working fluid received from said low-pressure source;

a relief passage connecting a delivery port of said pump to said low-pressure source for returning the working fluid to said low-pressure source;

a pressure relief valve provided in said relief passage that opens when a pressure of the fluid at a point of said relief passage between said pressure relief valve and said delivery port exceeds a predetermined relief pressure;

a valve device having at least a pressure increase state for permitting the fluid pressurized by said pump to be fed into a wheel brake cylinder for braking said drive wheel so as to increase a pressure of the fluid in said wheel brake cylinder, and a pressure decrease state for permitting the fluid to be discharged from said wheel brake cylinder into said low-pressure source so as to decrease the pressure of the fluid in said wheel brake cylinder;

a traction controller for effecting a traction control by selectively placing said valve device in at least said pressure increase state and said pressure decrease state, to control the pressure of the fluid in said wheel brake cylinder thereby controlling a drive force of said drive wheel so that an amount of slip of the drive wheel is held within a predetermined range;

a pump delivery saving device operated during said traction control for reducing a delivery pressure of said pump in at least a portion of a time period during which said valve device is placed in a state other than said pressure increase state.

said pump delivery saving device including a by-pass device for returning the fluid delivered from said pump to one of said low-pressure source and a suction portion of said pump, while by-passing said pressure relief valve; and enabling and disabling means for enabling and disabling said pump delivery saving device to reduce said delivery pressure of said pump, depending upon fluid temperature information relating to a rise of a temperature of said working fluid.

* * * * *